(12) United States Patent
Takayama et al.

(10) Patent No.: US 6,219,779 B1
(45) Date of Patent: Apr. 17, 2001

(54) CONSTANT RECONSTRUCTING PROCESSOR WHICH SUPPORTS REDUCTIONS IN CODE SIZE

(75) Inventors: Shuichi Takayama, Takarazuka; Nobuo Higaki, Osaka; Tetsuya Tanaka, Ibaraki; Taketo Heishi, Osaka; Masato Suzuki, Toyonaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/097,214

(22) Filed: Jun. 12, 1998

(30) Foreign Application Priority Data

Jun. 16, 1997 (JP) .................................................. 9-159049
Aug. 29, 1997 (JP) .................................................. 9-234356

(51) Int. Cl.⁷ ....................................................... G06F 9/30
(52) U.S. Cl. ............................................. 712/210; 712/24
(58) Field of Search ............................. 712/24, 208, 215, 712/210

(56) References Cited

U.S. PATENT DOCUMENTS

5,890,009 * 3/1999 Luick et al. ..................... 395/800.24
5,901,301 * 5/1999 Matsuo et al. ........................ 395/388
5,941,984 * 8/1999 Mohri et al. .......................... 712/218

FOREIGN PATENT DOCUMENTS

954693   2/1997  (JP) .

* cited by examiner

*Primary Examiner*—John A. Follansbee
(74) *Attorney, Agent, or Firm*—Price and Gess

(57) ABSTRACT

A processor includes a constant register 36 for storing a constant, a format decoder 21 for decoding a format code located in the P0.0 field of an instruction stored in the instruction register 10, and a constant register control unit 32 which, when the format decoder 21 has decoded that the instruction includes a constant to be stored in the constant register 36, shifts the presently stored value in the constant register 36 and stores the constant into the constant register 36.

39 Claims, 37 Drawing Sheets

| 0 | const | op1 | Rs1    | Rd1 | op2 | Rs2 | Rd2 |
|---|-------|-----|--------|-----|-----|-----|-----|
| 1 | const | op1 | const1 | Rd1 | op2 | Rs2 | Rd2 |
| 2 | cc    | op1 | Rs1    | Rd1 | op2 | Rs2 | Rd2 |
| 3 | cc    | op1 | const1 | Rd1 | op2 | Rs2 | Rd2 |

FIG. 2A

| [P0.0] FORMAT CODE | [P1.0] BRANCH/ CONSTANT | [P2.0] OPERATION CODE/ CONSTANT | [P2.1] SOURCE/ CONSTANT | [P2.2] DESTINATION /CONSTANT | [P3.0] OPERATION CODE/ CONSTANT | [P3.1] SOURCE/ CONSTANT | [P3.2] DESTINATION /CONSTANT |
|---|---|---|---|---|---|---|---|
| 0–3 | 4–7 | 8–11 | 12–15 | 16–19 | 20–23 | 24–27 | 28–31 |
| 51 | 52 | 53 | 54 | 55 | 56 | 57 | 58 |

50 — FIRST OPERATION FIELD 59 — SECOND OPERATION FIELD 60

FIG. 2B

| 0 | const | op1 | Rs1 | Rd1 | op2 | Rs2 | Rd2 |
|---|---|---|---|---|---|---|---|
| 1 | const | op1 | const1 | Rd1 | op2 | Rs2 | Rd2 |
| 2 | cc | op1 | Rs1 | Rd1 | op2 | Rs2 | Rd2 |
| 3 | cc | op1 | const1 | Rd1 | op2 | Rs2 | Rd2 |

FIG. 2C

| 4 | const | const | const | const | op2 | Rs2 | Rd2 |
|---|---|---|---|---|---|---|---|
| 5 | const | op1 | Rs1 | Rd1 | const | const | const |
| 6 | const1 | op1 | const1 | Rd1 | op2 | Rs2 | Rd2 |
| 7 | const2 | op1 | Rs1 | Rd1 | op2 | const2 | Rd2 |
| 8 | const1 | op1 | const1 | Rd1 | op2 | const2 | Rd2 |
| 9 | const2 | op1 | const1 | Rd1 | op2 | const2 | Rd2 |
| A | cc | const2 | const2 | const2 | op2 | const2 | Rd2 |

FIG. 2D

| B | const2 | const2 | const2 | const2 | op2 | const2 | const2 |
|---|---|---|---|---|---|---|---|
| C | reserved | | | | | | |
| D | reserved | | | | | | |
| E | reserved | | | | | | |
| F | reserved | | | | | | |

FIG. 3

| SYMBOL | OPERATION | MNEMONIC NOTATION |
|---|---|---|
| cc | branch | eq, eqi, ne, nei, gt, gti, · · · |
| op1 | ARITHMETIC LOGIC OPERATION | add, sub, mul, and, or, · · · |
| | INTER-REGISTER TRANSFER | mov, movh, movb |
| op2 | ARITHMETIC LOGIC OPERATION | add, sub, mul, and, or, · · · |
| | INTER-REGISTER TRANSFER | mov, movh, movb |
| | REGISTER-MEMORY TRANSFER | ld, ldh, ldb, st, sth, stb |

FIG. 9

|     | P0.0  | P1.0 | P2.0 | P2.1 | P2.2 | P3.0 | P3.1 | P3.2 |
|-----|-------|------|------|------|------|------|------|------|
| 71→ | fmt 4 |      | 0x8765      |||  Sub | R1   | R0   |
| 72→ | fmt 4 | 0    | 0x4321      |||  mul | R2   | R0   |
| 73→ | fmt 7 |      | add  | R15  | R0   | mov  | 0    | R3   |

FIG. 11

| P0.0 | P1.0 | P2.0 | P2.1 | P2.2 | P3.0 | P3.1 | P3.2 |
|---|---|---|---|---|---|---|---|
| fmt 0 | 8 | mov | R6 | R1 | mov | R7 | R2 |
| fmt 0 | 7 | add | R0 | R1 | add | R0 | R2 |
| fmt 0 | 6 | mul | R6 | R1 | sub | R7 | R2 |
| fmt 0 | 5 | mov | R8 | R4 | mov | R9 | R5 |
| fmt 7 | 0 | add | R15 | R0 | mov | 0 | R3 |

Arrows labeled 74, 75, 76, 77, 78 point to columns P2.0, P2.1, P2.2/P3.0, P3.1, P3.2 respectively (top of table).

FIG. 12A

| FIRST OPERATION FIELD | | | | SECOND OPERATION FIELD | | | |
|---|---|---|---|---|---|---|---|
| 0   3 | 4   7 | 8   11 | 12   15 | 16   19 | 20   23 | 24   27 | 28   31 |
| [P1.0] | [P1.1] | [P1.2] | [P1.3] | [P2.0] | [P2.1] | [P2.2] | [P2.3] |

FIG. 12B

| | | | | | | | |
|---|---|---|---|---|---|---|---|
| op1 | Rs1 | Rd1 | op2 | Rs2 | Rd2 | | ← 101 |
| op1 | Rs1 | Rd1 | op2 | const2 | Rd2 | | ← 102 |
| op1 | const1 | Rd1 | op2 | Rs2 | Rd2 | | ← 103 |
| op1 | — | const1 | const1 | const1 | Rd2 | | ← 104 |

FIG. 13

| P1.0 | P1.1 | P1.2 | P1.3 | P2.0 | P2.1 | P2.2 | P2.3 |
|------|------|------|------|------|------|------|------|
| nop  |      | —    | —    | sub  |      | R1   | R0   |
| nop  |      | —    | —    | mul  |      | R2   | R0   |
| set hi |    | —    | —    | 0x8765 |    | R15  | R15  |
| set lo |    | —    | —    | 0x4321 |    | R15  | R15  |
| add  |      | R15  | R0   | mov  |      | 0    | R3   |

| P1.0 | P1.1 | P1.2 | P1.3 | P2.0 | P2.1 | P2.2 | P2.3 | |
|---|---|---|---|---|---|---|---|---|
| | mov | R6 | R1 | mov | R7 | R2 | ← 110 |
| | add | R0 | R1 | add | R0 | R2 | ← 111 |
| | mul | R6 | R1 | sub | R7 | R2 | ← 112 |
| | mov | R8 | R4 | mov | R9 | R5 | ← 113 |
| | add | — | — | 0x8765 | | R0 | ← 114 |
| | nop | — | — | mov | 0 | R3 | ← 115 |

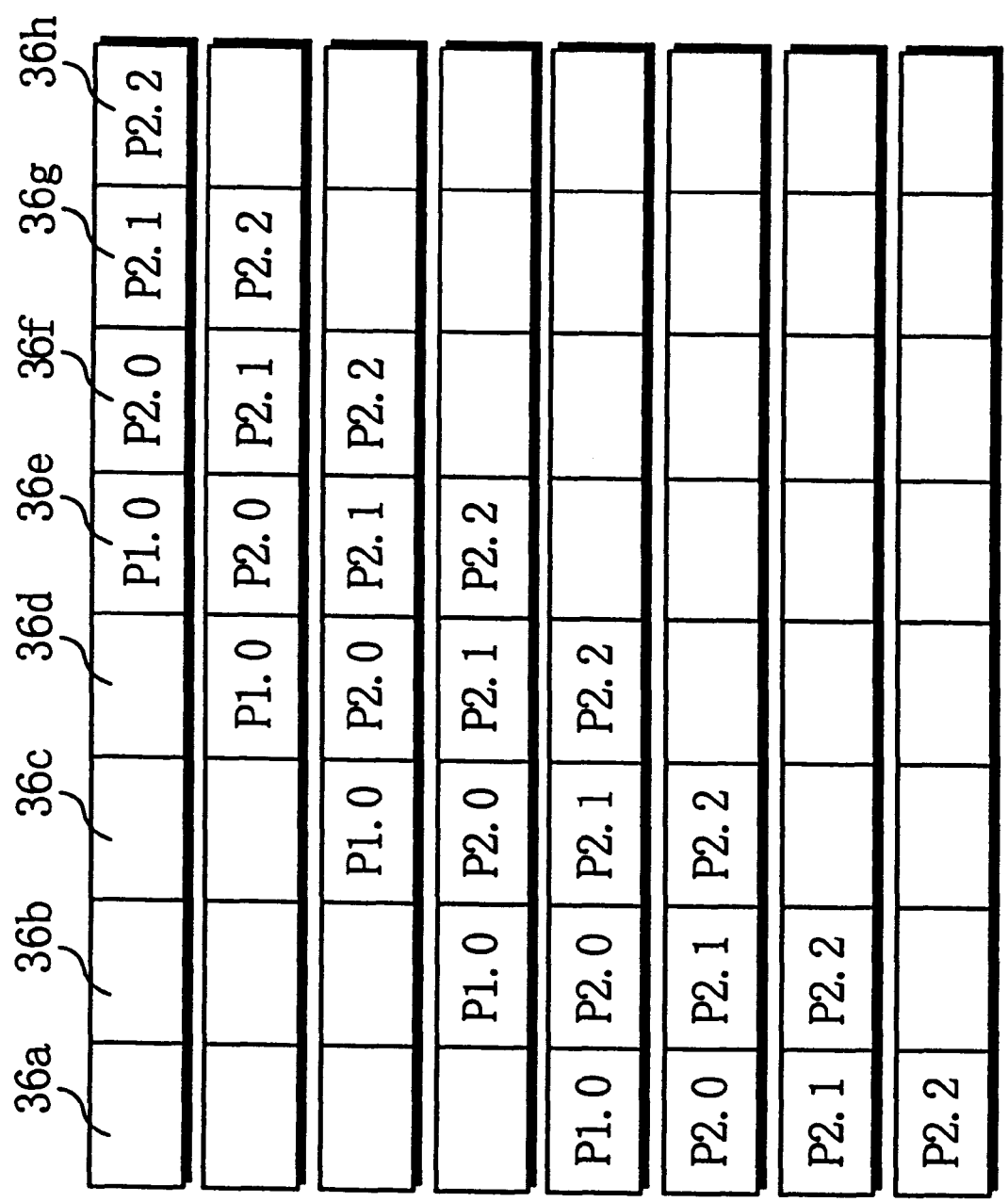

| | 36a | 36b | 36c | 36d | 36e | 36f | 36g | 36h |
|---|---|---|---|---|---|---|---|---|
| Fig. 18A | | | | | P1.0 | P3.0 | P3.1 | P3.2 |
| Fig. 18B | | | | P1.0 | P3.0 | P3.1 | P3.2 | |
| Fig. 18C | | | P1.0 | P3.0 | P3.1 | P3.2 | | |
| Fig. 18D | | P1.0 | P3.0 | P3.1 | P3.2 | | | |
| Fig. 18E | P1.0 | P3.0 | P3.1 | P3.2 | | | | |
| Fig. 18F | P3.0 | P3.1 | P3.2 | | | | | |
| Fig. 18G | P3.1 | P3.2 | | | | | | |
| Fig. 18H | P3.2 | | | | | | | |

| | 36a | 36b | 36c | 36d | 36e | 36f | 36g | 36h |
|---|---|---|---|---|---|---|---|---|
| Fig. 19 | "0" | "0" | "0" | "0" | "0" | "0" | "0" | "0" |

| | Fig. 22A | Fig. 22B | Fig. 22C | Fig. 22D | Fig. 22E | Fig. 22F |
|---|---|---|---|---|---|---|
| 190a | 8 | F | F | F | F | F |
| 190b | 7 | F | F | F | F | F |
| 190c | 6 | F | F | F | F | F |
| 190d | 5 | F | F | F | F | F |
| 190e | 4 | F | F | F | 8 | 8 |
| 190f | 3 | F | F | 8 | 7 | 7 |
| 190g | 2 | F | 8 | 7 | 6 | 6 |
| 190h | 1 | 8 | 7 | 6 | 5 | 5 |
| 192 | 1 | 0 | 0 | 0 | 0 | 1 |

Fig. 29

| P0.0 | P1.0 | P2.0 | P2.1 | P2.2 | P3.0 | P3.1 | P3.2 |
|---|---|---|---|---|---|---|---|
| fmt 4 | | 0x0087 | | | Sub | R1 | R0 |
| fmt 4 | | 0x6543 | | | mov | R2 | R1 |
| fmt 2 | nop | add | R15 | R0 | nop | | |

| VALUE IN NUMBER OF VALID BITS REGISTER 321 | NUMBER OF VALID BITS IN CONSTANT REGISTER 320 |
|---|---|
| 0b00 | ALL BITS INVALID |
| 0b01 | LOWER 13 BITS VALID |
| 0b10 | LOWER 28 BITS VALID |
| 0b11 | ALL BITS VALID |

Fig. 32 sfst    imm13

| 3 | 13 |
|---|---|
| op1 | imm13 | addi    imm6, Rn

| 3 | 3 | 4 | 6 |
|---|---|---|---|
| op1 | op2 | Rn | imm13 | save    IMR, (Rn)

| 3 | 3 | 4 | 6 |
|---|---|---|---|
| op1 | op2 | Rn | – | restore (Rn), IMR

| 3 | 3 | 4 | 6 |
|---|---|---|---|
| op1 | op2 | Rn | – |

Fig. 34

| | | VALUE OF THE NUMBER OF VALID BITS REGISTER 321 | OPERATION OF THE MUX 3224 | OPERATION OF THE MUX 3225 | OPERATION OF THE MUX 3226 | NEXT NUMBER OF VALID BIT |
|---|---|---|---|---|---|---|
| sfst | | 0b00 | — | A SELECTED | B SELECTED | 0b01 |
| | | 0b01 | A SELECTED | — | A SELECTED | 0b10 |
| | | 0b10 | A SELECTED | — | A SELECTED | 0b11 |
| | | 0b11 | A SELECTED | — | A SELECTED | 0b11 |
| | use | 0b00 | — | B SELECTED | B SELECTED | 0b00 |
| | | 0b01 | B SELECTED | — | A SELECTED | 0b00 |
| | | 0b10 | B SELECTED | — | A SELECTED | 0b00 |
| | | 0b11 | B SELECTED | — | A SELECTED | 0b00 |

3227

Fig. 36A
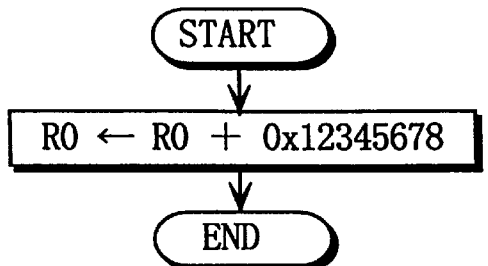
Fig. 36B
sfst 0x0246 ,571
sfst 0x1159 ,572
addi 0x38, R0 ,573
Fig. 36C
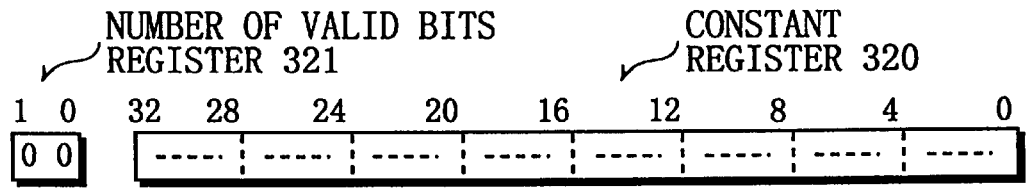
Fig. 36D
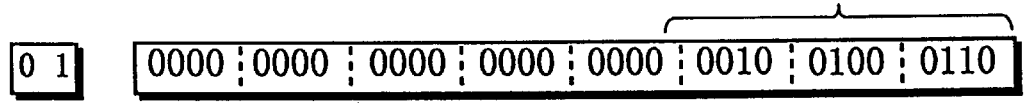
Fig. 36E
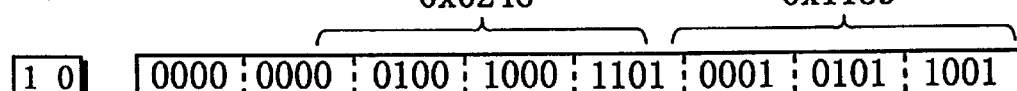
Fig. 36F
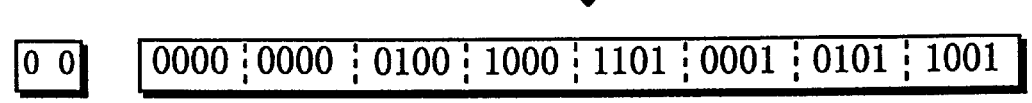
Fig. 36G
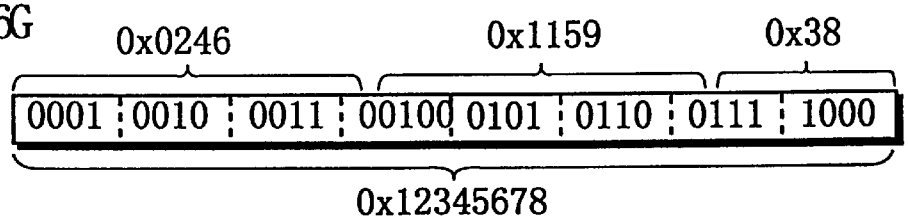

CONSTANT RECONSTRUCTING PROCESSOR WHICH SUPPORTS REDUCTIONS IN CODE SIZE

BACKGROUND OF THE INVENTION

1. Field of the Invention

The present invention relates to microprocessors and is a technique for making effective use of redundant areas and unused areas that are present within instructions.

2. Description of the Prior Art

In recent years, increases in processing capability and processing speed of appliances using embedded microprocessors have led to an increasing demand for microprocessors (hereinafter simply referred to as "processors") that can execute programs with high code efficiency. This means that it is preferable for there to be no redundant areas or unused areas in the instructions which compose a program.

In particular, when using fixed length instructions, such as VLIW (Very Long Instruction Words), there are cases when it is necessary to insert redundant codes, such as no-operation codes ("nop" codes), into instructions. VLIW are composed of a plurality of operation fields, with each operation field specifying an operation which corresponds to one of a plurality of operation units provided within a processor. Due to interdependencies between operations, however, it is not always possible to process a plurality of operations using parallel processing.

One conventional method of avoiding the decreases in code efficiency that accompany the insertion of "nop" codes is the VLIW-type computer system disclosed by Japanese Laid-Open Patent Application H08-161169.

FIG. 1 shows the instruction format used in the above technique.

As shown in FIG. 1, when a "nop" code needs to be inserted into operation field#2, this technique inserts a constant that is to be used by a different operation in place of the "nop" code into operation field #2 and inserts instruction validation information into one part of operation field #1 to show that the constant has been inserted. When executing this instruction, a processor first refers to the instruction validation information and so determines that only a constant is present in operation field #2. The processor then uses this constant as the operand of an operation. In this way, the existence of redundant areas within instructions due to the insertion of "nop" codes can be avoided.

The above technique, however, has a drawback in that the size of the constants that can be inserted into the redundant areas is limited.

As one example, when it is necessary to insert a "nop" code into a 32-bit operation field, it is not possible to insert any part of a 64-bit constant. Similarly, when there is an unused 8-bit area in a fixed 32-bit instruction, it is only possible to use the unused area when inserting a constant which is 8 bits long or shorter. In this case, it is not possible to insert an absolute address which is expressed using 32 bits.

While the above technique may be effective when there is a relatively large redundant area in an instruction, when instructions have a relatively short length, such as 32 bits, any redundant area in the instructions will naturally be short, preventing the insertion of constants into a large number of redundant areas when using the above technique. This constitutes a major problem.

As a potential solution to the above problem, a processor could conceivably be provided with a specialized register ("constant register") for storing constants. However, a processor provided with such a register would suffer from increases in processing time for context switching during multitasking. To perform multiple tasks by switching the processing according to time division, the processor needs to operate as follows. The processor needs to switch to the operating system during the execution of a task, to save the information ("context") that is required for the recommencement of the execution of the task into a saving area, such as memory, and then to restore the context of the next task to be executed. This procedure is called "context switching", and has to be performed with a high frequency. When a value stored in a constant register is also included in a context, this adds to the processing time required when performing task switching.

SUMMARY OF THE INVENTION

In view of the stated problems, it is a first object of the present invention to provide a processor for which the size of constants that may be inserted into redundant areas in instructions is not restricted by the word length of the instructions. By doing so, it is possible to avoid the presence of even small redundant areas in instructions. This supports the generation of programs with high code efficiency.

A second object of the present invention is to provide a processor that achieves the first object of the present invention and can also reduce the processing time required for context switching.

The first object of the present invention can be achieved by a processor for decoding and executing an instruction, the processor including: an instruction register for storing the instruction; a decoding unit for decoding the stored instruction; a constant register including a storage region for storing a constant; a constant storing unit which, when the decoding unit has decoded that the instruction includes a constant that should be stored into the constant register, stores the constant included in the instruction into the constant register if no valid constant is stored in the constant register, and, if a valid constant is already stored in the constant register, stores the constant included in the instruction into the constant register so as to retain the valid constant; and an execution unit which, when the decoding unit has decoded that the instruction specifies an operation which uses the constant register, reads an entire value stored in the constant register and executes the operation in the constant register.

With the stated construction, pieces of a constant that are provided in a plurality of instructions can be accumulated (in a digit direction) in the constant register to restore the original constant. Accordingly, even when there is a small redundant area in an instruction, this small area can be used to store one piece of a constant whose word length exceeds that of the small area. This assists in the generation of programs with high code efficiency.

Here, the constant storing unit may store the constant included in the instruction into the constant register after shifting the valid constant that is already stored in the constant register, the valid constant and the constant included in the instruction being linked in a digit direction in the constant register.

With the stated construction, a constant can be accumulated by merely storing each piece of the constant in the same position in the constant register, so that there is no need to consider which position in the constant register should be used next.

Here, the constant storing unit may shift the valid constant to a higher bit position in the constant register and store the constant included in the instruction by inserting the constant at a lower bit position.

With the stated construction, constants are inserted into the constant register so as to be aligned with the least significant bit. As a result, a processor which is especially well suited to the setting of variable-length constants in the constant register can be achieved.

Here, the processor may further include an extension unit for performing extension processing to add at least one of a sign extension and a zero extension to the constant.

With the stated construction, when the constant stored in the constant register is used as an operand, it can be guaranteed that the operand will have been given a suitable zero extension or sign extension.

Here, the extension unit may perform the extension processing on the constant included in the instruction before the constant is stored into the constant register.

With the stated construction, it can be guaranteed that a constant stored in the constant register will have been given an extension, and since it becomes no longer necessary to give a constant read from the constant register an extension, the time taken by operations that use the constant stored in the constant register can be reduced.

Here, the extension unit may perform the extension processing on a constant that has been read from the constant register.

With the stated construction, extension processing is not required when storing a constant into the constant register, so that the time taken to store a constant into the constant register can be reduced.

Here, the constant storing unit may shift the validconstant to a lower bit position in the constant register and stores the constant included in the instruction by inserting the constant at a higher bit position.

With the stated construction, constants are stored by inserting values into higher bit positions in the constant register, so that a processor which is well suited to setting constants where the lower digits are all zeros can be achieved.

Here, the constant storing unit may not shift the valid constant in the constant register and may store the constant included in the instruction into a position in the constant register adjacent to the valid constant, the valid constant and the constant included in the instruction being linked in a digit direction in the constant register.

By doing so, there will be no change in the positions of constants that are stored in the constant register. Accordingly, scheduling becomes simple for a compiler that divides a constant between redundant areas in a plurality of instructions.

Here, the constant storing unit may store zero into the constant register immediately after the entire value stored in the constant register has been read by the execution unit.

By doing so, it can be guaranteed just by storing a constant in the constant register that the stored constant will have been given a zero extension. Accordingly, separate deletion instructions for clearing the constant register are not required whenever the stored content of the constant register is read.

Here, the execution unit may have a branch execution unit for executing a branch operation in accordance with the instruction, and the constant storing unit may store zero into the constant register when a branch operation has been executed by the branch execution unit.

With the stated construction, the stored value of the constant register can be cleared whenever a branch operation is performed. As a result, problems associated with the presence of unwanted values in the constant register can be avoided.

Here, the processor may be connected to an external memory for storing an internal state of the processor, and the processor may further include: a saving unit for saving, when the decoding unit decodes that the instruction is a save instruction for saving a value in the constant register into the external memory, the value in the constant register into the external memory; and a save prohibiting unit for prohibiting the saving unit from saving the value in the constant register when there is no valid constant in the constant register.

With the stated construction, redundant save operations when the constant register is empty or has an invalid value can be avoided. As a result, the processing time taken by context switching during multitasking can be improved.

Here, the processor may further include: a restoring unit for restoring, when the decoding unit decodes that the instruction is a restore instruction for restoring a value into the constant register from the external memory, the value into the constant register; and a restore prohibiting unit for prohibiting the restoring unit from restoring the value when the restore instruction corresponds to a save instruction where saving was prohibited by the save prohibiting unit.

With the stated construction, redundant restore operations for returning a value that was not actually saved from external memory to the constant register can be avoided. As a result, the processing time taken by context switching during multitasking can be improved.

Here, the processor may further include: a validity information storage unit for storing validity information showing whether a valid constant is stored in the constant register, the saving unit including a validity information saving unit for having the validity information stored in the validity information storage unit saved into the external memory, the save prohibiting unit referring to the validity information to judge whether a valid constant is stored in the constant register, and prohibiting the saving unit from saving the value of the constant register on judging that there is no valid constant in the constant register, the restoring unit including a validity information restoring unit for having the validity information in the external memory restored into the validity information storage unit, and the restore prohibiting unit referring to the validity information in the external memory to judge whether the restore instruction corresponds to a save instruction where saving was prohibited by the save prohibiting unit, and prohibiting the restoring unit from restoring a value on judging that the restore instruction corresponds to a save instruction where saving was prohibited.

With the stated construction, the processor only needs to refer to the validity information to avoid redundant save and restore operations, so that above processing can be achieved by simple circuitry.

Here, the validity information saving unit may save the validity information into the external memory when the decoding unit has decoded that the instruction in the instruction register is a save instruction, the validity information restoring unit restoring the validity information from the external memory to the validity information storage unit when the decoding unit has decoded that the instruction in the instruction register is a restore instruction.

With the stated construction, the validity information can be saved or restored together with the content of the constant register using a single instruction. As a result, there is a reduction in the program size required for context switching.

Here, the validity information may show a valid number of digits in a constant stored in the constant register, the save prohibiting unit prohibiting a saving when the valid number of digits in the validity information is zero, and the restore prohibiting unit prohibiting a restoring when the valid number of digits in the validity information is zero.

With the stated construction, the validity information shows whether the content of the constant register is valid and the valid number of bits, so that in addition to save and restore operations, operations that use the constant in the constant register can also use the validity information for digit control.

For a VLIW processor that executes instructions made up of a plurality of operations which are to be subjected to parallel processing, when operations to be processed in parallel are not present, a constant for use by a later instruction can be located into the instruction in place of an operation.

With the stated construction, constants can be inserted into not only redundant areas that exist in instructions that indicate a single operation, but also into redundant areas in VLIW that can indicate two or more operations in a single instruction.

For a VLIW processor that executes instructions made up of a plurality of operations which are to be subjected to parallel processing, instructions, which include a constant for use by a later instruction in place of an operation when operations that can be subjected to parallel processing are not present, may be used to have certain operations that do not involve the constant executed in parallel while at the same time accumulating pieces of a constant in order.

By doing so, when a constant is located in only one part of a VLIW, the storage of this constant can be performed in parallel with other operations indicated by the VLIW. Since this accumulated constant can be used by a later instruction, a constant of long word length may be divided and located in a plurality of instructions.

Here, it is also possible to achieve a VLIW processor for decoding and executing an instruction, the instruction including a format field for storing a format code that specifies an instruction format and a plurality of operation fields for specifying operations that are to be processed in parallel. This processor may include a constant register including a storage region for storing a constant; a decoding unit for decoding a stored instruction, the decoding unit for referring to the format code of the instruction and decoding that a constant is located in at least one operation field in the instruction; a constant storing unit which, when the decoding unit has decoded that the instruction includes a constant that should be stored into the constant register, stores the constant located in the operation field into the constant register if no valid constant is stored in the constant register, and, if a valid constant is already stored in the constant register, stores the constant located in the operation field into the constant register so as to retain the valid constant; and an execution unit which, when the decoding unit has decoded that the instruction specifies an operation which uses the constant register, reads an entire value stored in the constant register and executes the operation.

With the stated construction, when generating a VLIW sequence to be executed by the processor, it is possible to divide a constant of long word length between a plurality of VLIW. The positions within instructions used for locating constants (operation fields) are clearly indicated by the format code, while the storage destination of a constant (the constant register) and the storage position (bit position within the constant register) are implicitly indicated, so that it is unnecessary to provide an explicit operation code for storing a constant given in an instruction into a specified position in the constant register.

With the present invention described above, when generating a sequence of machine language instructions using a compiler or the like, a constant which is used by a later instruction can be divided and inserted into redundant areas which are unavoidably left in the generated instructions. This enables optimal scheduling to be performed, and results in reductions in code size, an effect which is of particular value to embedded processors.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows the field structure of an instruction that is executed by the processor of the present invention;

FIGS. 2B to 2D show sixteen types of instruction format, with FIG. 2B showing triple operation instructions, FIG. 2C showing twin operation instructions, and FIG. 2D showing single operation instructions;

FIG. 3 is a table showing specific operations that are indicated by the three types of operation code, "cc", "op1", and "op2", that are used in FIGS. 2B to 2D;

FIG. 9 shows an example of a program that has the present processor execute the procedure shown in FIG. 8;

FIG. 11 is an example of a program that has the present processor execute a procedure that handles a 16-bit constant;

FIG. 12A shows the field definition of instructions that are executed by a standard processor;

FIG. 12B shows the instruction format of the instructions shown in FIG. 12A;

FIG. 13 shows an example of a program that has a standard processor perform the same procedure as the program shown in FIG. 9;

FIG. 14 shows an example of a program that has a standard processor execute the same procedure as the program shown in FIG. 11;

FIGS. 17A to 17H show the storage methods for the storage of a constant by the constant register control unit 90 when the format code is "4", corresponding to when the value of the stored digit counter 91 is "0"–"7";

FIGS. 18A to 18H show the storage methods for the storage of a constant by the constant register control unit 90 when the format code is "5", corresponding to when the value of the stored digit counter 91 is "0"–"7";

FIG. 19 shows the storage method for the storage of a constant by the constant register control unit 90 when the format code is "2", "3" or "A", or when the stored value of the constant register 36 is used as an operand;

FIGS. 22A to 22F show the changes in the values of the read flag storage unit 192 and the constant register 36 in the second modification, with FIG. 22A showing the values immediately after the constant "0x87654321" has been read from the constant register 36, FIGS. 22B to 22E showing the values immediately after the 4-bit constants "0x8", "0x7", "0x6", and "0x5" have successively been stored in the constant register 36, and FIG. 22F showing the values immediately after the constant "0xFFFF8765" has been read from the constant register 36;

FIG. 29 shows an example of a program that has the processor of the first embodiment perform the sa me processing content as the flowchart shown in FIG. 27;

FIG. 31 shows the correspondence between the number of valid bits in the constant register 320 and the stored value of the number of valid bits register 321;

FIG. 32 shows the instructions which are used to explain the operation in the second embodiment and the formats of the instructions;

FIG. 34 is a table which defines the operation of the multiplexers 3224, 3225, and 3226 and the next number of valid bits generation circuit 3227;

FIG. 36A is a flowchart that is used to explain the operation of the present processor, while FIG. 36B is a program that is a list of instructions (instructions 571–573) that corresponds to the processing in the flowchart of FIG. 36A, and FIGS. 36C to 36G show changes in the stored content of the constant register 320 and the valid bit number register 321;

DESCRIPTION OF THE PREFERRED EMBODIMENTS

Figure 1:
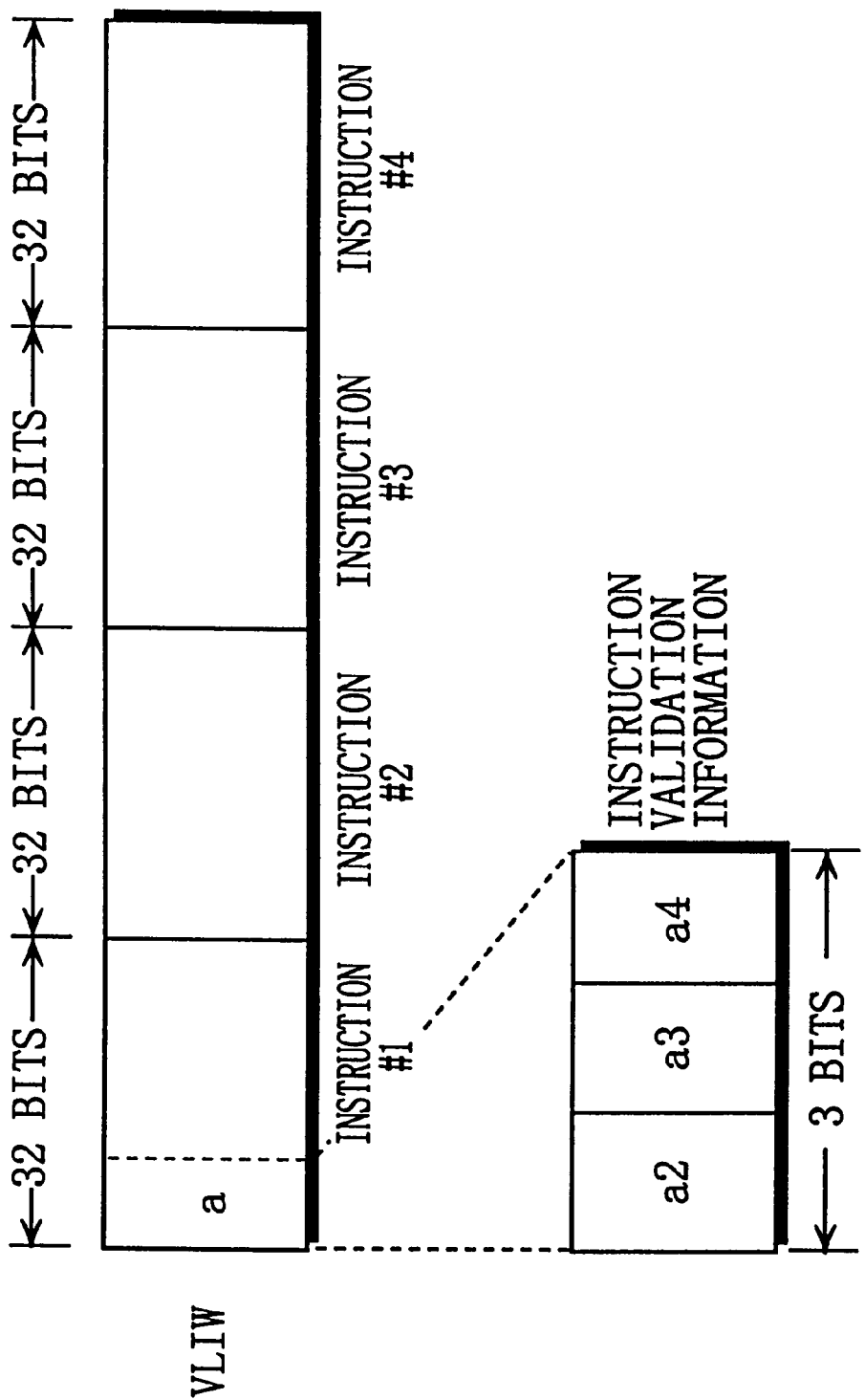
FIG. 1 shows the instruction format used under the prior art.

Two embodiments of the processor of the present invention are described below with reference to the figures. In this specification, the expression "instruction" refers to a set of code that is decoded and executed by the present processor simultaneously and in parallel, with the expression "operation" refers to a unit of processing, such as an arithmetic operation, a logic operation, a transfer, or a branch, which is executed by the present processor in parallel, as well as to the code which indicates each unit of processing.

First Embodiment

The processor of this first embodiment realizes the first object of the present invention. This processor is characterized by a function for accumulating pieces of a constant that are distributed across a plurality of instructions in a specialized register to restore what was originally a single constant.

Instruction Format

First, the structure of the instructions that are decoded and executed by the present processor will be described. The present processor is a VLIW processor that decodes and executes instructions with a fixed word length of 32 bits.

FIG. 2A shows the field structure of an instruction 50 to be executed by the present processor. FIGS. 2B to 2D, meanwhile, show sixteen instruction formats. Of these, the instruction formats in FIG. 2B simultaneously indicate three operations, the instruction formats in FIG. 2C two operations, and the instruction formats in FIG. 2D a single operation.

This instruction 50 has a fixed word length of 32 bits and is composed of eight 4-bit physical fields shown in order starting from the MSB (Most Significant Bit) as P0.0 field 51, P1.0 field 52, . . . P3.2 field 58 in FIG. 2A. Of these, the range from the P2.0 field 53 to the P2.2 field 55 is called the first operation field 59, while the range from the P3.0 field 56 to the P3.2 field 58 is called the second operation field 60.

In FIGS. 2B to 2D, the legend "const" indicates a constant, and depending on the operation in which it is used, this can be a numeric constant or a character constant such as an immediate, an absolute address, or a displacement. The legend "op" represents an operation code that indicates an operation type, while the legend "Rs" indicates the register used as the source operand, "Rd" the register used as the destination operand, and "cc" an operation code indicating a branch operation that uses the stored value of a specialized 32-bit register provided in the present processor (the constant register 36 shown in FIG. 4) as the absolute address or relative address (displacement) of a branch destination.

The numerical values given directly after the codes described above show values that are used in the operation in either the first operation field 59 or the second operation field 60. As one example, for the instruction format with the format code "6", the 4-bit constant "const1" located in the P1.0 field 52 and the 4-bit constant "const1" located in the P2.1 field 54 are combined to form an 8-bit constant that is the source operand corresponding to the operation code "op1" of the first operation field 59.

Figure 4:
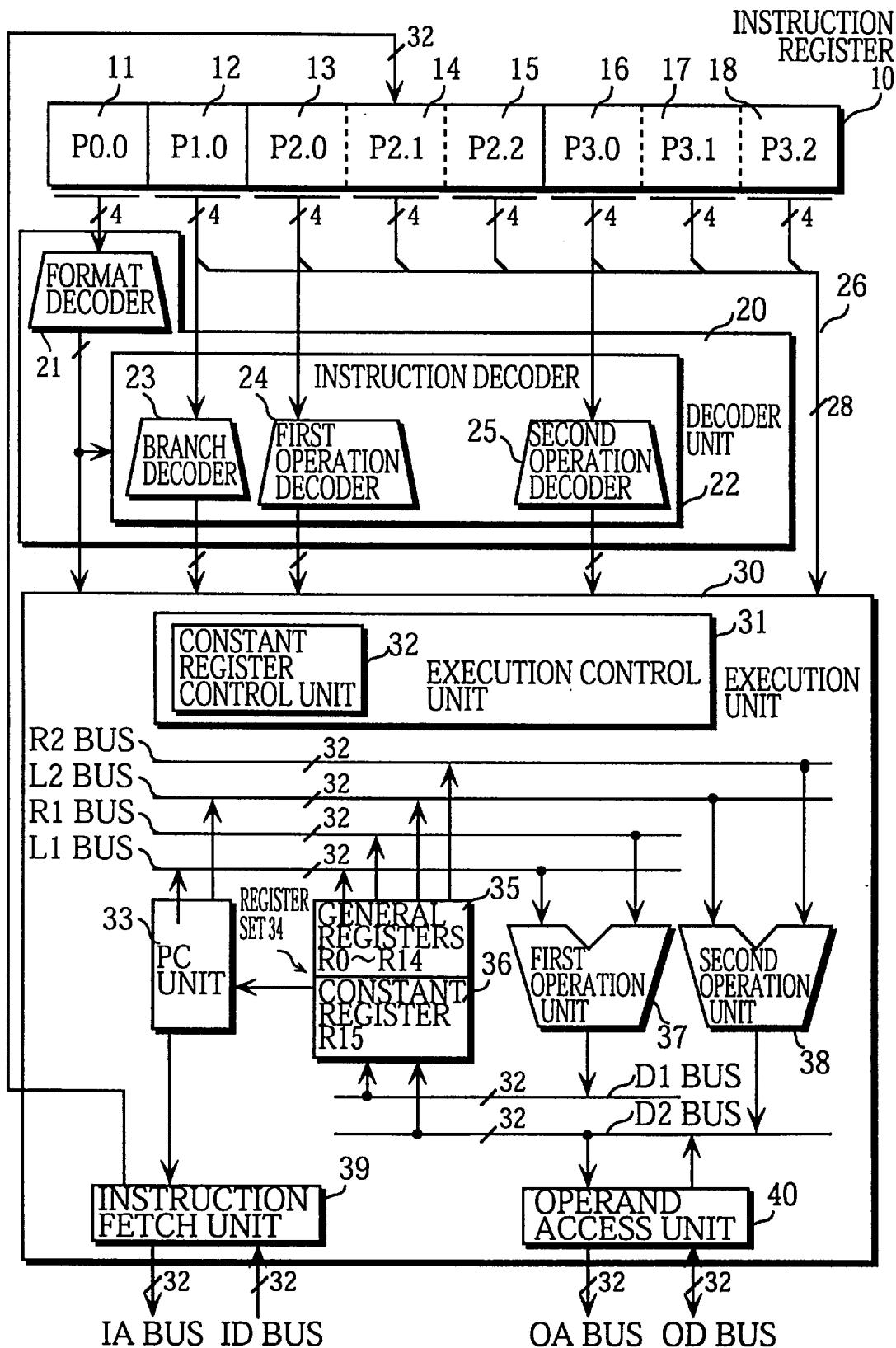
FIG. 4 is a block diagram showing the hardware construction of the present processor.

The constant "const" which is not appended with a number represents a constant to be stored in the specialized 32-bit register provided in the present processor (the constant register 36 shown in FIG. 4). As one example, for the instruction format with the format code "0", the 4-bit constant "const" located in the P1.0 field 52 implies the constant that is to be stored in the constant register 36 which is implicitly indicated.

FIG. 3 shows specific examples of the operations that can be indicated by the three kinds of operation code "cc", "op1", and "op2" given in FIGS. 2B to 2D. These operations are described in detail below.

The 4-bit operation code "cc" indicates one out of sixteen types of branch instruction. Each branch instruction is specified as a branch condition and a branch format. Examples of branch conditions include "equal to ('eq')", "not equal to ('neq')", and "greater than ('gt')". The branch format can be a format where the stored value of the constant register 36 serves as the absolute address of the branch destination (denoted by having no "i" attached to the instruction mnemonic), or a format where the stored value of the constant register 36 serves as a relative address (denoted by having "i" attached to the instruction mnemonic). As one example, the operation code "eq" represents an operation that branches to a destination indicated through absolute addressing when a preceding comparison finds the compared values to be equal, while the operation code "eqi" represents an operation that branches to a destination indicated through relative addressing when a preceding comparison finds the compared values to be equal.

The 4-bit operand "op1" can be used to indicate an arithmetic logic operation, such as any of an "add" (addition), a "sub" (subtraction), a "mul" (multiplication), an "and" (logical AND), or an "or" (logical OR), or an operation that is an inter-register transfer, such as any of a "mov" (transfer of word (32-bit) data), a "movh (transfer of halfword data), or a "movb" (transfer of one byte data).

The 4-bit operand "op2" can be used to indicate any of the arithmetic logic operations or inter-register transfers that can be indicated by the operand "op1", but can also be used to indicate a register-memory transfer operation such as an "ld" (load of one word data from memory into registers) or an "st" (store of one word data into memory from registers).

The characteristic features of the fields 51, 52, 59, and 60 shown in FIG. 2A are described below.

The P0.0 field 51 holds a 4-bit format code that specifies the format of the instruction 50. More specifically, this P0.0 field 51 specifies one of the sixteen instruction formats shown in FIGS. 2B to 2D.

The P1.0 field 52 is a field holds a constant or an operation code for a branch operation. When a constant is located in the P1.0 field 52 (such as in the instructions with the format codes "0", "1", and "4" to "9") there are cases where the constant is to be stored in the constant register 36 (such as in the instructions with the format codes "0", "1", "4", and "5"), and cases where the constant forms one part of the operand in the first operation field 59 or the second operation field 60 (such as in the instructions with the format codes "5", "7", "8", "9", and "B"). When the constant in the P1.0 field 52 is to be stored in the constant register 36, there are cases where only this 4-bit constant is stored (such as in the instructions with the format codes "0" and "1"), and cases where this constant is stored together with a 12-bit constant located in either the first operation field 59 or the second operation field 60 (such as in the instructions with the format codes "4" and "5").

When the operation code "cc" for branching is given in the P1.0 field 52 (such as in the instructions with the format codes "2", "3", and "A"), this indicates a branch operation that uses the stored value of the constant register 36 as the absolute address or relative address (displacement) of a branch destination.

The first operation field 59 holds either a constant or a combination of (a) an operation code for indicating an operation (such as an arithmetic logic operation or inter-register transfer) that does not involve data transfer between the present processor and the periphery (memory), and (b) source and destination operands for the operation.

The second operation field 60 can hold the same content as the first operation field 59 described above, but can also alternatively hold a combination of (a) an operation code for indicating an operation (such as memory-register transfer) that involves data transfer between the present processor and the periphery and (b) operands for the operation.

The above assignment of different operation types to certain fields rests on the premises for the present von Neumann-type processor whereby it is not necessary to process two or more branch operations simultaneously, and that only one input/output port (the operand access unit 40 shown in FIG. 4) for transferring operands is provided between the present processor and the periphery (memory).

The instruction formats shown in FIGS. 2B to 2D have the following characteristic features.

First, by focusing on the constant "const", it can be seen that there are the following three types of instruction for storing a constant in the constant register 36.

(1) When the format code is "0" or "1":
In these instructions, the 4-bit constant located in the P1.0 field 52 is stored in the constant register 36.

(2) When the format code is "4":
In this instruction, a 16-bit constant located in the P1.0 field 52 to P2.2 field 55 is stored in the constant register 36.

(3) When the format code is "5":
In this instruction, a 16-bit constant located in the P1.0 field 52 and the P3.0 field 56 to P3.2 field 58 is stored in the constant register 36.

Secondly, for the present processor, a maximum of three operations can be indicated by a single instruction, and in this case, as can be seen from the triple operation formats shown in FIG. 2B, either of the following combinations of operation types can be used.

(1) One operation that sets a 4-bit constant into the constant register 36 and two standard operations (when the format code is "0" or "1").

(2) One operation that performs branching using the value set in the constant register 36 as an absolute address or a relative address and two standard operations (when the format code "2" or "3").

As described above, the instructions of present processor have a highly efficient field structure that enables a maximum of three operations to be simultaneously indicated by a single 32-bit instruction.

Hardware Construction of the Processor

The hardware construction of the present processor is described below.

FIG. 4 is a block diagram showing the hardware construction of the processor of the present invention. As described above, this processor is a VLIW processor that can execute a maximum of three operations in parallel. The construction of the processor can be roughly divided into an instruction register 10, a decoder unit 20, and an execution unit 30.

The instruction register 10 is a 32-bit register that stores one instruction that has been sent from the instruction fetch unit 39.

The decoder unit 20 decodes the instruction held in the instruction register 10 and performs output on control lines to the execution unit 30 in accordance with the decoding result. This decoder unit 20 can itself be roughly divided into the format decoder 21 and the instruction decoder 22.

The instruction decoder 22 is composed of a branch decoder 23 that decodes the "cc" operation code held in the P1.0 field 12 and controls the PC unit 33 accordingly, a first operation decoder 24 that decodes the operation code held in the P2.0 field 13 and controls the first operation unit 37 accordingly, and a second operation decoder 25 that decodes the operation code held in the P3.0 field 16 and controls the second operation unit 38 and operand access unit 40 accordingly.

The format decoder 21 decodes the 4-bit format code held in the P0.0 field 11 to identify the instruction format of the instruction held in the instruction register 10 as one of the sixteen possible instruction formats shown in FIGS. 2B to 2D. In accordance with the decoding result, the format decoder 21 permits or prohibits decoding operations by the branch decoder 23, the first operation decoder 24, and the second operation decoder 25, and activates the register control unit 32 of the execution unit 30.

The format decoder 21, the branch decoder 23, the first operation decoder 24, and the second operation decoder 25 fundamentally decode one operation in one cycle and send control signals to the execution unit 30. Here, the 26-bit constant signal line 26 that connects the instruction register 10 with the execution unit 30 is a bus for transferring constants and operands located in the instruction register 10 to the execution unit 30.

The execution unit 30 operates according to the decoding result of the decoder unit 20 and is a circuit that is capable of executing a maximum of three operations in parallel. This execution unit 30 is composed of an execution control unit 31, a PC unit 33, a register set 34, a first operation unit 37, a second operation unit 38, an instruction fetch unit 39, and an operand access unit 40. Out of the components in the execution unit 30, the constructions of the register control unit 32, the PC unit 33, and the constant register 36 are shown in greater detail in the other drawings.

The execution control unit 31 refers in general to the control circuits and wiring for controlling the components numbered 33 to 40 in the execution unit 30 according to the decoding result of the decoder unit 20. This execution control unit 31 includes the components that are normally provided in a processor, such as circuits for timing control, operation permission/prohibition control, status management, and interruption control, as well as the constant register control unit 32 which is a characteristic component of the present processor. The constant register control unit 32 performs control so that a 4- or 16-bit constant "const" held in the instruction register 10 is stored in the constant register 36 based on indications given by the format decoder 21.

The PC (Program Counter) unit 33 operates under the control of the branch decoder 23, and outputs the address in an external memory (not illustrated) of the next instruction to be decoded and executed to the instruction fetch unit 39.

The instruction fetch unit 39 fetches an instruction block from the external memory (not illustrated) via a 32-bit IA (Instruction Address) bus and a 32-bit ID (Instruction Data) bus. The instruction fetch unit 39 stores the fetched instruction block in an internal instruction cache and supplies the instruction which corresponds to the address outputted by the PC unit 33 to the instruction register 10.

The register set 34 is composed of fifteen 32-bit general registers 35 and one 32-bit constant register 36. In accordance with the decoding results of the first operation decoder 24 and the second operation decoder 25, the values which are stored in these sixteen registers 35 and 36 are transferred to the first operation unit 37 and the second operation unit 38 where an operation is performed or alternatively the values are allowed to pass, before being sent to the register set 34 or the operand access unit 40. Here, in addition to being used in the operations performed by the first operation unit 37 and the second operation unit 38, the value stored in the constant register 36 can also be transferred to the PC unit 33, where it is used to generate an effective address that is used as a branch destination.

The first operation unit 37 internally includes an ALU (Arithmetic Logic Unit) for performing arithmetic logic operations on two 32-bit sets of data and a multiplier for performing multiplications on two 32-bit sets of data. This first operation unit 37 is capable of executing two types of operation (namely, arithmetic logic operations, and interregister transfer operations) under the control of the first operation decoder 24.

The second operation unit 38 internally includes an ALU for performing arithmetic logic operations on two 32-bit sets of data and a multiplier for performing multiplications on two 32-bit sets of data, in the same way as the first operation unit 37. This second operation unit 38 is capable of executing two types of operation (namely, arithmetic logic operations, and inter-register transfer operations) under the control of the second operation decoder 25.

The operand access unit 40 operates under the control of the second operation decoder 25 and is a circuit that transfers operands between the register set 34 and the external memory (not illustrated). The operand access unit 40 internally includes a buffer for storing operands and operand addresses. As a specific example, when the operation code "ld" is in the P3.1 field 16 of the instruction register 10, one word of data that is located in the external memory is loaded via the operand access unit 40 into one of the registers in the register set 34. When the operation code "st" is present, meanwhile, the stored value of one of the registers in the register set 34 is stored in the external memory.

The PC unit 33, the register set 34, the first operation unit 37, the second operation unit 38, and the operand access unit 40 are connected by internal buses (the L1 bus, the R1 bus, the L2 bus, the R2 bus, the D1 bus, and the D2 bus) as shown in FIG. 4. Here, the L1 bus and the R1 bus are each connected a respective one of the two input ports of the first operation unit 37, the L2 bus and the R2 bus are each connected to a respective one of the two input ports of the second operation unit 38, and the D1 bus and the D2 bus are respectively connected to an output port of the first operation unit 37 and the second operation unit 38.

Detailed Construction of the Constant Register 36 and its Periphery

The following is a detailed description of the construction of the constant register 36 and of the peripheral circuits.

Figure 5:
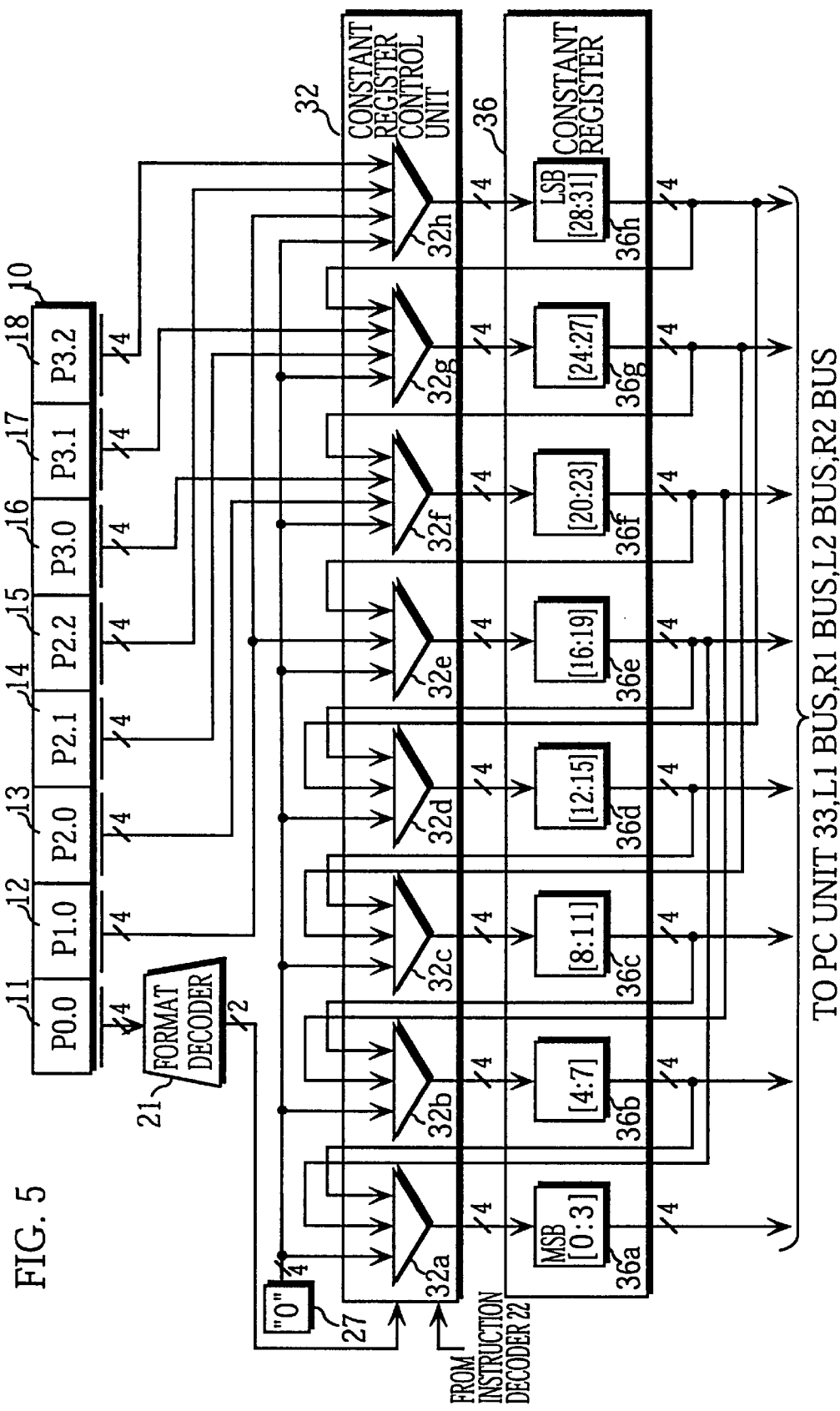
FIG. 5 is a block diagram showing the detailed construction of the constant register 36 of the present processor and the peripheral circuits.

FIG. 5 is a block diagram showing the detailed construction of the constant register 36 and of the peripheral circuits. Note here that the fixed value ("0") 27 in the drawings refers to fixed wiring for four signal lines carrying the constant "0".

The constant register control unit 32 is composed of five 3-input selectors 32a–32e and three 4-input selectors 32f–32h, while the constant register 36 is composed of eight 4-bit registers 36a–36h. Here, each set of input and output data is 4-bit parallel data.

In accordance with control signals from the format decoder 21 and the instruction decoder 22, the constant register control unit 32 controls the eight input selectors 32a–32h so that a constant stored in the instruction register 10 or zeros are stored in the constant register 36 according to one of the four storage methods given below.

FIGS. 6A to 6D show the four possible storage methods in the present embodiment.

Figure 6A:
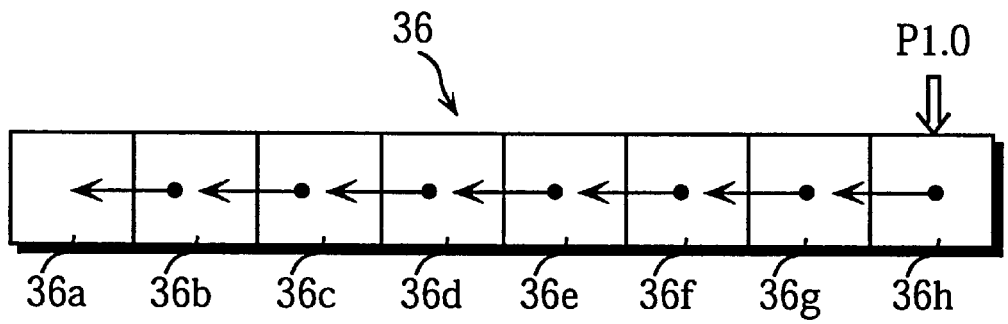
FIGS. 6A to 6D are representations of different methods for storing a constant by the constant register control unit 32 shown in FIG. 5, with FIG. 6A showing the case when the format code is "0" or "1", FIG. 6B showing the case when the format code is "4", FIG. 6C showing the case when the format code is "5", and FIG. 6D showing the case when the format code is "2", "3", or "A"

FIG. 6A shows a storage method for when the format decoder 21 detects that the value stored in the P0.0 field 11 is "0" or "1". This equates to the case when only a 4-bit constant located in the P1.0 field 12 is stored in the constant register 36. More specifically, the data that is stored in the constant register 36 is shifted upwards (to the left in FIG. 6A) in 4-bit units and the 4-bit constant stored in the P1.0 field 12 of the instruction register 10 is stored in the lowest-order 4-bit register 36h of the constant register 36.

Figure 6B:
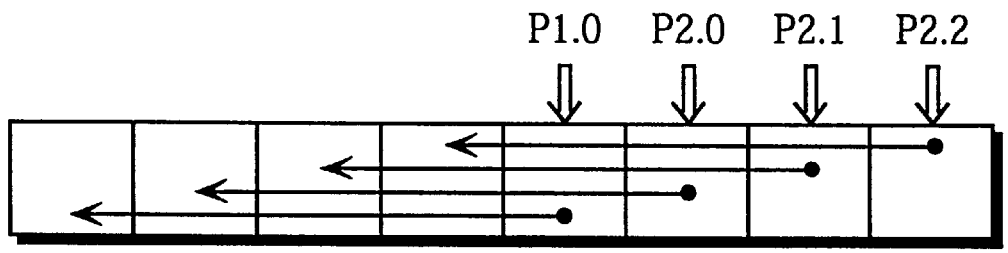

FIG. 6B shows a storage method for when the format decoder 21 detects that the value stored in the P0.0 field 11 is "4". This equates to the case when a 16-bit constant located between the P1.0 field 12 and the P2.2 field 15 is stored in the constant register 36. More specifically, the data that is stored in the lower 16 bits 36e–36h of the constant register 36 is shifted to the upper 16 bits 36a–36d and the 16-bit constant located between the P1.0 field 12 and the P2.2 field 15 of the instruction register 10 is stored in the lowest-order 16-bits 36e–36h of the constant register 36.

Figure 6C:
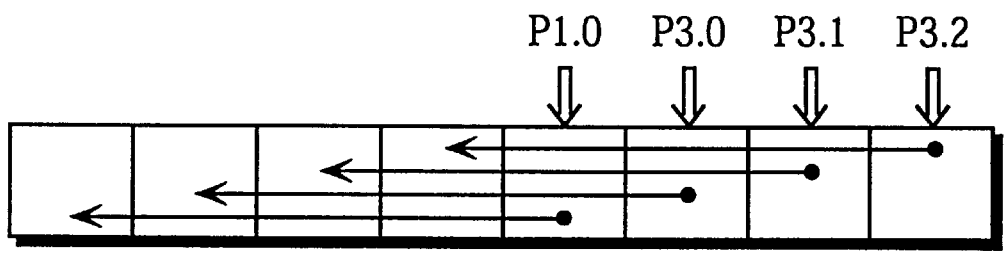

FIG. 6C shows a storage method for when the format decoder 21 detects that the value stored in the P0.0 field 11 is "5". This equates to the case when a 16-bit constant located in the P1.0 field 12 and between the P3.0 field 16 and the P3.2 field 18 is stored in the constant register 36. More specifically, the data that is stored in the lower 16 bits 36e–36h of the constant register 36 is shifted to the upper 16 bits 36a–36d and the 16-bit constant located in the P1.0 field 12 and between the P3.0 field 16 and the P3.2 field 18 of the instruction register 10 is stored in the lowest-order 16-bits 36e–36h of the constant register 36.

Figure 6D:
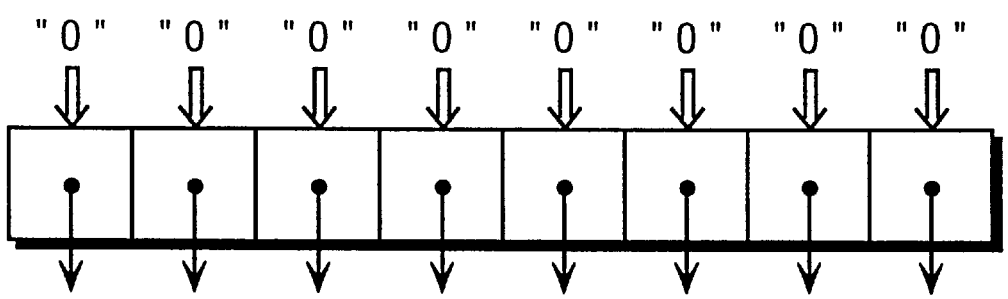

FIG. 6D shows a storage method for when the format decoder 21 detects that the value stored in the P0.0 field 11 is "2", "3", or "A", or when the instruction decoder 22 detects that the constant register (R15) is indicated by at least one of the P2.1 field 14, the P2.2 field 15, the P3.2 field 17, and the P3.3 field 18. This equates to the case where the value stored in the constant register 36 is reset to all zeros (which is to say, the constant register 36 is cleared), after the stored value of the constant register 36 has been used by at least one of a branch operation located in the P1.0 field 12, an operation in the first operation field 59 or an operation in the second operation field 60. More specifically, immediately after the stored value of the constant register 36 has been read out to one of the PC unit 33, the first operation unit 37 or the second operation unit 38, a 32-bit constant with the value "0" is written into the constant register 36.

Here, the value in the constant register 36 is cleared after being used to ensure that a value with a zero extension is always stored in the constant register 36. A zero extension here refers to the insertion of zeros that is performed when the effective number of bits of a value is below a predetermined number of bits, with zeros being inserted into the higher bit positions so that the value takes up the predetermined number of bits.

As described above, when the value in the P0.0 field 11 of the instruction register 10 is "0", "1", "4", or "5", the constant that is already stored in the constant register 36 is shifted and a new value is stored. Also, after the value stored in the constant register 36 is read out and used, this stored value is deleted. By doing so, the constant register 36 is able to successively accumulate constants until the next time its stored content is used.

Detailed Construction of the PC Unit 33

The following is a detailed description of the construction of the PC unit 33.

Figure 7:
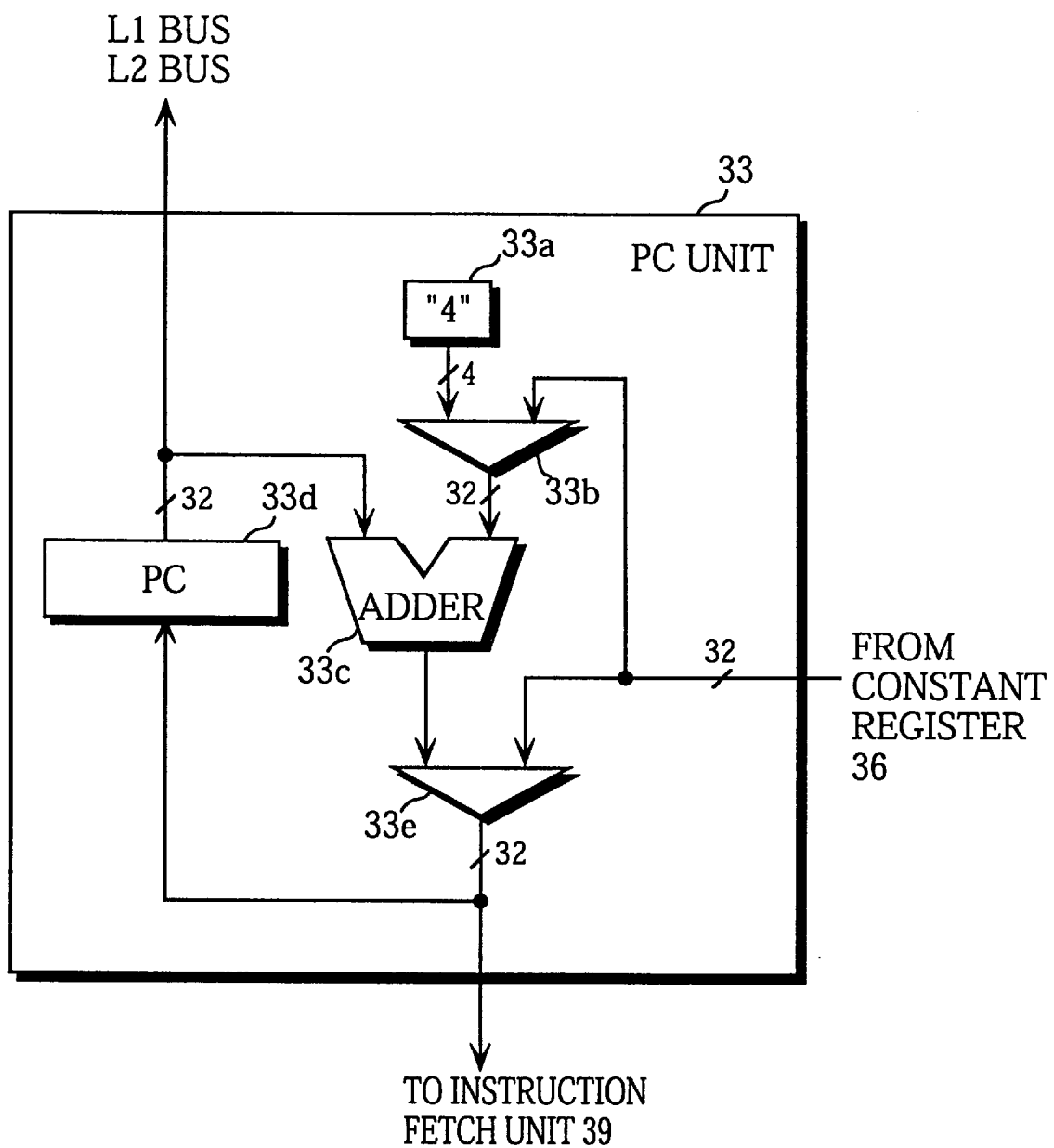
FIG. 7 is a block diagram showing the detailed construction of the PC unit 33 of the present processor.

FIG. 7 is a block diagram showing the construction of the PC unit 33 in detail. As shown in FIG. 7, the PC unit 33 is composed of a fixed value ("4") 33a, that is wiring which permanently carries the constant "4", a 2-input selector 33b, an adder 33c, a PC (Program Counter) 33d for storing an address of the next instruction to be decoded and executed, and a 4-input selector 33e.

In the PC unit 33, the selectors 33b and 33e operate in accordance with control signals from the decoder unit 20, so that the selector 33e outputs one of the following three types of values to the instruction fetch unit 39 as the effective address.

1. A Value Where "4" is Added to the Content of the PC 33d

This corresponds to when no branch is taken and a next instruction is to be executed in order, which is to say, when the decoding result for a present instruction is that no branch operation is indicated. The reason "4" is added is that the length of one instruction is four bytes, which is to say, 32 bits.

2. A Value Where the Content of the Constant Register 36 is Added to the Content of the PC 33d This corresponds to when the content of the constant register 36 is used as a relative address for branching, such as when the decoding result of the branch decoder 23 is that the P1.0 field 12 indicates a branch to a relative address.

3. A Value Given as the Content of the Constant Register 36

This corresponds to when the content of the constant register 36 is used as an absolute address for branching, such as when the decoding result of the branch decoder 23 is that the P1.0 field 12 indicates a branch to an absolute address.

As described above, the PC unit 33 includes a specialized adder 33c, and is constructed to directly use the value stored by the constant register 36, so that branch execution control can be performed with the stored value of the constant register 36 as a relative address or an absolute address in parallel with and independent of the operations performed by the first operation unit 37 and the second operation unit 38.

Operation of the Processor

The following is a description of the operation of the present processor when decoding and executing specific operations.

Figure 8:
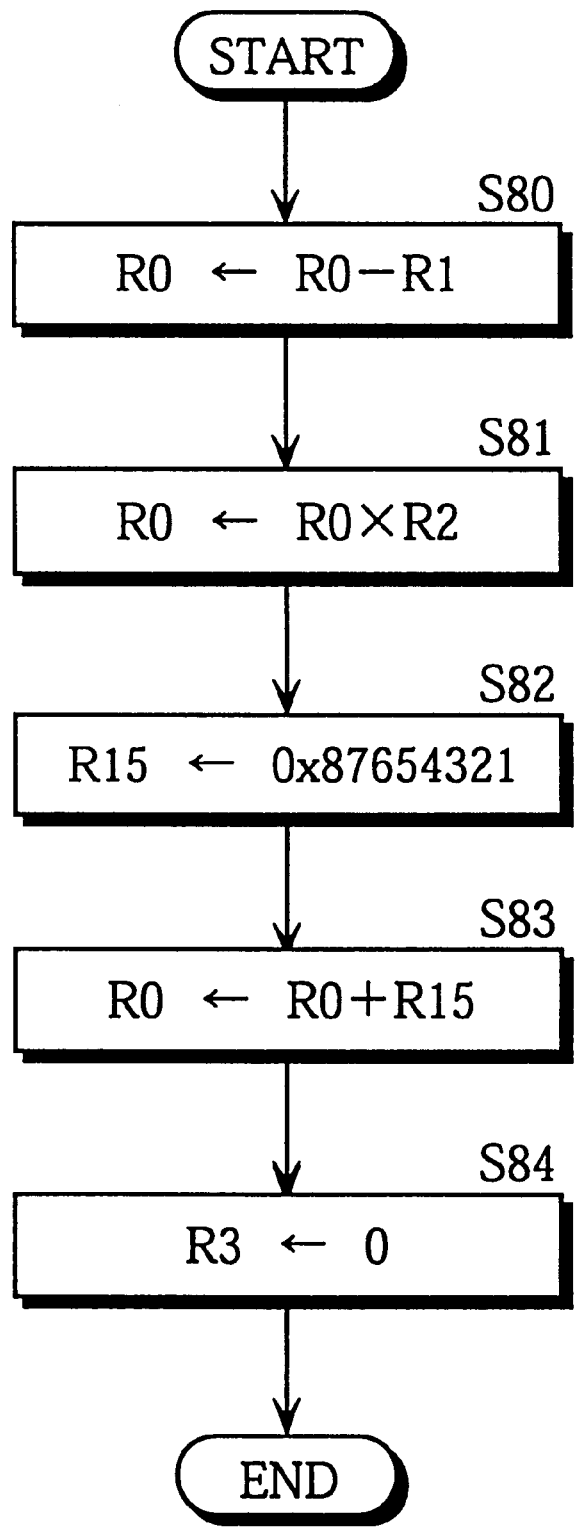
FIG. 8 is a flowchart showing a procedure that handles a 32-bit constant.

FIG. 8 is a flowchart showing an example of a procedure that handles 32-bit constants. First, the difference between the stored values of the registers R0 and R1 is found (step S80), and the result is multiplied by the stored value of R2 (step S81). The 32-bit constant "0x87654321" (the value "87654321" in hexadecimal) is then added to the result of this (steps S82, S83), and finally the register R0 is cleared (step S84).

FIG. 9 shows an example of a program that has the present processor perform the procedure shown in FIG. 8. The program is composed of the three instructions 71–73. In FIG. 9, one line corresponds to one instruction, and the content of each instruction is shown by mnemonics located in the separate fields of each instruction. In FIG. 9, the value of each constant is expressed in hexadecimal. Also, the legend fmtn (n=0–F)" shows the format code "n", while the legend "Rn (n=0–15)" shows the value stored in one of the registers in the register set 34. Of these, "R15" refers to the constant register 36.

Figure 10:
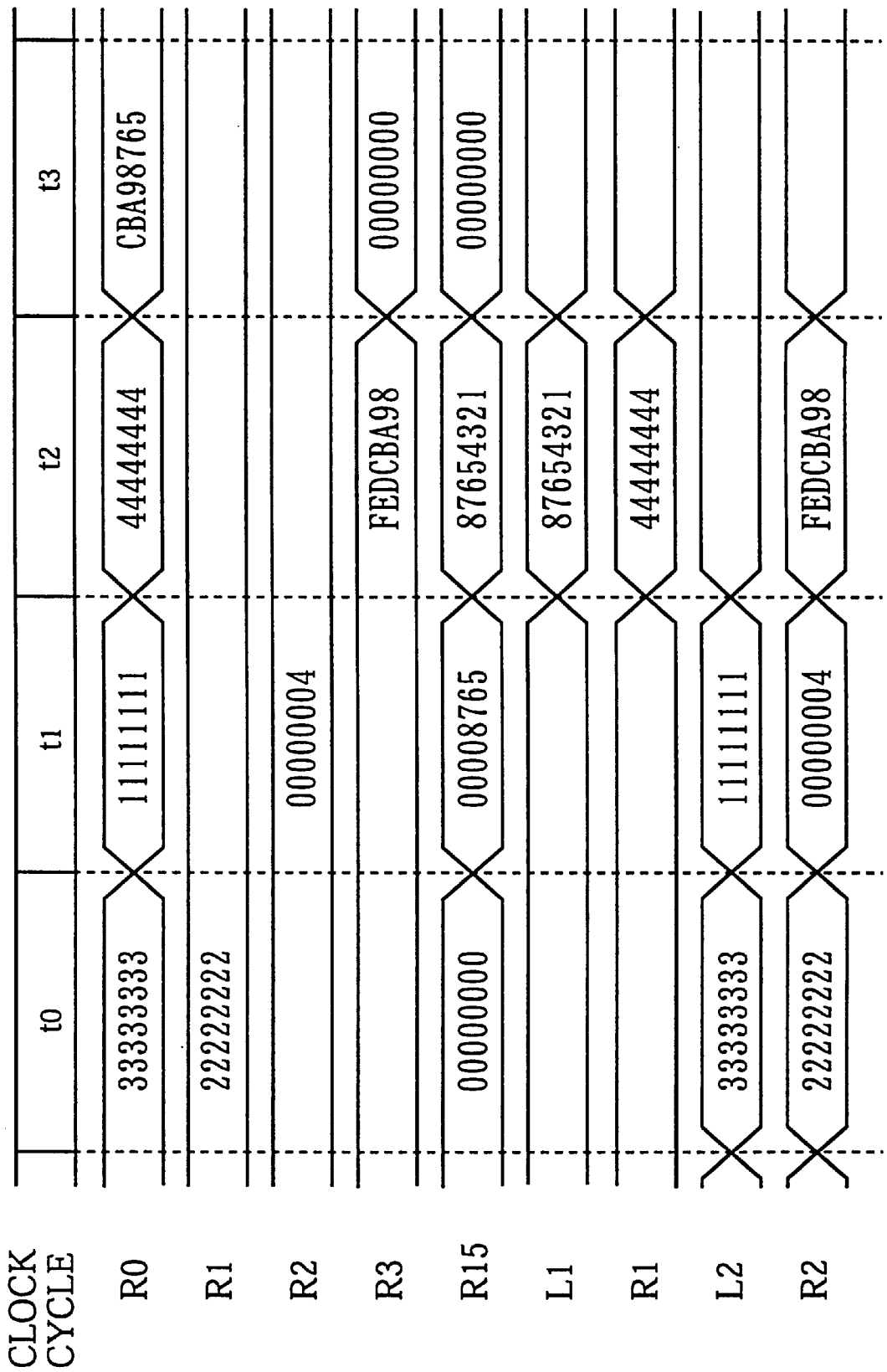
FIG. 10 is a timing chart showing the operation of the present processor when executing the program shown in FIG. 9.

FIG. 10 is a timing chart showing the operation of the present processor when executing the program shown in FIG. 9. This FIG. 10 shows the clock cycles, the content of the general registers R0–R3 and the register R15, and the data that flows on the four buses L1, R1, L2, and R2.

The following is an explanation of the operation of the present processor for each of the instructions 71 to 73, with reference to FIGS. 9 and 10.

Instruction 71

After the instruction 71 has been loaded into the instruction register 10, the present processor performs the operations shown in the clock cycles t0–t1 in FIG. 10. The format decoder 21 judges from the value "fmt4" of the P0.0 field 11 in the instruction register 10 that the present instruction is a twin operation instruction with the format code "4", and so controls the execution unit 30 so that the two operations described below are executed in parallel.
1. First Operation The constant register control unit 32 controls its eight internal selectors 32a–32h so that the 16-bit constant (0x8765) located between the P1.0 field 12 to the P2.2 field 15 is stored in the lower 16 bits of the constant register 36 according to the storage method shown in FIG. 6B. Accordingly, the content of the register R15 changes from "0x00000000" to "0x00008765" as shown in the clock cycles t0–t1 in FIG. 10.
2. Second Operation The second operation unit 38 receives an input of the stored value "0x33333333" of the general register R0 and the stored value "0x22222222" of the general register R1, and after subtracting the latter from the former, stores the result in the general register R0. As a result, the stored content of the general register R0 changes from the value "0x33333333" to the value "0x11111111" in the clock cycles t0–t1 shown in FIG. 10.

Instruction 72

Next, after the instruction 72 has been loaded into the instruction register 10, the present processor operates as shown in clock cycles t1–t2 in FIG. 10. The format decoder 21 judges from the value "fmt4" of the P0.0 field 11 in the instruction register 10 that the present instruction is a twin operation instruction with the format code "4", and so controls the execution unit 30 so that the two operations described below are executed in parallel.
1. First Operation The constant register control unit 32 controls its eight internal selectors 32a–32h so that the 16-bit constant (0x4321) located between the P1.0 field 12 to the P2.2 field 15 is stored in the lower 16 bits of the constant register 36 according to the storage method shown in FIG. 6B. Accordingly, the content of the register R15 changes from "0x00008765" to "0x87654321" as shown in the clock cycles t1–t2 in FIG. 10.
2. Second Operation The second operation unit 38 receives an input of the stored value "0x00000004" of the general register R2 and the stored value "0x11111111" of the general register R0, and multiplies the two together before storing the result in the general register R0. As a result, the stored content of the general register R0 changes from the value "0x11111111" to the value "0x44444444" in the clock cycles t1–t2 shown in FIG. 10.

Instruction 73

Next, after the instruction 73 has been loaded into the instruction register 10, the present processor operates as shown in clock cycles t2–t3 in FIG. 10. The format decoder 21 judges from the value "fmt7" of the P0.0 field 11 in the instruction register 10 that the present instruction is a twin operation instruction with the format code "7", and so controls the execution unit 30 so that the two operations described below are executed in parallel.
1. First Operation The first operation unit 37 receives an input of the stored value "0x87654321" of the general register R15 and the stored value "0x44444444" of the general register R0, and adds the two together before storing the result in the general register R0. As a result, the stored content of the general register R0 changes from the value "0x44444444" to the value "0xCBA98765" in the clock cycles t2–t3 shown in FIG. 10.
2. Second Operation The second operation unit 38 receives an input of the 8-bit constant ("0x00") that is located in the P1.0 field 12 and the P3.1 field 17 and allows this constant to pass so that it is stored in the general register R3. As a result, the content of the general register R3 changes from the previously held value "0xFEDCBA98" to "0x00000000", as shown for the clock cycles t2–t3 in FIG. 10.

As described above for the present processor, the 32-bit constant "0x87654321" is split into two parts that are arranged into the two instructions 71 and 72, with these parts being successively stored in the constant register 36 by shifting its stored value. This stored constant is then used according to the third instruction, instruction 73. By doing so, the procedure shown in the flowchart of FIG. 8 can be executed by the three instructions 71–73.

The following is an explanation of the operation of the present processor using a different program that deals with 16-bit constants.

FIG. 11 shows an example of a program that handles a 16 bit constant. This program is composed of the five instructions 74 to 78.

The operation of the present processor for each of the instructions 74 to 78 is as described below.

Instruction 74

When the instruction 74 has been loaded into the instruction register 10, the format decoder 21 judges from the value "fmt0" of the P0.0 field 11 in the instruction register 10 that the present instruction is a triple operation instruction with the format code "0", and so controls the execution unit 30 so that the three operations described below are executed in parallel.
1. First Operation
The constant register control unit 32 controls its eight internal selectors 32a–32h so that the 4-bit constant ("0x8") located in the P1.0 field 12 is stored in the lowest 4 bits of the constant register 36 according to the storage method shown in FIG. 6A.
2. Second Operation
The first operation unit 37 receives an input of the stored value of the general register R6, and allows this value to pass so that it is stored in the general register R1.
3. Third Operation
In the same way, the second operation unit 38 receives an input of the stored value of the general register R7, and allows this value to pass so that it is stored in the general register R2.

Instruction 75

When the instruction 75 has been loaded into the instruction register 10, the format decoder 21 judges from the value "fmt0" of the P0.0 field 11 in the instruction register 10 that the present instruction is a triple operation instruction with the format code "0", and so controls the execution unit 30 so that the three operations described below are executed in parallel.
1. First Operation
The constant register control unit 32 controls its eight internal selectors 32a–32h so that the 4-bit constant ("0x7") located in the P1.0 field 12 is stored in the lowest 4 bits of the constant register 36 according to the storage method shown in FIG. 6A. After this operation, the constant "0x87" is set in the lowest 8 bits of the constant register 36.
2. Second Operation
The first operation unit 37 receives an input of the stored values of the general register R0 and the general register R1, and adds these values together. The first operation unit 37 stores the addition result in the general register R1.
3. Third Operation
In the same way, the second operation unit 38 receives an input of the stored values of the general register R0 and the general register R2, and adds these values together. The second operation unit 38 stores the addition result in the general register R2.

Instructions 76, 77

Instructions 76 and 77 are executed in the same way as described above, and as a result the constant "0x8765" is stored in the lower 16 bits of the constant register 36.

Instruction 78

Once the instruction 78 has been loaded into the instruction register 10, the present processor operates in the same way as when processing instruction 73.

As described above for the present processor, the 16-bit constant "0x8765" is split into four parts that are arranged into the instructions 74–77, with these parts being successively stored in the constant register 36 by shifting its stored value. This stored constant is then used according to the fifth instruction, instruction 78.

Comparison with a Standard Processor

The following is a description of the processing performed by a standard processor for a program with the same processing content as shown in FIGS. 9 and 11 and a comparison with the processing of the present invention. Here, the expression "standard processor" refers to a processor that executes instructions whose word length is fixed at 32 bits, and is the same as the present processor, except for the lack of a construction, such as the constant register 36 and the constant register control unit 32, for accumulating constants that have been divided between instructions.

FIG. 12A shows the field definition of the instructions that are executed by a standard processor, while FIG. 12B shows the format of the instructions. Here, it is supposed that the standard processor can execute three types of twin operation instruction, instructions 101–103, and one type of single operation instruction, instruction 104.

FIG. 13 shows an example of a program to be executed by the standard processor. This program has the same processing content as the program shown in FIG. 9, which is to say the same procedure as the flowchart shown in FIG. 8.

As can be seen by comparing FIG. 13 and FIG. 9, the program for the standard processor includes two more instructions that the program for the processor of the present invention.

The reason the "nop" codes are included in the instructions 105 and 106 is that the instruction 106 uses the operation result of the instruction 105, so that these instructions cannot be executed in parallel. Also, the reason the constant "0x87654321" is divided into an upper 16 bits and a lower 16 bits that are set in the constant register Ri (instructions 107 and 108) is that it is not possible to set a 32-bit constant and an operation code for a setting instruction in a single 32-bit instruction.

FIG. 14 also shows an example of a program for a standard processor. This program has the same processing content as program shown in FIG. 11. As can be seen by comparing FIG. 14 and FIG. 11, the program for the standard processor includes one more instruction than the program for the processor of the present invention.

As described above, the instructions executed by the processor of the present invention have a highly efficient field structure whereby a maximum of three operations can be indicated using a comparatively short word length of 32 bits.

Accordingly, with the processor of the present invention, a 16-bit or 32-bit constant that has been divided across a plurality of instructions can be accumulated in the constant register 36 to restore the constant to its original form, with it then being used for a branch operation or arithmetic logic operation. Accordingly, when a small region is available in an instruction, this region can be effectively used for locating a part of a constant, so that the code size of the program can be reduced compared with when the same processing is performed by a standard processor.

Modifications of the Peripheral Circuit of the Constant Register 36

The following is a description of several modifications to the peripheral circuit of the constant register 36 shown in FIG. 5.

First Modification

Figure 15:
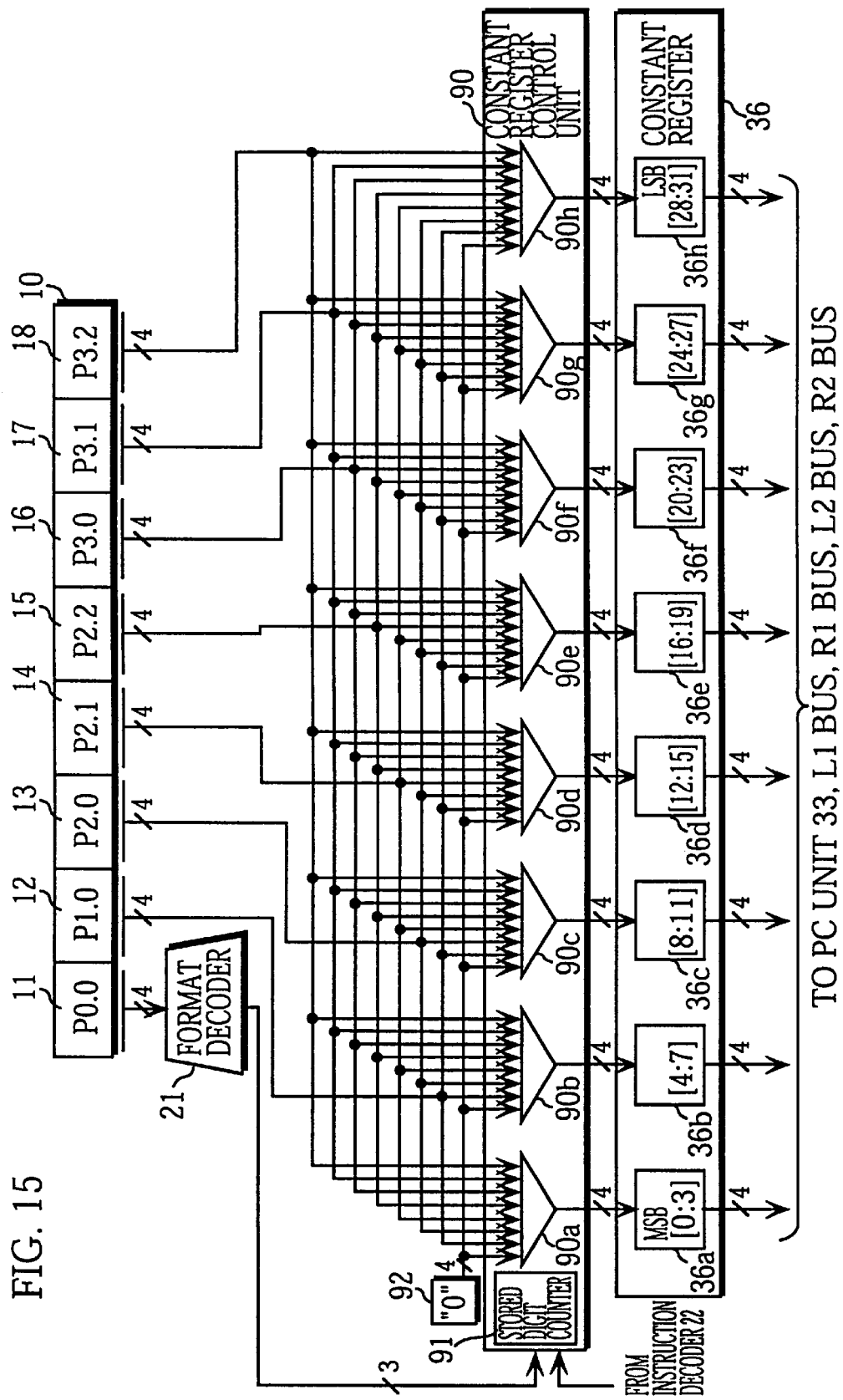
FIG. 15 is a block diagram showing the construction of the peripheral circuit of the constant register 36 in the first modification of the first embodiment.
Figures 16A, 16B, 16C, 16D, 16E, 16F, 16G, 16H:
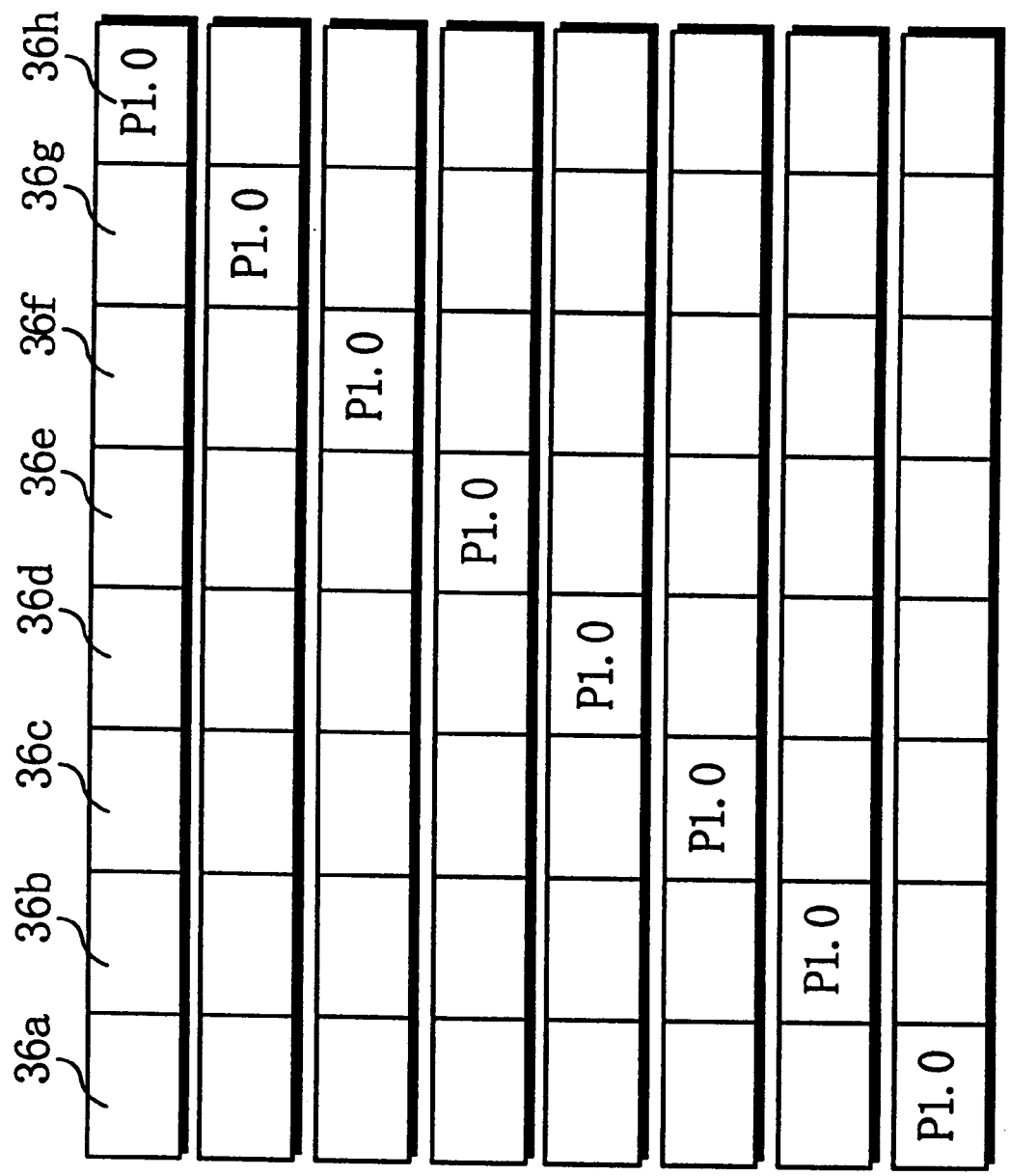
FIGS. 16A to 16H show the storage methods for the storage of a constant by the constant register control unit 90 when the format code is "0" or "1", corresponding to when the value of the stored digit counter 91 is "0"–"7"

FIG. 15 is a block diagram showing the construction of a peripheral circuit of the constant register 36 in the present modification and its connection pattern.

While the constant register control unit 32 shown in FIG. 5 has the constant register 36 operate as a shift register, the constant register control unit 90 shown in FIG. 15 differs in having the constant register 36 function as a parallel input register. More specifically, the differences lie in the connections between the constant register control unit 90 and the format decoder 21 and in the construction of the constant register control unit 90.

The constant register control unit 90 is composed of a stored digit counter 91 and eight input selectors 90a to 90h. The stored digit counter 91 is a 3-bit counter which shows the number of valid bits in the constant which is presently stored in the constant register 36 in nibble (4-bit) units.

On receiving an instruction from the format decoder 21 to store a constant located in the instruction register 10 into the constant register 36, the constant register control unit 90 refers to the present value of the stored digit counter 91 so that it can store the constant taken from the instruction register 10 at the appropriate position in the constant register 36. The constant register control unit 90 then updates the value stored by the stored digit counter 91. Similarly, on receiving notification from the format decoder 21 or the instruction decoder 22 that the stored value of the constant register 36 has been read and used in an operation, the constant register control unit 90 uses the fixed value ("0") 92 to store all zeros in the constant register 36. Once again, the constant register control unit 90 then updates the value stored by the stored digit counter 91.

In detail, on receiving an indication from the format decoder 21 that the value in the P0.0 field 11 is "0" or "1", the constant register control unit 90 controls the input selectors 90a to 90h so that the one nibble constant stored in the P1.0 field 12 is stored in the constant register 36 using one of the eight storage patterns shown in FIGS. 16A to 16H in accordance with the value "0" to "7" stored in the stored digit counter 91. Having done so, the constant register control unit 90 then increments the stored value of the stored digit counter 91 by "1".

Similarly, on receiving an indication from the format decoder 21 that the value in the P0.0 field 11 is "4", the constant register control unit 90 controls the input selectors 90a to 90h so that the four nibble constant stored between the P1.0 field 12 and the P2.2 field 15 is stored in the constant register 36 using one of the eight storage patterns shown in FIGS. 17A to 17H in accordance with the value "0" to "7" stored in the stored digit counter 91. Having done so, the constant register control unit 90 then increments the stored value of the stored digit counter 91 by "4".

On receiving an indication from the format decoder 21 that the value in the P0.0 field 11 is "5", the constant register control unit 90 controls the input selectors 90a to 90h so that the four nibble constant stored in the P1.0 field 12 and between the P3.0 field 16 and the P3.2 field 18 is stored in the constant register 36 using one of the eight storage patterns shown in FIGS. 18A to 18H in accordance with the value "0" to "7" stored in the stored digit counter 91. Having done so, the constant register control unit 90 then increments the stored value of the stored digit counter 91 by "4".

On receiving an indication from the format decoder 21 that the value in the P0.0 field 11 is "2", "3", or "A", or on receiving notification from the instruction decoder 22 that an operation has used the stored value of the constant register 36 as an operand, the constant register control unit 90 controls the input selectors 90a to 90h so that a 32-bit "0" constant is stored in the constant register 36 as shown in FIG. 19. Having done so, the constant register control unit 90 clears the stored value of the stored digit counter 91 to "0".

With the constant register control unit 90 in this first modification of the first embodiment, pieces of a constant that are distributed among a plurality of instructions in a specialized register can be reconstructed to form the original single constant, in the same way as with the constant register control unit 32.

However, unlike the constant register control unit 32, the constant register control unit 90 has the constant which is used by an operation located in a following instruction stored in higher-order bits in the constant register 36. Accordingly, when having the processor of this modification perform the procedure shown in FIG. 8, for example, the program shown in FIG. 9 needs to be amended so that the constant "0x8765" in instruction 71 and the constant "0x4321" in instruction 72 are interchanged.

Second Modification

Figure 20:
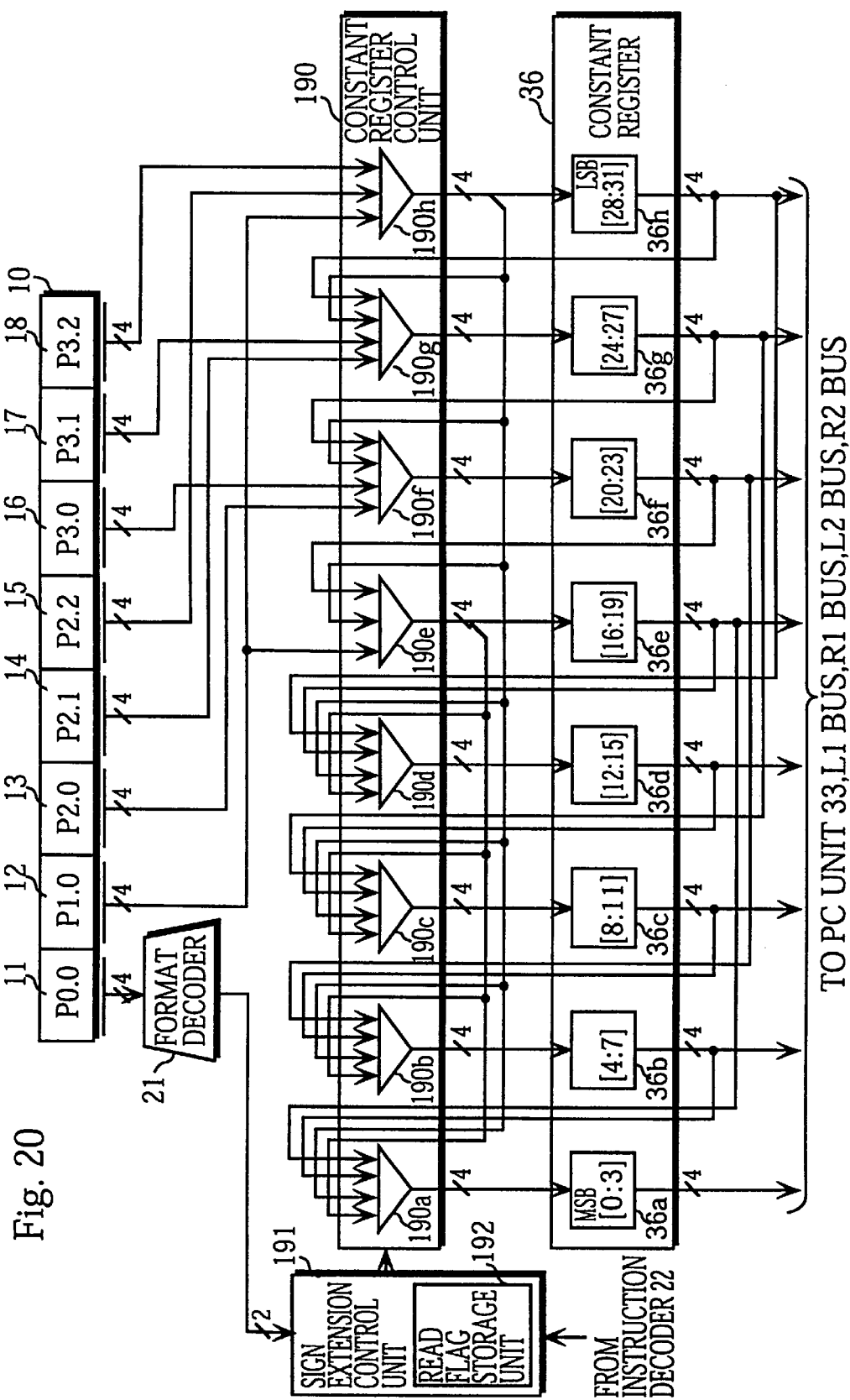
FIG. 20 is a block diagram showing the construction of the peripheral circuit of the constant register 36 in the second modification of the first embodiment.

FIG. 20 is a block diagram showing the construction of the peripheral circuit of the constant register 36 in the present modification and its connection pattern.

The constant register control unit 190 of this modification is similar to the constant register control unit 32 shown in FIG. 5 in that it has the constant register 36 operate so that a present stored value is shifted to allow a new value to be stored. The constant register control unit 190 differs, however, in that it adds a sign extension before storage in the constant register 36 and that it does not have the stored value of the constant register 36 cleared even when this value has been read.

The sign extension process mentioned here is a process which, when the number of valid bits in a value is less a predetermined number of bits, regards the most significant bit (hereinafter abbreviated to "MSB") in the value as a sign bit and fills the upper bit positions with the same logical value as the sign bit.

The sign extension control unit 191 judges whether a constant located in the instruction register 10 is the first constant to be stored after a read has been performed for the stored value of the constant register 36, and if so, controls the constant register control unit 190 so that the constant in the instruction register 10 is given a sign extension before being stored in the constant register 36. If not, the sign extension control unit 191 controls the constant register control unit 190 so that the constant in the instruction register 10 is stored in the constant register 36 as it is without a sign extension. To do so, the sign extension control unit 191 is internally provided with a read flag storage unit 192 for storing a 1-bit read flag, and updates the value of this read flag storage unit 192 in accordance with instructions from the format decoder 21 and the instruction decoder 22.

Figure 21:
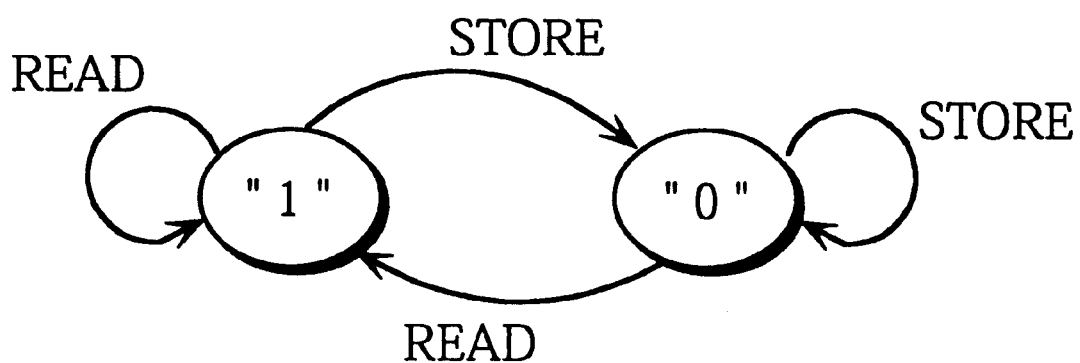
FIG. 21 is a state transition figure showing the changes in the value of the read flag storage unit 192 shown in FIG. 20.

FIG. 21 is a state transition chart showing the changes in the value of the read flag storage unit 192.

On receiving notification from the format decoder 21 or the instruction decoder 22 that the stored value of the constant register 36 has been read, the sign extension control unit 191 sets the value of the read flag storage unit 192 after the read at "1". On the contrary, on receiving notification from the format decoder 21 that a constant located in the instruction register 10 has been stored into the constant register 36, the sign extension control unit 191 sets the stored value of the read flag storage unit 192 at "0". The sign extension control unit 191 refers to the read flag storage unit 192 when storing a new constant in the constant register 36, and adds a sign extension to the constant before storing in the constant register 36 if the value of the read flag storage unit 192 is "1".

It should be noted here that in FIG. 20, the signal lines that branch from the outputs of the selector 190h and the selector 190e to other selectors are signal lines that only correspond to the highest of the four bits outputted by the respective selectors.

FIGS. 22A to 22F show the changes in the stored values of the constant register 36 and the read flag storage unit 192 in this second modification of the first embodiment.

FIG. 22A shows the content of the constant register 36 and the read flag storage unit 192 immediately after the constant "0x87654321" has been read from the constant register 36, while FIGS. 22B to 22E show the content of the constant register 36 and the read flag storage unit 192 immediately after the 4-bit constants "0x8", "0x8", "0x7", "0x6", and "0x5" have been stored in the constant register 36. FIG. 22F, meanwhile, shows the content of the constant register 36 and the read flag storage unit 192 immediately after the value "0xFFFF8765" stored in FIG. 22E has been read from the constant register 36.

As described above, this second modification of the first embodiment has a sign extension control unit 191 which monitors the need to add a sign extension using the read flag storage unit 192, so that when a constant is divided and split between a plurality of instructions, the constant can be accumulated in the constant register 36 and so restored to its original value with a sign extension.

Third Modification

Figure 23:
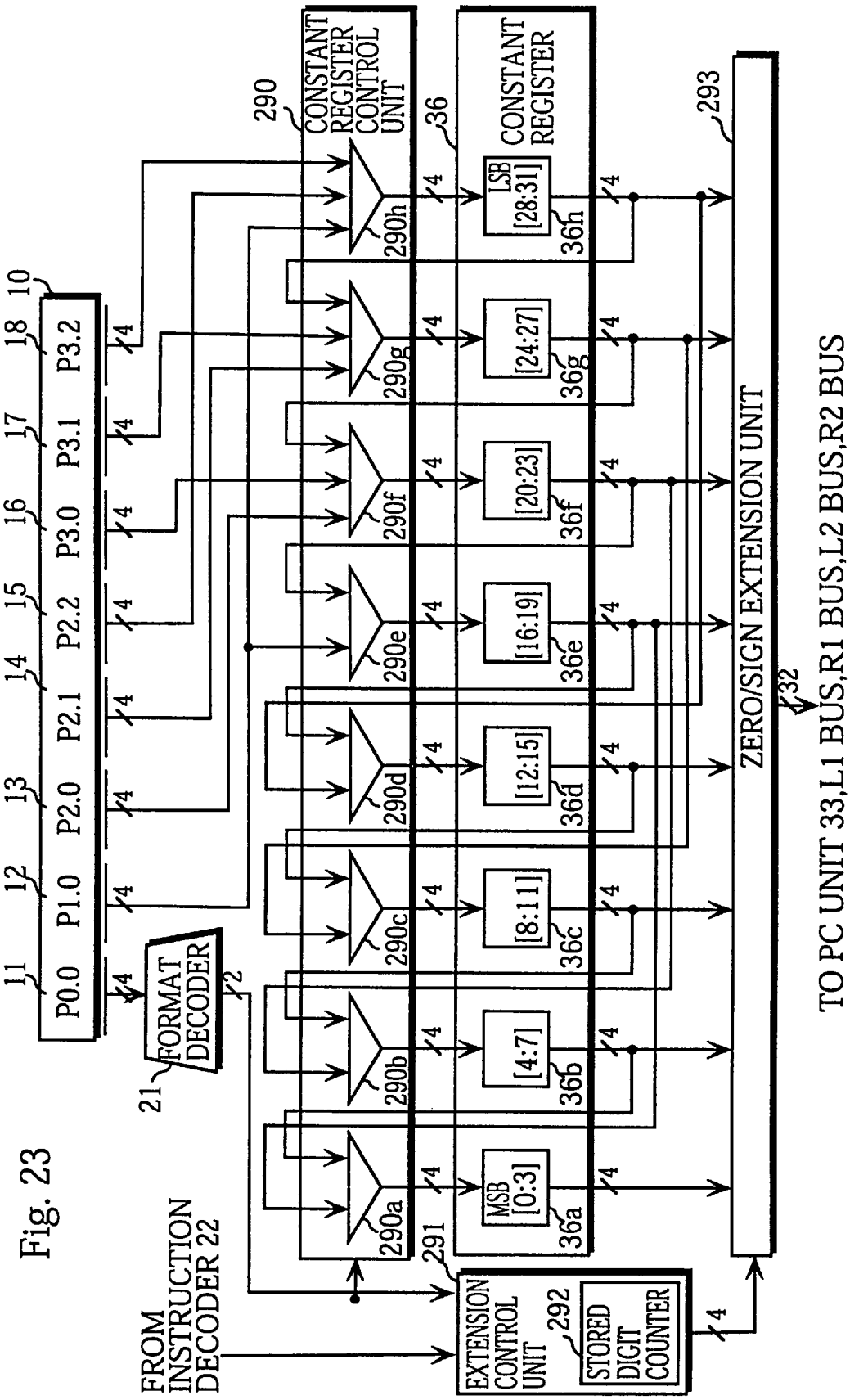
FIG. 23 is a block diagram showing the construction of the peripheral circuit of the constant register 36 in the third modification of the first embodiment.

FIG. 23 is a block diagram showing the construction of the peripheral circuit of the constant register 36 in the present modification and its connection pattern.

The constant register control unit 290 of this modification is similar to the constant register control unit 190 in the second modification in that it has the constant register 36 operate so that a present stored value is shifted to allow a new value to be stored and in that it adds a sign extension. The difference with the second modification is that sign extension is not performed when storing a constant in the constant register 36, but is performed when reading a constant from the constant register 36.

In the same way, when the peripheral circuit of the constant register 36 of the present modification and its connection pattern are compared with the peripheral circuit and connection pattern shown in FIG. 5, it can be seen that there is no construction for storing all zeros in the constant register 36 in this third modification and that an extension control unit 291 and a zero/sign extension unit 293 are newly provided in this third modification.

The constant register control unit 290 performs the same operations as the constant register control unit 32 shown in FIG. 5, except that it does not clear the stored value of the constant register 36.

When a constant that is read out from the constant register 36, the extension control unit 291 controls the zero/sign extension unit 293 so that the read constant is given a sign extension or a zero extension as appropriate. To do so, the extension control unit 291 is internally provided with a stored digit counter 292 which is a 3-bit counter. The stored digit counter 292 stores the number of valid bits in the constant stored in the constant register 36 in nibble units. On receiving an indication from the format decoder 21 that a new constant is to be stored in the constant register 36, the extension control unit 291 increments the stored digit counter 292 by the number of nibbles in the new constant. On receiving notification from the format decoder 21 or the instruction decoder 22 that the stored value of the constant register 36 has been read out, the extension control unit 291 resets the value of the stored digit counter 292.

The extension control unit 291 outputs a 1-bit control signal that indicates the required type of extension (which is to say, sign extension or zero extension) in accordance with an indication received from the instruction decoder 22 and outputs a 3-bit control signal showing the value of the stored digit counter 292 to the zero/sign extension unit 293.

The zero/sign extension unit 293 has the 32-bit stored value outputted by the constant register 36 as an input and performs either sign extension or zero extension on this value according to the type of extension and number of value bits (expressed in nibble units) that are indicated by the extension control unit 291. More specifically, when the required type of extension indicated by the extension control unit 291 is sign extension, the zero/sign extension unit 293 outputs a value obtained by copying a logical value of a bit that corresponds to the highest-order bit out of the number of valid bits indicated by the extension control unit 291 into all bits in the outputted 32-bit constant that have a higher order than the indicated number of valid bits. When the required type of extension is zero extension, meanwhile, the zero/sign extension unit 293 outputs a value obtained by writing zeros into all bits that have a higher order than the indicated number of valid bits.

As one example, when the stored value of the constant register 36 is "0x87654321", the requested type of extension is sign extension and the number of valid bits is four nibbles, the zero/sign extension unit 293 outputs the value "0x00004321".

As described above, this third embodiment of the first embodiment is able to accumulate and restore a constant that has been divided and split between a plurality of instructions in the constant register 36, and has the value in this constant register 36 used in a branch or other operation after first adding a sign extension or a zero extension.

Fourth Modification

Figure 24:
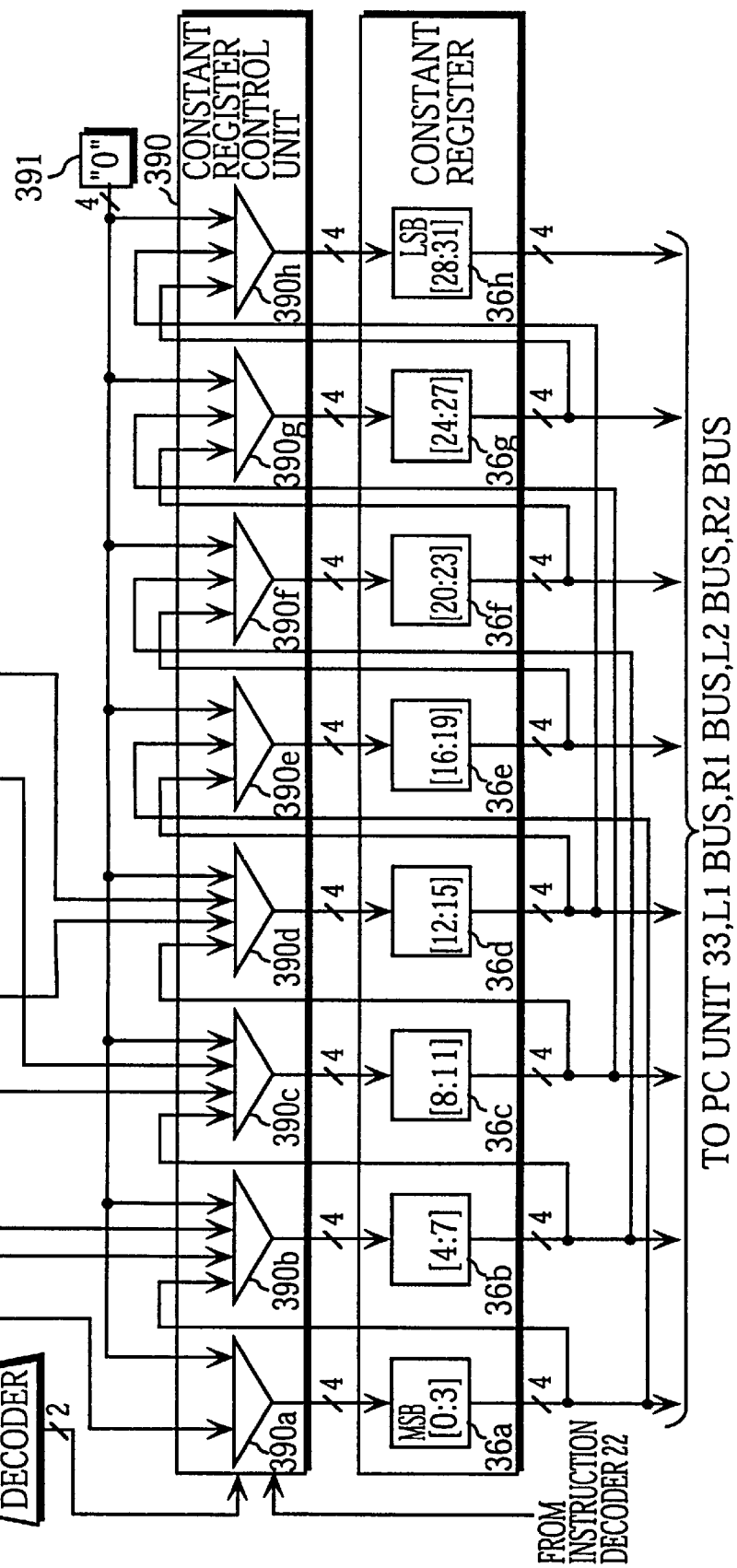
FIG. 24 is a block diagram showing the construction of the peripheral circuit of the constant register 36 in the fourth modification of the first embodiment.

FIG. 24 is a block diagram showing the construction of the peripheral circuit of the constant register 36 in the present modification and its connection pattern.

The constant register control unit 390 of this modification is similar to the constant register control unit 32 shown in FIG. 5 in that it has the constant register 36 operate so that a present stored value is shifted to allow a new value to be stored. The difference, however, lies in the method used to perform this shifting and in the storage position in the constant register 36. More specifically, in addition to shifting the stored value of the constant register 36 from the high-order bit positions to the low-order bit positions, a new constant located in the instruction register 10 is stored in the high-order bit positions of the constant register 36. It should be noted here that the stored value of the constant register 36 is cleared after being read, in the same way as in the construction shown in FIG. 5.

As can be seen by comparing FIG. 24 with FIG. 5, the connection patterns for the constant register 36 are symmetrical in the direction of the bit positions, with the same components being used.

With this fourth modification, a value which sets all lower-order bits in the constant register 36 to zero can be set into the constant register 36 using a smaller storage circuit. As one example, when the new 32-bit constant "0x87650000" is set after clearing the stored value of the constant register 36, with the connection pattern of FIG. 5, two 16-bit constants "0x8765" and "0x0000" need to be stored. With the connection pattern of FIG. 24, however, only one 16-bit constant "0x8765" needs to be stored. This is useful when setting numeric values with a fixed decimal point where all values following the decimal point may be zero.

Fifth Modification

The processor of the fifth modification is similar to the processor of the first embodiment in that the stored value of the constant register 36 is shifted to allow a new value to be stored. This fifth embodiment differs, however, by having a new function whereby a new 32-bit constant, which is given by linking a constant directly indicated as the source operand 54 of the first operation field 59 and the constant that is already stored in the constant register 36, is supplied to the first operation unit 37 as the effective source operand of the first operation field 59.

The following is a detailed description of this difference with the first embodiment.

Figure 25:
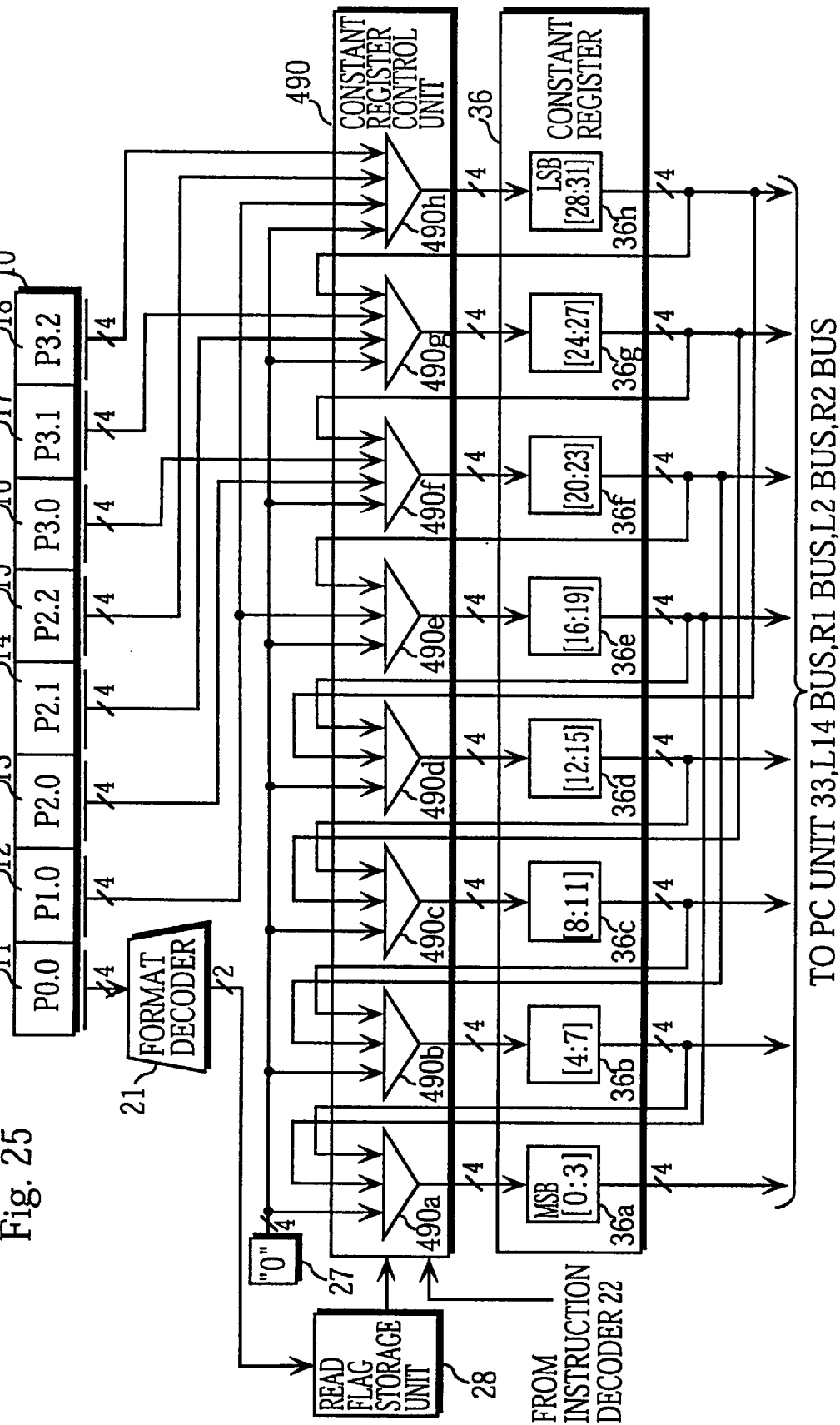
FIG. 25 is a block diagram showing the construction of the peripheral circuit of the constant register 36 in the fifth modification of the first embodiment

FIG. 25 is a block diagram showing the construction of the periphery circuit of the constant register 36 in this fifth modification and its connection pattern.

The read flag storage unit 28 is a 1-bit memory that stores the internal state of the constant register 36. This read flag storage unit 28 is used when judging whether to clear the stored value of the constant register 36.

Figure 26:
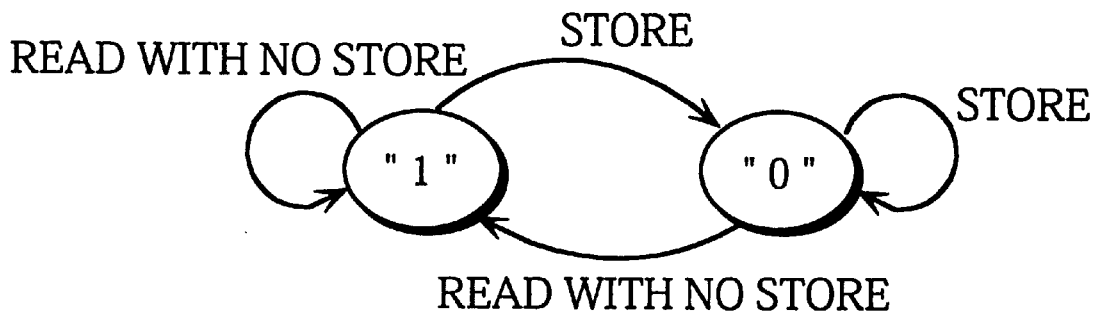
FIG. 26 is a state transition figure showing the changes in the value of the read flag storage unit 28.

FIG. 26 is a state transition figure showing the changes in the value of the read flag storage unit 28. The value of the read flag storage unit 28 is set at "1" when the stored value of the constant register 36 has been read but the storage of a constant into the constant register 36 has not been performed. When the value of the read flag storage unit 28 is "1" and an operation indicating the storage of a constant is specified, the constant register control unit 490 performs control so that the stored value of the constant register 36 is cleared before the new constant is stored. After this, the value of the read flag storage unit 28 is set at "0".

By providing a read flag storage unit 28 in this way, it is possible to judge whether a zero clear is required when storing a new constant, so that it is no longer necessary to clear the stored value of the constant register 36 immediately after this value is read. By doing so, the stored value of the constant register 36 can be reused in its entirety, as described below.

The processor of the present modification performs the following operations for the instruction formats shown in FIGS. 2B to 2D in accordance with the value of the read flag storage unit 28. It should be noted here that the processor of this modification has the value of the read flag storage unit 28 set at "1" as its initial state.

Processing for the Format Code (value in the P0.0 field 11) "0"

(1) When the Value of the Read Flag Storage Unit 28 is "1"

First, the operation "op1" specified by the first operation field 59 is executed. When doing so, the source operand is "Rs1" and the destination operand is "Rd1".

At the same time, the operation specified by the second operation field 60 is executed. When doing so, the source operand is "Rs2" and the destination operand is "Rd2".

Next, the constant "const" specified by the P1.0 field 52 is stored in the area 36h of the constant register 36, and the areas 36a to 36g are cleared to zero. After this, the stored value of the read flag storage unit 28 is set at "0".

(2) When the Value of the Read Flag Storage Unit 28 is "0"

First, the operation "op1" specified by the first operation field 59 is executed. When doing so, the source operand is "Rs1" and the destination operand is "Rd1".

At the same time, the operation specified by the second operation field 60 is executed. When doing so, the source operand is "Rs2" and the destination operand is "Rd2".

Next, the value is the areas 36b to 36h of the constant register 36 is shifted 4 bits to the left so as to be stored in the areas 36a to 36g. The constant "const" specified by the P1.0 field 52 is then stored in the area 36h of the constant register 36. The value of the read flag storage unit 28 is kept at "0".

Processing for the Format Code "1"

(1) When the Value of the Read Flag Storage Unit 28 is "1"

First, the operation "op1" specified by the first operation field 59 is executed. When doing so, the destination operand is "Rd1" and the source operand is the 4-bit constant "const1" that is specified by the P2.1 field 54.

At the same time, the operation specified by the second operation field 60 is executed. When doing so, the source operand is "Rs2" and the destination operand is "Rd2".

Next, the constant "const" specified by the P1.0 field 52 is stored in the area 36h of the constant register 36, and the areas 36a to 36g are cleared to zero. After this, the stored value of the read flag storage unit 28 is set at "0".

(2) When the Value of the Read Flag Storage Unit 28 is "0"

First, the operation "op1" specified by the first operation field 59 is executed. When doing so, the destination operand is "Rd1" and the source operand is a 32-bit constant obtained by linking the stored value of the 36b to 36h areas of the constant register 36 with the 4-bit constant "const1" that is specified by the P2.1 field 54. After the content of the constant register 36 has been read, the read flag storage unit 28 is set at "1".

At the same time, the operation specified by the second operation field 60 is executed. When doing so, the source operand is "Rs2" and the destination operand is "Rd2".

Next, since the value of the read flag storage unit 28 has been set at "1", the constant "const" specified by the P1.0 field 52 is stored in the area 36h of the constant register 36, and the areas 36a to 36g are cleared to zero. After this, the stored value of the read flag storage unit 28 is set at "0".

Processing for the Format Code "2"

(1) When the Value of the Read Flag Storage Unit 28 is "1"

First, the operation "op1" specified by the first operation field 59 is executed. When doing so, the source operand is "Rs1" and the destination operand is "Rd1".

At the same time, the operation specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is kept at "1".

(2) When the Value of the Read Flag Storage Unit 28 is "0"

First, the operation "op1" specified by the first operation field 59 is executed. When doing so, the source operand is "Rs1" and the destination operand is "Rd1".

At the same time, the operation specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is set at "1".

Processing for the Format Code "3"

(1) When the Value of the Read Flag Storage Unit 28 is "1"

First, the operation "op1" specified by the first operation field 59 is executed. When doing so, the destination operand is "Rd1" and the source operand is the 4-bit constant "const1" that is specified by the P2.1 field 54.

At the same time, the operation specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is kept at "1".

(2) When the Value of the Read Flag Storage Unit 28 is "0"

First, the operation "op1" specified by the first operation field 59 is executed. When doing so, the destination operand is "Rd1" and the source operand is the 4-bit constant "const1" that is specified by the P2.1 field 54.

At the same time, the operation specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is set at "1".

Processing for the Format Code "4"

(1) When the Value of the Read Flag Storage Unit 28 is "1"

First, the operation specified by the second operation field 60 is executed. When doing so, the source operand is "Rs2" and the destination operand is "Rd2".

Next, the sixteen bit constant "const" that is specified between the P1.0 field 52 and the P2.2 field 55 is stored in the 16-bit area 36e–36h of the constant register 36 and the content of the areas 36a–36d is cleared to zero. After this, the value of the read flag storage unit 28 is set at "0".

(2) When the Value of the Read Flag Storage Unit 28 is "0"

First, the operation specified by the second operation field 60 is executed. When doing so, the source operand is "Rs2" and the destination operand is "Rd2".

Next, the value stored in the lower sixteen bits 36e–36h of the constant register 36 is shifted to the higher sixteen bits 36a–36d, and the sixteen bit constant "const" that is specified between the P1.0 field 52 and the P2.2 field 55 is stored in the lower sixteen bits 36e–36h of the constant register 36. After this, the value of the read flag storage unit 28 is kept at "0".

Processing for the Format Code "5"

(1) When the Value of the Read Flag Storage Unit 28 is "1"

First, the operation specified by the first operation field 59 is executed. When doing so, the source operand is "Rs1" and the destination operand is "Rd1".

Next, the sixteen bit constant "const" that is specified by the P1.0 field 52 and the P3.0 field 56-P3.2 field 58 is stored in the 16-bit area 36e–36h of the constant register 36 and the content of the areas 36a–36d is cleared to zero. After this, the value of the read flag storage unit 28 is set at "0".

(2) When the Value of the Read Flag Storage Unit 28 is "0"

First, the operation specified by the first operation field 59 is executed. When doing so, the source operand is "Rs1" and the destination operand is "Rd1".

Next, the value stored in the lower sixteen bits 36e–36h of the constant register 36 is shifted to the higher sixteen bits 36a–36d, and the sixteen bit constant "const" that is specified the P1.0 field 52 and the P3.0 field 56-P3.2 field 58 is stored in the lower sixteen bits 36e–36h of the constant register 36. After this, the value of the read flag storage unit 28 is kept at "0".

Processing for the Format Code "6"

(1) When the Value of the Read Flag Storage Unit 28 is "1"

First, the operation "op1" specified by the first operation field 59 is executed. When doing so, the destination operand is "Rd1" and the source operand is the 8-bit constant that is obtained by linking the 4-bit constant "const1" specified by the P1.0 field 52 and the 4-bit constant "const1" specified by the P2.1 field 54.

At the same time, the operation specified by the second operation field 60 is executed. When doing so, the source operand is "Rs2" and the destination operand is "Rd2".

(2) When the Value of the Read Flag Storage Unit 28 is "0"

First, the operation "op1" specified by the first operation field 59 is executed. When doing so, the destination operand is "Rd1" and the source operand is the 32-bit constant that is obtained by linking the value stored in the lower 24-bit area 36c–36h of the constant register 36 with the 4-bit constant "const1" specified by the P1.0 field 52 and the 4-bit constant "const1" specified by the P2.1 field 54. Since the content of the constant register 36 has been read, the value of the read flag storage unit 28 is set at "1".

At the same time, the operation specified by the second operation field 60 is executed. When doing so, the source operand is "Rs2" and the destination operand is "Rd2".

Processing for the Format Code "7"

(1) When the Value of the Read Flag Storage Unit 28 is "1"

First, the operation "op1" specified by the first operation field 59 is executed. When doing so, the source operand is "Rs1" and the destination operand is "Rd1".

At the same time, the operation specified by the second operation field 60 is executed. When doing so, the destination operand is "Rd2" and the source operand is the 8-bit constant that is obtained by linking the 4-bit constant "const1" specified by the P1.0 field 52 and the 4-bit constant "const1" specified by the P3.1 field 56.

(2) When the Value of the Read Flag Storage Unit 28 is "0"

First, the operation "op1" specified by the first operation field 59 is executed. When doing so, the source operand is "Rs1" and the destination operand is "Rd1".

At the same time, the operation specified by the second operation field 60 is executed. When doing so, the destination operand is "Rd2" and the source operand is the 32-bit constant that is obtained by linking the value stored in the lower 24-bit area 36c–36h of the constant register 36 with the 4-bit constant "const1" specified by the P1.0 field 52 and the 4-bit constant "const1" specified by the P3.1 field 56. Since the content of the constant register 36 has been read, the value of the read flag storage unit 28 is set at "1".

Processing for the Format Code "8"

(1) When the Value of the Read Flag Storage Unit 28 is "1"

First, the operation "op1" specified by the first operation field 59 is executed. When doing so, the destination operand is "Rd1" and the source operand is the 8-bit constant given by linking the 4-bit constant "const1" in the P1.0 field 52 and the 4-bit constant "const1" in the P2.1 field 54.

At the same time, the operation specified by the second operation field 60 is executed. When doing so, the destination operand is "Rd2" and the source operand is the 4-bit constant "const2" specified by the P3.1 field 57.

(2) When the Value of the Read Flag Storage Unit 28 is "0"

First, the operation "op1" specified by the first operation field 59 is executed. When doing so, the destination operand is "Rd1" and the source operand is the 32-bit constant that is obtained by linking the value stored in the lower 24-bit area of the constant register 36 with the 4-bit constant "const1" specified by the P1.0 field 52 and the 4-bit constant "const1" specified by the P2.1 field 54. Since the content of the constant register 36 has been read, the value of the read flag storage unit 28 is set at "1".

At the same time, the operation specified by the second operation field 60 is executed. When doing so, the destination operand is "Rd2" and the source operand is the 4-bit constant "const2" specified by the P3.1 field 57.

Processing for the Format Code "9"

(1) When the Value of the Read Flag Storage Unit 28 is "1"

First, the operation "op1" specified by the first operation field 59 is executed. When doing so, the destination operand is "Rd1" and the source operand is the 4-bit constant "const1" that is specified by the P2.1 field 54.

At the same time, the operation specified by the second operation field 60 is executed. When doing so, the destination operand is "Rd2" and the source operand is the 8-bit constant given by linking the 4-bit constant specified by the P1.0 field 52 with the 4-bit constant specified by the P3.1 field 57.

(2) When the Value of the Read Flag Storage Unit 28 is "0"

First, the operation "op1" specified by the first operation field 59 is executed. When doing so, the destination operand is "Rd1" and the source operand is the 32-bit constant obtained by linking the lower 28-bit area 36b–36h of the constant register 36 with the 4-bit constant "const1" that is specified by the P2.1 field 54. Since the content of the constant register 36 has been read, the read flag storage unit 28 is set at "1".

At the same time, the operation specified by the second operation field 60 is executed. When doing so, the destination operand is "Rd2" and the source operand is the 8-bit constant given by linking the 4-bit constant "const2" specified by the P1.0 field 52 with the 4-bit constant "const2" specified by the P3.1 field 57.

Processing for the Format Code "A"

(1) When the Value of the Read Flag Storage Unit 28 is "1"

First, the operation "op2" specified by the second operation field 60 is executed. When doing so, the destination operand is "Rd1" and the source operand is the 16-bit constant that is given by linking the 12-bit constant "const2" that is specified by the P2.0 field 53 to P2.2 field 55 with the 4-bit constant "const2" that is specified by the P3.1 field 57.

After this, it is judged whether the branch condition of the "cc" operation specified by the P1.0 field 52 is satisfied. If so, the PC unit 33 finds the branch destination address from the content of the constant register 36 and stores the result in the PC (program counter).

The stored value of the read flag storage unit 28 is kept at "1".

(2) When the Value of the Read Flag Storage Unit 28 is "0"

First, the operation "op2" specified by the second operation field 60 is executed. When doing so, the destination operand is "Rd1" and the source operand is the 16-bit constant that is given by linking the 12-bit constant "const2" that is specified by the P2.0 field 53 to P2.2 field 55 with the 4-bit constant "const2" that is specified by the P3.1 field 57.

After this, it is judged whether the branch condition of the "cc" operation specified by the P1.0 field 52 is satisfied. If so, the PC unit 33 finds the branch destination address from the content of the constant register 36 and stores the result in the PC (program counter).

The stored value of the read flag storage unit 28 is then set at "1".

Processing for the Format Code "B"

This instruction only indicates one instruction, and the content of the constant register 36 is not referred to, regardless of the value of the read flag storage unit 28. The operand of the operation is the 24 bit constant given by linking the 16-bit constant "const2" specified by the P1.0 field 52 to P2.2 field 55 with the 8-bit constant "const2" specified by the P3.1 field 57 to the P3.2 field 58.

The following is a detailed explanation of the operation of the processor of the present modification when decoding specific instructions.

Figure 27:
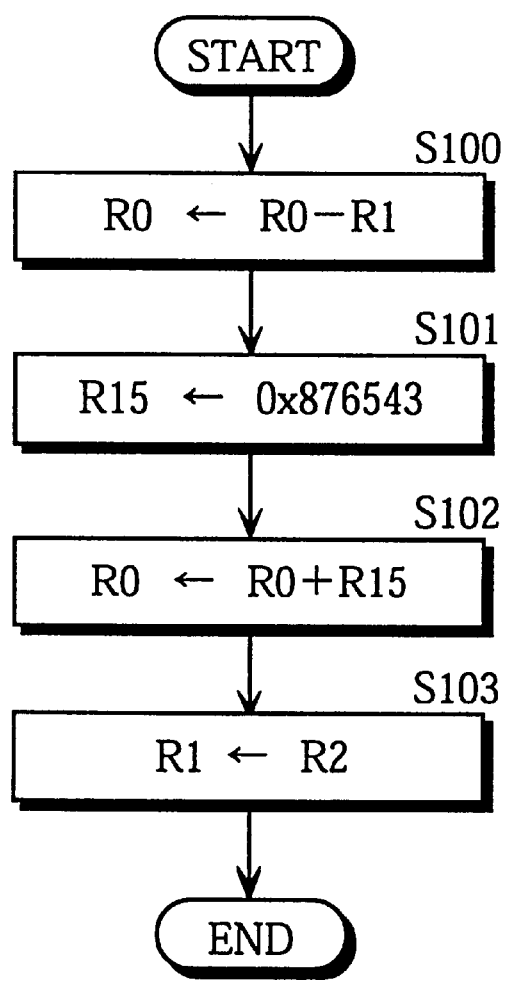
FIG. 27 is a flowchart showing an example of processing that handles a 24-bit constant.

FIG. 27 is a flowchart showing an example of processing which handles a 24-bit constant. First, the difference between the stored values of the registers R0 and R1 is found (step S100). The 24-bit constant "0x876543" is then added to the result of this (steps S101, S102), and finally the stored value of the register R2 is transferred to the register R1 (step S103).

Figure 28:
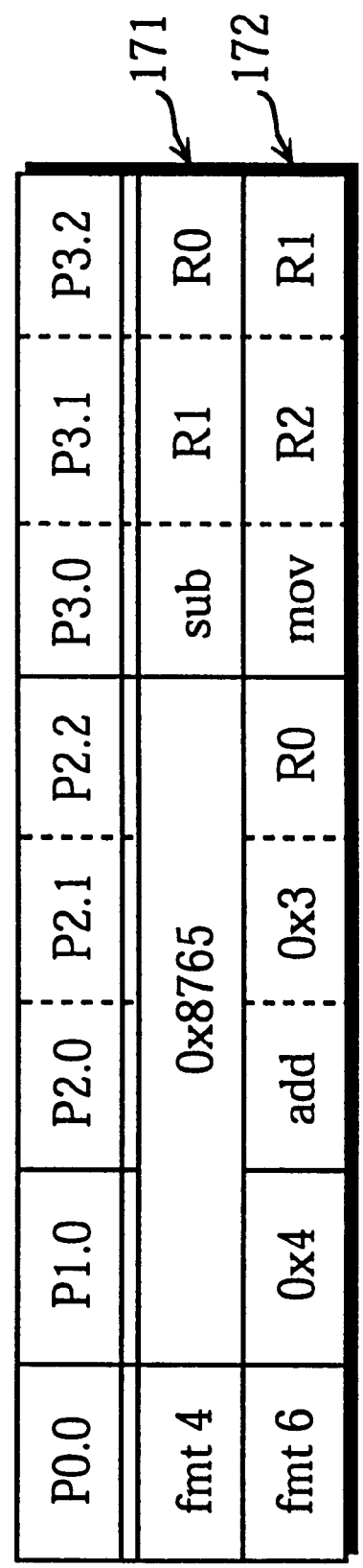
FIG. 28 shows an example of a program that has the processor of the fifth modification of the first embodiment perform the same processing content as the flowchart shown in FIG. 27.

FIG. 28 shows an example of a program that has the present processor perform the procedure shown in FIG. 27. The program is composed of the two instructions 171 and 172. The operation of the processor of the present modification is described below with reference to these two instructions 171 and 172.

It should be noted here that the stored value of the read flag storage unit 28 is "1" in the initial state.

Instruction 171

After the instruction 171 has been loaded into the instruction register 10, the format decoder 21 judges from the value "fmt4" of the P0.0 field 11 in the instruction register 10 that the present instruction is a twin operation instruction with the format code "4", and so controls the execution unit 30 so that the two operations described below are executed in parallel.

1. First Operation

The constant register control unit 490 controls its eight internal selectors 490a–490h so that the 16-bit constant (0x8765) located between the P1.0 field 12 to the P2.2 field 15 is stored in the lower 16 bits of the constant register 36 according to the storage method shown in FIG. 5C. The upper 16 bits of the constant register 36 are cleared to zero. After this, the stored value of the read flag storage unit 28 is set at "0".

2. Second Operation

The second operation unit 38 receives an input of the stored value of the general register R0 and the stored value of the general register R1, and after subtracting the latter from the former, stores the result in the general register R0.

Instruction 172

Next, after the instruction 172 has been loaded into the instruction register 10, the format decoder 21 judges from the value "fmt6" of the P0.0 field 11 in the instruction register 10 that the present instruction is a twin operation instruction with the format code "6", and so controls the execution unit 30 so that the two operations described below are executed in parallel.

1. First Operation

The operation in the P2.0 field 13 is an operation which uses a constant as an operand, and since the stored value of the read flag storage unit 28 is "0", a value ("0x00876543") given by linking the lower 24-bits ("0x008765") of the constant register 36, the 4-bit constant ("0x4") specified by the P1.0 field 12 and the 4-bit constant ("0x3") specified by the P2.1 field 14 is added to the stored value of the general register R0 and the result is stored back into the general register R0.

The value of the read flag storage unit 28 is then set a "1".

2. Second Operation

The second operation unit 38 receives an input of the stored value of the general register R2 and allows this value to pass so that it is stored in the general register R1.

As described above, a stored value of the constant register 36 is implicitly indicated and is linked with constants indicated by an operation to produce an operand that is used when executing the operation. As a result, an operation that handles a 24-bit constant can be performed using only two instructions.

FIG. 29 shows an example of a program to be executed by the processor of the first embodiment when executing the procedure in the flowchart shown in FIG. 27. As can be seen by comparing FIG. 29 and FIG. 28, the program for the processor of the first embodiment includes one more instruction than the program for the processor of the present modification. As can be seen from FIG. 29, the processor of the first embodiment is only able to perform one of the setting of a value in the constant register and the use of the stored value of the constant register in a single operation, so that in order to complete the processing shown in FIG. 27, the two instructions 173 and 174 are needed to set the 24-bit constant while a further instruction, instruction 175, is needed to use this constant. This means a total of three instructions, instructions 173–175, are needed. As a result, a no operation code "nop" has to be inserted, with this being located in the second operation field 60 of the instruction 175.

As described above, with the processor of the present modification, a constant which effectively becomes an operand can be generated from the constant that is accumulated in the constant register and a constant that is specified by an operation in an instruction, with it being possible to simultaneously execute an operation which uses this generated constant. By doing so, the required number of execution cycles can be reduced as compared to the first embodiment.

The processor which achieves the first object of the present invention has been described above by means of the first embodiment and the five modifications, although it should be obvious that the present invention is not limited to the examples described above. Further variations are described below.

(1) Constants which are stored into the constant register 36 may be stored according to a method where the constant is inserted into lower-order bits (shown in FIG. 5) or into the higher-order bits (shown in FIG. 24).

When storing a new constant into the constant register 36, a previously stored constant may be shifted (as shown in FIG. 5, for example), or the previously stored constant may be left where it is and the new constant stored at a different bit position (as shown in FIG. 15, for example).

As methods for extending the higher order bits of a constant, a zero extension method (shown in FIG. 5, for example), or a sign extension method (shown in FIG. 20, for example) may be used.

Regarding the timing at which zero extension or sign extension is performed, a method where constants are extended before storing in the constant register 36 (shown in FIG. 20, for example) and a method where constants are extended after reading from the constant register 36 (shown in FIG. 23, for example) are available.

As specific methods for performing zero extension, all zeros may be stored in the constant register 36 immediately after the stored value of the constant register 36 has been read (shown in FIG. 5, for example), or the fixed value "0" may be inserted when a constant is stored or read (shown in FIG. 23, for example).

By combining the storage position, shift execution/non-execution, extension method, extension timing, and execution/non-execution of a zero clear, a great number of variations of the present processor can be realized.

In the present embodiment, each processor only used one of the potential methods described above, although this is not a limitation for the present processor. As one example, a processor may have a construction whereby both zero extension and sign extension may be performed, with either extension method being selectively performed according to the operation code located in an instruction.

(2) In the above embodiment, an example dealing with a numeric constant is given, although it is of course equally possible for the invention to deal with a character constant. This is because a long character constant that is divided across a plurality of instructions can be accumulated by successively storing different parts of the character constant in the constant register 36.

(3) As can be seen from the instruction formats shown in FIGS. 2B to 2D of the above embodiment, only a 4-bit or a 16-bit constant can be stored in the constant register 36 by a single instruction in the above embodiment, although this is not a limitation for the present invention. As examples, it is equally possible to define an instruction format whereby a 12-bit or a 28-bit constant can be stored in the constant register 36 by a single instruction. To do so, it is only necessary to change the connection pattern of the peripheral circuit of the constant register 36.

(4) The processor of the present embodiment is described as a VLIW processor that has two operation units, 37 and 38, although the present invention may, of course, also be applied to a processor without VLIW architecture that includes only one operation unit and processes instructions that only specify a single instruction.

In particular, when using instructions of fixed word length, many instructions will be defined with unused areas. As one example, the RISC (Reduced Instruction Set Computer) processor "R2000" that is produced by MIPS TECHNOLOGIES, INC. executes instructions with a fixed word length of 32 bits. The instruction set of this processor includes instructions with unused areas, such as an ADD instruction where five bits are unused. With the present invention, the emergence of this kind of redundant area in a single operation instruction can be avoided.

(5) In the present embodiment, the 4-bit operation code "cc" refers to an indirect branch operation that refers to the stored value of the constant register 36 that is implicitly specified. This, however, is not a limitation for the present invention, so that the operation code "cc" may be an operation which branches to a relative address given as a fixed displacement from the present program counter or an operation which performs an indirect branch using a value stored in the general registers 35. When this is the case, the constant register control unit 32 need not clear the constant register 36 immediately after the stored value of the constant register 36 has been read, and instead may only clear the constant register 36 immediately after the execution of a branch instruction performed in response to the operation code "cc". Decisions, such as which operations are to be assigned to the 4-bit operation code "cc", are design choices, and can be easily realized by changing the instruction decoder 23 and the constant register control unit 32.

Second Embodiment

The following is a description of a processor which is a second embodiment of the present invention. The processor of the present embodiment realizes the second object of the present invention, and is characterized by having a function for avoiding unnecessary operations during context switching by only storing and restoring the value in the constant register when necessary. It should be noted here that in this embodiment, the prefix "0b" denotes that the number in question is expressed in binary.

Hardware Construction of the Processor

Figure 30:
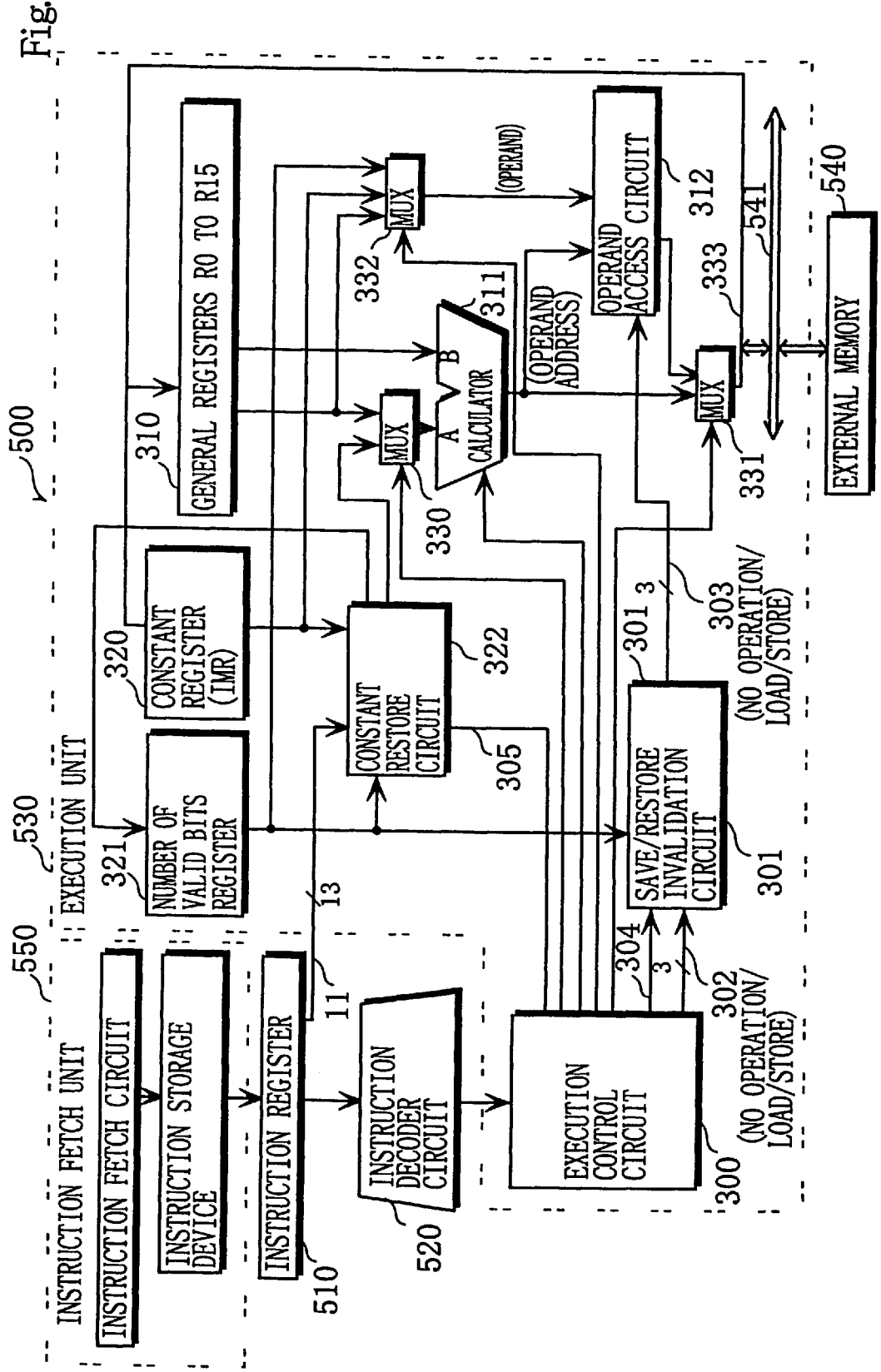
FIG. 30 is a b lock di agram showing the hardware construction of the processor 500 of the second embodiment.

FIG. 30 is a block diagram showing the hardware construction of the processor of this second embodiment. The present processor can be composed of an instruction register 510, an instruction decoder unit 520, an execution unit 530, and an instruction fetch unit 550. In FIG. 30, the peripheral circuit which is connected to the present processor 500, which is to say the external memory 540 that is used for saving contexts, is also shown.

The instruction fetch unit 550 is composed of an instruction storage device for storing a plurality of instructions and an instruction fetch circuit for reading the next instruction to be executed from the instruction storage device and for transferring this instruction to the instruction register 510.

The instruction register 510 is a 16-bit register that stores one instruction that has been sent from the instruction fetch unit 550.

The instruction decoder unit 520 decodes the instruction stored in the instruction register 510 and outputs control signals in accordance with the decoding result to the execution unit 530. It should be noted here that the instruction decoder unit 520 fundamentally decodes one instruction in one cycle and sends control signals to the execution unit 530.

The execution unit 530 is a circuit which executes an instruction based on the decoding result of the instruction decoder unit 520. This execution unit 530 is composed of an execution control circuit 300, a save/restore invalidation circuit 301, general registers 310, a calculator 311, an operand access circuit 312, a constant register 320, a number of valid bits register 321, a constant restore circuit 322, and multiplexers 330, 331, and 332. The save/restore invalidation circuit 301 and the constant restore circuit 322 in the execution unit 530 are shown in more detail in the other figures.

The general registers 310 are composed of 16 32-bit registers R0–R15, with the stored values of these registers being transferred to the calculator 311 or the operand access circuit 312 in accordance with the decoding result of the instruction decoder unit 520 and control signals generated by the execution control unit 300. These values can then be used in operations, transferred to the external memory 540, or simply allowed to pass and so be transferred back to the general registers 310.

The constant register 320 is a 32-bit register. The stored value of the constant register 320 is transferred to the constant restore circuit 322 or to the operand access circuit 312 based on the decoding result of the instruction decoder unit 520 and control signals generated by the execution control unit 300.

The constant restore circuit 322 generates a new value using the stored value of the constant register 320 and constants included in the instruction stored in the instruction register 510, in accordance with the decoding result of the instruction decoder unit 520, control signals generated by the execution control unit 300, and the value of the number of valid bits register 321. The constant restore circuit 322 transfers this generated value to the calculator 311 or the operand access circuit 312. The generated value can then be used in an operation, transferred to the external memory 540, or simply allowed to pass and so be transferred to the general registers 310. However, when a value is simply to be accumulated, such as when there is an "sfst" instruction (described later in this specification), a new value is generated, is allowed to pass the calculator 311, and is stored in the constant register 320. The method for generating this new value is described in detail later. It should be noted here that the 13-bit signal line that connects the instruction register 510 and the execution unit 530 is a bus for transmitting a constant located in the instruction register 510 to the execution unit 530.

The number of valid bits register 321 shows the bit position in the constant register 320 up to which the divided constant has been stored, and so has its value updated every time a new value is stored in the constant register 320. When the instruction stored in the instruction register 510 is an instruction which uses the constant in the constant register 36 (such as an "addi" instruction which will be described later), the value "0b00" (all bits invalid) is stored in the number of valid bits register 321 by the execution control circuit 300. Specific examples of the correspondence between the stored value of the number of valid bits register 321 and the number of valid bits in the constant register 320 are shown in FIG. 31.

The execution control circuit 300 refers in general to the control circuitry and wiring which controls all of the components 310 to 332 in the execution unit 530 based on the decoding result of the instruction decoder unit 520. This execution control unit 300 includes the components that are normally provided in a processor, such as circuits for timing control, operation permission/prohibition control, status management, and interruption control, as well as a control circuit for the constant register 320.

The save/restore invalidation circuit 301 is a characteristic circuit of the present processor and operates in accordance with instructions from the execution control circuit 300. When the instruction stored in the instruction register 510 is an instruction which saves or restores the value of the constant register 320 and the value of the constant register 320 is invalid according to the value "0b00" of the number of valid bits register 321, the save/restore invalidation circuit 301 changes the control signal 303 of the operand access circuit 312 to "no operation" (described in detail later).

The calculator 311 is an ALU (arithmetic logic unit) which performs arithmetical and logical operations on two sets of 32-bit data. This calculator 311 operates according to control by the execution control circuit 300.

The operand access circuit 312 sets the output of the calculator 311 as an operand address, sets the output of the multiplexer 332 as an operand, and is a circuit which transfers operands to and from the external memory 540. This operand access circuit 312 internally includes a buffer for storing this operand and operand address.

When the control signal 303 outputted by the save/restore invalidation circuit 301 is "load", one word located in the external memory 540 is read out to the bus 333 via the operand access circuit 312 and the multiplexer 331 and is stored in one register R0–R15 out of the general registers 310 or, when restoring a value in the constant register 320 (described later), in the constant register 320.

In the same way, when the control signal 303 is "store", a value which is stored in one register R0–R15 out of the general registers 310, or, when saving the value of the constant register 320 (described later), the value of the constant register 320 is selected by the multiplexer 332 and is written into the external memory 540 via the operand access circuit 312.

When the control signal 303 is "no operation", the operand access circuit 312 ignores the operand and operand address and does not perform a transfer to or from the external memory 540.

Instruction Format

The following is a description of the instruction format for the present processor. The format of the instructions used by the present processor is shown in FIG. 32. As shown in FIG. 32, each instruction has a fixed word length of 16 bits, with the highest three bits being the operation 1 (op1) field. The instruction format is determined by decoding this field to see whether the instruction is an "sfst" instruction. For instructions aside from "sfst" instructions, the following three bits compose the operation 2 (op2) field, so that the instruction type can be determined by decoding these op1 and op2 fields. For an "addi" instruction, the following four bits are the register field (Rn), which is used to specify the number of the destination register, and the next field is a constant (imm6), which specifies a 6-bit constant that is to be added to the value of Rn.

The functions of the various kinds of instructions are as follows.

(1) sfst imm13

This instruction stores a value in the constant register 320 by having the value stored in the constant register 320 shifted by 13 bits to the left and a 13-bit immediate (imm13) inserted into the lower-order position of the constant register 320. When the value in the constant register 320 is invalid, the 13-bit value is simply given a sign extension and is stored in the constant register 320 (which is to say, the "shift-set" operation of the "sfst" is omitted).

(2) addi imm6, Rn

In this instruction, the value in the constant register 320 is shifted 6 bits to the left and a 6-bit immediate (imm6) is inserted into the lowest 6-bits of the constant register 320. The resulting value in the constant register 320 is added to the stored value of Rn (where n is 0–15) in the general registers 310 and the result is stored in Rn. When the value in the constant register 320 is invalid, the 6-bit immediate is simply given a sign extension and is used in the addition. After this instruction has been executed, the constant register 320 is invalidated.

(3) save IMR, (Rn)

This instruction saves the value of the constant register 320 in the memory using the value of the register Rn in the general registers 310 as the saving address.

(4) restore (Rn), IMR

This instruction restores a value of the constant register 320 from the external memory 540 using the value of the register Rn in the general registers 310 as the source address.

Constant Restore Circuit 322

Figure 33:
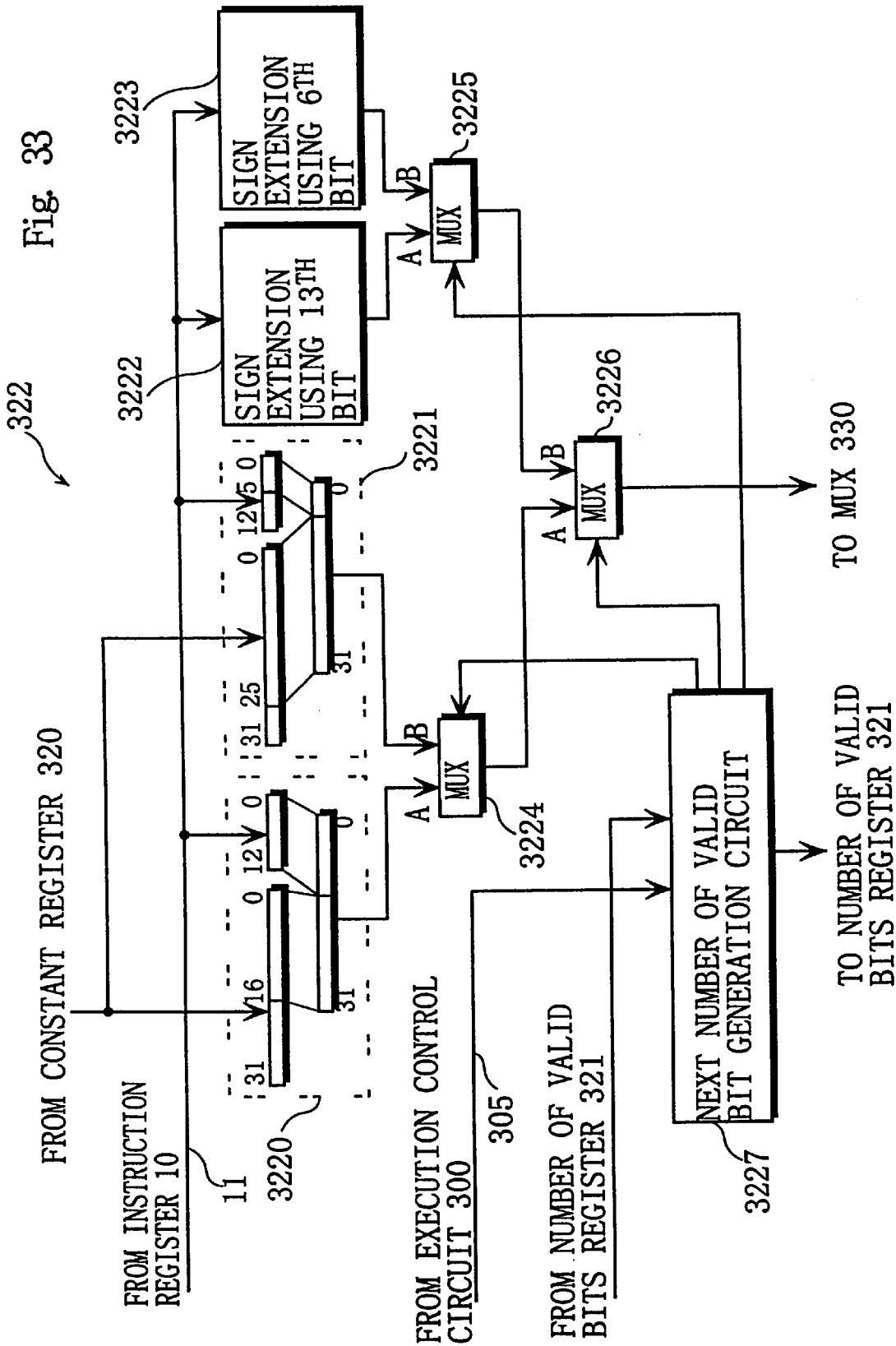
FIG. 33 is a block diagram showing the detailed construction of the constant restore circuit 322.

FIG. 33 is a block diagram showing the detailed construction of the constant restore circuit 322.

In FIG. 33, the numeral 3220 denotes a circuit which links the 13-bit constant transferred from the instruction register 510 via the bus 11 to the lower 19 bits of the stored value of the constant register 320 to obtain a 32-bit value where the value of the constant register forms the higher bits.

In the same way, the numeral 3221 denotes a circuit which links the 6-bit constant (the lower 6 bits out of the 13 bits) transferred from the instruction register 510 via the bus 11 to the lower 26 bits of the stored value of the constant register 320 to obtain a 32-bit value where the value of the constant register forms the higher bits.

The numeral 3222 denotes a circuit which gives a sign extension to the 13-bit constant transferred from the instruction register 510 via the bus 11 to produce a 32-bit value. The numeral 3223, meanwhile, denotes a circuit which gives a sign extension to the 6-bit constant (the lower 6 bits out of the 13 bits) transferred from the instruction register 510 via the bus 11 to produce a 32-bit value.

In FIG. 33, the numerals 3224–3226 denote multiplexers and the numeral 3227 is a next number of valid bits generation circuit.

FIG. 34 is a table which defines the operations of the multiplexers 3224–3226 and the next number of valid bits generation circuit 3227. These are determined according to the control signal 305 from the execution control circuit 300 and the value of the number of valid bits register 321. In FIG. 34, the "sfst" and "use" columns show the type of instruction that is stored in the instruction register 510, with this being shown by the control signal 305 outputted by the execution control circuit 300. The rows corresponding to "sfst" show the operations to be performed when an "sfst" instruction is stored in the instruction register 510, while the rows corresponding to "use" show the operations when an instruction which uses a constant, such as an "addi" instruction, is stored in the instruction register 510. The next number of valid bits is the value outputted by the next number of valid bits generation circuit 3227, and is a value which will be stored in the number of valid bits register 321 in the following cycle.

Save/Restore Invalidation Circuit 301

Figure 35:
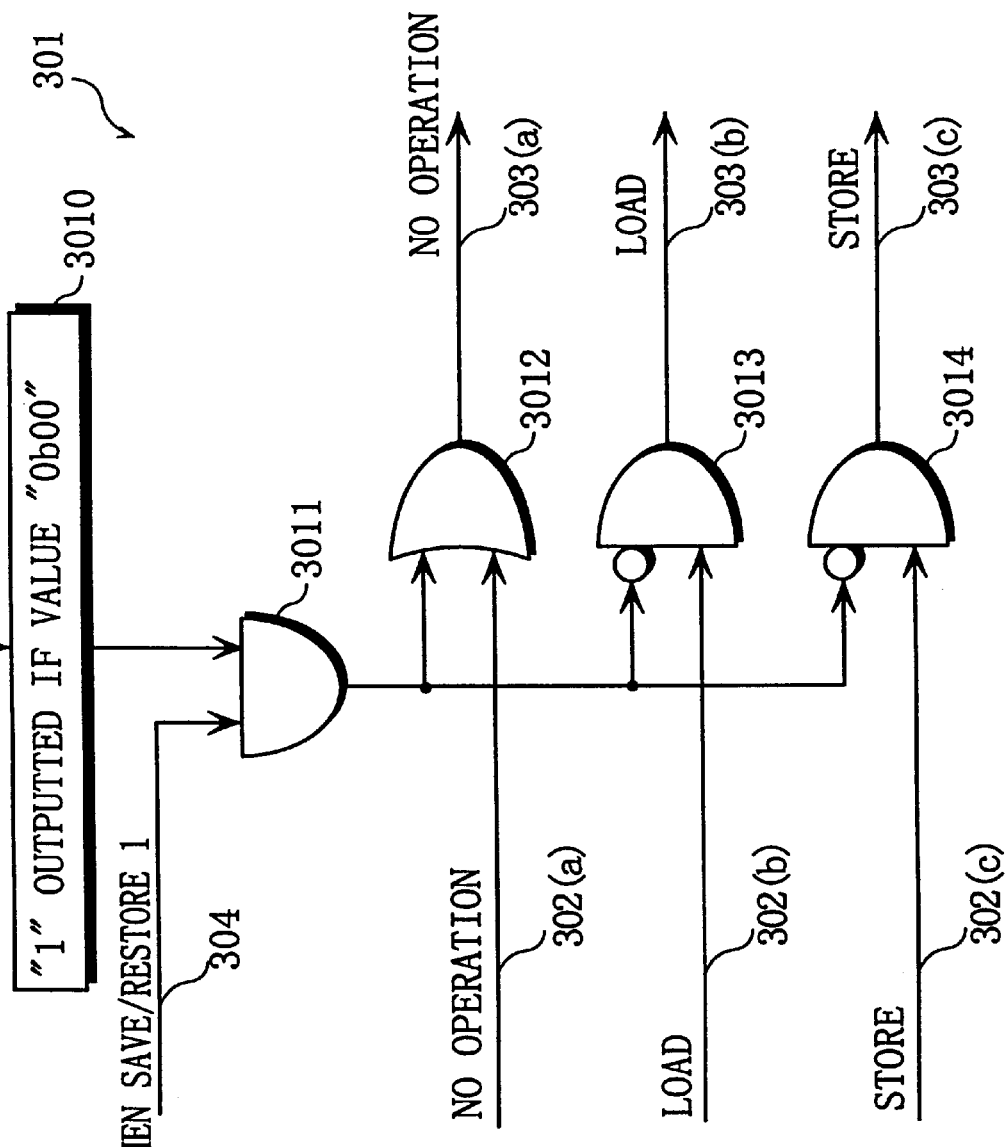
FIG. 35 shows the detailed construction of the save/restore invalidation circuit 301.

FIG. 35 shows the detailed construction of the save/restore invalidation circuit 301.

When the stored value of the number of valid bits register 321 is "0x00", the logic circuit 3010 outputs the value "1". When this is not the case, the number of valid bits register 321 outputs the value "0". The gate element 3011 is an AND circuit, the gate element 3012 is an OR circuit, and the gate elements 3013 and 3014 are AND circuits that have an inverse value of the output of the AND circuit 3011 as an input.

The signal lines 302(a), 302(b), and 302(c) each represent one bit in the 3-bit control signal 302, while the signal lines 303(a), 303(b), and 303(c) each represent one bit in the 3-bit control signal 303 shown in FIG. 30. These signal lines 303(a) to 303(c) have the operand access circuit 312 respectively perform no operation, a load, or a store.

The control signal 304 is a control signal outputted by the execution control circuit 300 as shown in FIG. 30. When the instruction stored in the instruction register 510 is a save instruction or a restore instruction, the control signal 304 is set at "1", with the control signal 304 being set at "0" in all other cases.

With the present construction, when the stored value of the number of valid bits register 321 is "0b00" and the control signal 304 is "1", which is to say, when the instruction stored in the instruction register 510 is a save instruction or a restore instruction, the control signal 303(a) becomes "1" independently of the control signal 302, and the control signals 303(b) and 303(c) become "0". As a result, the operation of the operand access circuit 312 becomes "no operation".

On the other hand, when the stored value of the number of valid bits register 321 is not "0b00", or the value of the control signal 304 is "0", the value of the control signal 302 is outputted as the value of the control signal 303.

Operation of the Processor

The following is a description of the operation of the present processor when executing specific instructions. It should be noted here that in the present embodiment, it is supposed that the activation of a context switch is performed by asynchronous interrupts. The specific processing performed by the interrupt handler has been omitted, so that the present explanation will only focus on the operations for saving and restoring the values of registers.

FIG. 36A is a flowchart that will be used to explain the processing of the present processor, while FIG. 36B is a program (composed of instructions 571 to 573) which corresponds to the processing in FIG. 36A. In this example, a program for adding the 32-bit constant "0x12345678" to the value in the register R0 is given. FIGS. 36C to 36F show the changes in the content of the constant register 320 and the number of valid bits register 321 which accompany the execution of instructions 571 to 573, and FIG. 36G shows the effective operand when executing the instruction 573.

The following is a description of the operation for each of the instructions 571 to 573. It should be noted here that before the present program is executed, the value "0b00", showing that the value of the constant register 320 is invalid, is stored in the number of valid bits register 321, as shown in FIG. 36C.

(1) sfst 0x0246 (instruction 571)

Once the instruction 571 has been stored in the instruction register 510, this instruction 571 is executed in accordance with the following processes under the control of the execution control circuit 300.

First, in the constant restore circuit 322, the multiplexer 3225 selects A and the multiplexer 3226 selects B in accordance with FIG. 34. This is because the instruction stored in the instruction register 510 is an "sfst" instruction and the stored value of the number of valid bits register 321 is "0b00". As a result, the 13-bit immediate "0x0246" of the instruction 571 stored in the instruction register 510 is given a sign extension and is outputted as the 32-bit value "0x00000246" to the multiplexer 330. The value "0b01" is also outputted to the number of valid bits register 321.

The value "0x00000246" outputted to the multiplexer 330 is simply allowed to pass by the calculator 311 and is sent to the constant register 320 via the multiplexer 331. The value of the number of valid bits register 321 is updated to "0b01".

By means of the above processing, the content of the constant register 320 and the number of valid bits register 321 are changed as shown in FIG. 36D. It should be noted here that the operand access circuit 312 performs no operation since "no operation" is denoted by the control signals 302 and 303. There is also no change to the general registers 310.

(2) sfst 0x1159 (Instruction 572)

Once the instruction 572 has been stored in the instruction register 510, this instruction 572 is executed in accordance with the following processes under the control of the execution control circuit 300.

First, in the constant restore circuit 322, the multiplexer 3224 selects A and the multiplexer 3226 selects A in accordance with FIG. 34. This is because the instruction stored in the instruction register 510 is an "sfst" instruction and the stored value of the number of valid bits register 321 is "0b01". As a result, the stored value "0x00000246" of the constant register 320 is shifted 13 bits to the left and the 13-bit immediate "0x1159" of the instruction 572 stored in the instruction register 510 is inserted into the lowest 13 bits of the constant register 320. The resulting 32-bit value "0x0048d159" in the constant register 320 is then outputted to the multiplexer 330. The value "0b10" is also outputted to the number of valid bits register 321.

The value "0x0048d159" outputted to the multiplexer 330 is simply allowed to pass by the calculator 311 and is sent to the constant register 320 via the multiplexer 331. The value of the number of valid bits register 321 is updated to "0b10".

By means of the above processing, the content of the constant register 320 and the number of valid bits register 321 are changed as shown in FIG. 36E. It should be noted here that the operand access circuit 312 performs no operation since "no operation" is denoted by the control signals 302 and 303. There is also no change to the general registers 310.

(3) addi 0x38, R0 (instruction 573)

Once the instruction 573 has been stored in the instruction register 510, this instruction 573 is executed in accordance with the following processes under the control of the execution control circuit 300.

First, in the constant restore circuit 322, the multiplexer 3224 selects B and the multiplexer 3226 selects A in accordance with FIG. 34. This is because the instruction stored in the instruction register 510 is an "addi" instruction (the rows for the legend "use" being operative) and the stored value of the number of valid bits register 321 is "0b10". As a result, the stored value "0x0048d159" of the constant register 320 is shifted 6 bits to the left and the 6-bit immediate "0x38" of the instruction 573 stored in the instruction register 510 is inserted into the lowest 6 bits of the constant register 320. The resulting value "0x12345678" (the value shown in FIG. 36G) in the constant register 320 is then outputted to the multiplexer 330. The value "0b00" is also outputted to the number of valid bits register 321.

The value "0x12345678" outputted to the multiplexer 330 is inputted into the A port of the calculator 311. At the same time, the stored value of the register R0 in the general registers 310 is read and is inputted into the B port of the calculator 311. The calculator 311 then adds its inputs together and outputs the result to the register R0 in the general registers 310 via the multiplexer 331. The value of the number of valid bits register 321 is updated to "0b00".

By means of the above processing, the content of the constant register 320 and the number of valid bits register 321 are changed as shown in FIG. 36F. It should be noted here that the operand access circuit 312 performs no operation since "no operation" is denoted by the control signals 302 and 303.

At this point, an interrupt occurs during the execution of this example program. The following is a description of the operation performed for context switching for two cases with different interrupt positions.

Case 1

The following explanation deals with the case when an interrupt occurs just before the "addi" instruction 573 during the execution of the example program given above, and describes the case when context switching is performed.

Figure 37A:
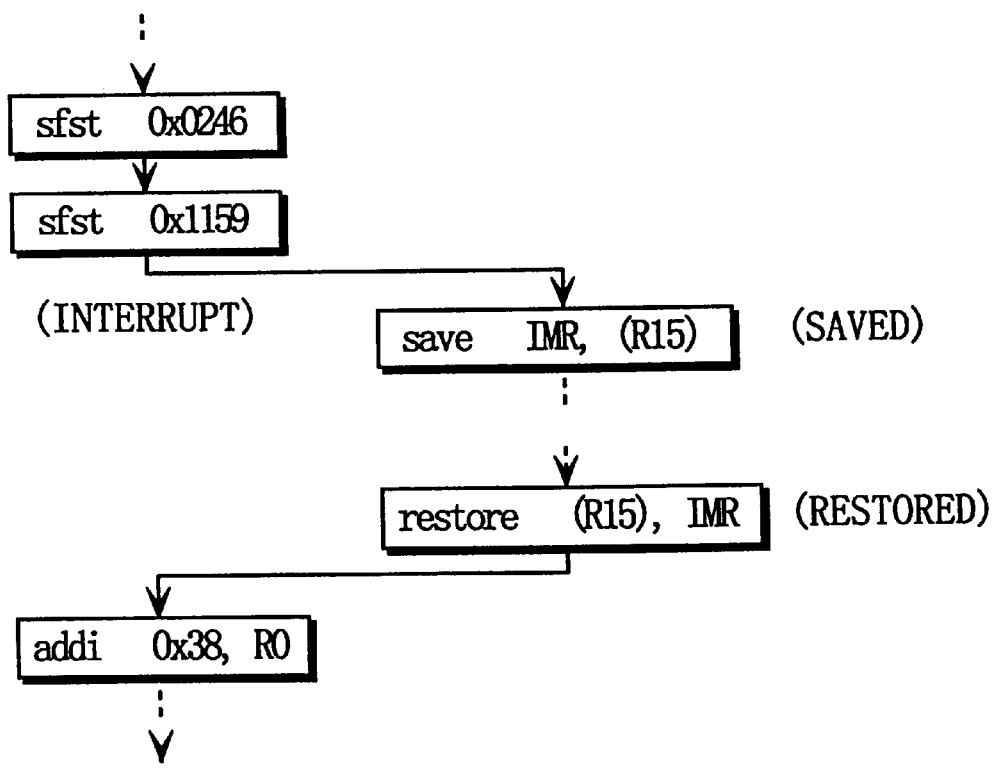
FIG. 37A is a flowchart showing the flow of instructions for the case (case 1) when interrupt processing is commenced when the value "0b10" (showing that the lower 26 bits are valid) is stored in the number of valid bits register 321.

FIG. 37A is a flowchart showing the flow of instructions in case 1. Here, the interrupt processing is commenced just as the value "0x0048d159" has been stored in the constant register 320 and the value "0b10" (meaning that the lower 26 bits in the constant register 320 are valid) has been stored in the number of valid bits register 321, as shown in FIG. 36E.

When the value of the constant register 320 is saved in the interrupt processing, a "save IMR,(R15)" instruction is stored in the instruction register 510 and is executed. This instruction is executed by the execution control circuit 300 performing the control described below.

The stored value of the constant register 320 is inputted into the operand access circuit 312 via the multiplexer 331 as an operand. On the other hand, the value of the register R15 in the general registers 310 is inputted into the B port of the calculator 311, is simply allowed to pass, and is inputted into the operand access circuit 312 as an operand address.

The execution control circuit 300 outputs the value "1" as the control signal 304 to show that the present instruction is a save or restore instruction, and has a save operation performed by outputting "store" as the control signal 302.

In the save/restore invalidation circuit 301, the stored value of the number of valid bits register 321 is "0b10", so that the control signal 302 is outputted as it is as the control signal 303 and the operand access circuit 312 performs a "store" operation. This means that the operand access circuit 312 saves the stored value of the constant register 320. It should be noted here that the number of valid bits register 321 forms one part of the status register of the present processor, so that it is saved whenever the status register is saved.

When the value of the constant register 320 is to be restored, first the content "0b10" of the number of valid bits register 321 in the status register is restored. After this, a "restore (R15),IMR" instruction is stored in the instruction register 510 and executed. This instruction is executed by the execution control circuit 300 performing the control described below.

The value of the register R15 in the general registers 310 is inputted into the B port of the calculator 311, is simply allowed to pass, and is inputted into the operand access circuit 312 as an operand address.

The execution control circuit 300 outputs the value "1" as the control signal 304 to show that the present instruction is a save or restore instruction, and has a restore operation performed by outputting "load" as the control signal 302.

In the save/restore invalidation circuit 301, the stored value of the number of valid bits register 321 is "0b10", so that the control signal 302 is outputted as it is as the control signal 303 and the operand access circuit 312 performs a "load" operation. This means that the operand access circuit 312 sends the read value "0x0048d159" to the constant register 320 via the multiplexer 331, which is to say that the value of the constant register 320 is restored.

Case 2

The following explanation deals with the case when an interrupt occurs just after the "addi" instruction 573 during the execution of the example program given above, and describes the case when context switching is performed.

Figure 37B:
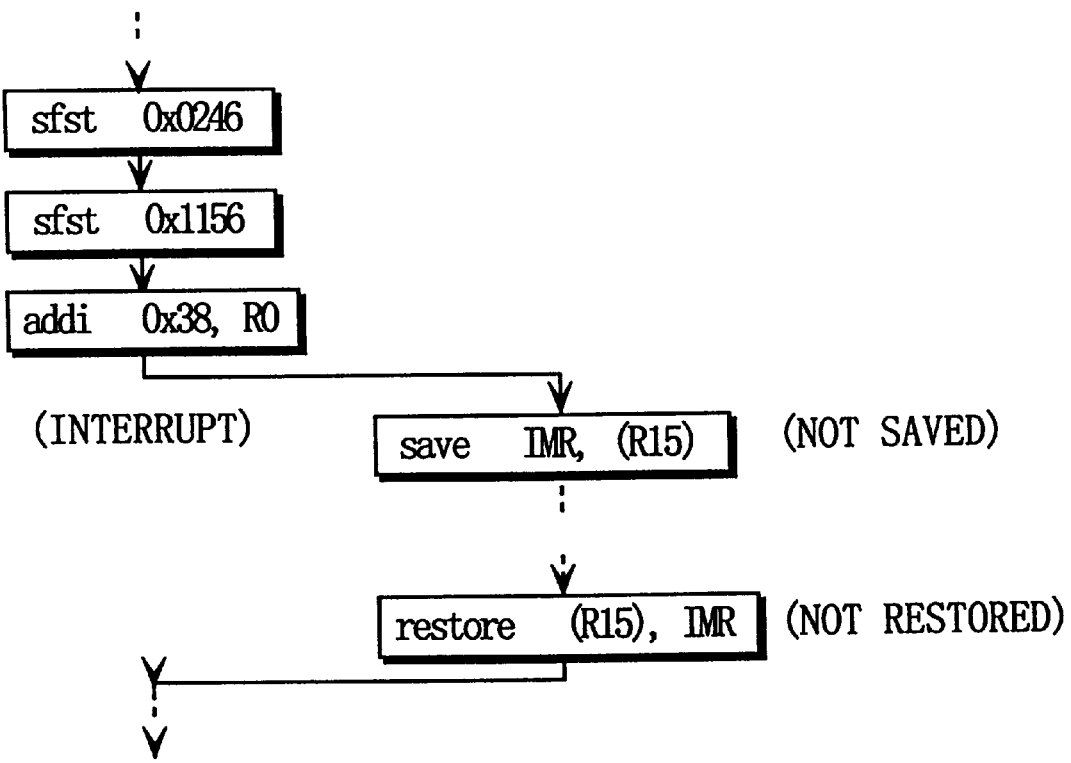
FIG. 37B is a flowchart showing the flow of instructions for the case (case 2) when interrupt processing is commenced when the value "0b00" (showing that all bits are invalid) is stored in the number of valid bits register 321.

FIG. 37B is a flowchart showing the flow of instructions in case 2. Here, the interrupt processing is commenced just as the value "0x0048d159" has been stored in the constant register 320 and the value "0b00" (all bits invalid) has been stored in the number of valid bits register 321, as shown in FIG. 36F.

When the value of the constant register 320 is saved in the interrupt processing, a "save IMR, (R15)" instruction is stored in the instruction register 510 and is executed. This instruction is executed by the execution control circuit 300 performing the control described below.

The stored value of the constant register 320 is inputted into the operand access circuit 312 via the multiplexer 332 as an operand. On the other hand, the value of the register R15 in the general registers 310 is inputted into the B port of the calculator 311, is simply allowed to pass, and is inputted into the operand access circuit 312 as an operand address.

The execution control circuit 300 outputs the value "1" as the control signal 304 to show that the present instruction is a save or restore instruction, and has a save operation performed by outputting "store" as the control signal 302.

In the save/restore invalidation circuit 301, the stored value of the number of valid bits register 321 is "0b00" and the value of the control signal 304 is "1", so that the control signal 302 is invalidated within the save/restore invalidation circuit 301 and "no operation" is outputted as the control signal 303. As a result, no operation is performed by the operand access circuit 312. It should be noted here that the number of valid bits register 321 forms one part of the status register of the present processor, so that it is saved whenever the status register is saved.

When the value of the constant register 320 is to berestored, first the content "0b00" of the number of valid bits register 321 in the status register is restored. After this, a "restore (R15),IMR" instruction is stored in the instruction register 510 and executed. This instruction is executed by the execution control circuit 300 performing the control described below.

The value of the register R15 in the general registers 310 is inputted into the B port of the calculator 311, is simply allowed to pass, and is inputted into the operand access circuit 312 as an operand address.

The execution control circuit 300 outputs the value "1" as the control signal 304 to show that the present instruction is a save or restore instruction, and has a restore operation performed by outputting "load" as the control signal 302.

In the save/restore invalidation circuit 301, the stored value of the number of valid bits register 321 is "0b00" and the value of the control signal 304 is "1", so that the control signal 302 is invalidated within the save/restore invalidation circuit 301 and "no operation" is outputted as the control signal 303. As a result, the operand access circuit 312 performs no operation.

As described above, operand access is invalidated in case 2, so that no actual transfer is performed with the external memory 540. As a result, the number of memory accesses in case 2 can be reduced by the amount required for saving and restoring the constant register, thereby reducing the processing time required by the context switch. As shown by the present embodiment, when an immediate is divided and distributed among a plurality of instructions before being reconstructed in the constant register 320, the smaller the number of large constants, the lower the effect of the constant register 320. Putting this in other words the lower the number of large constants in a program, the less often the need to save and restore the content of the constant register, meaning that there is an increase in the value of this second effect of the present invention.

Figure 38:
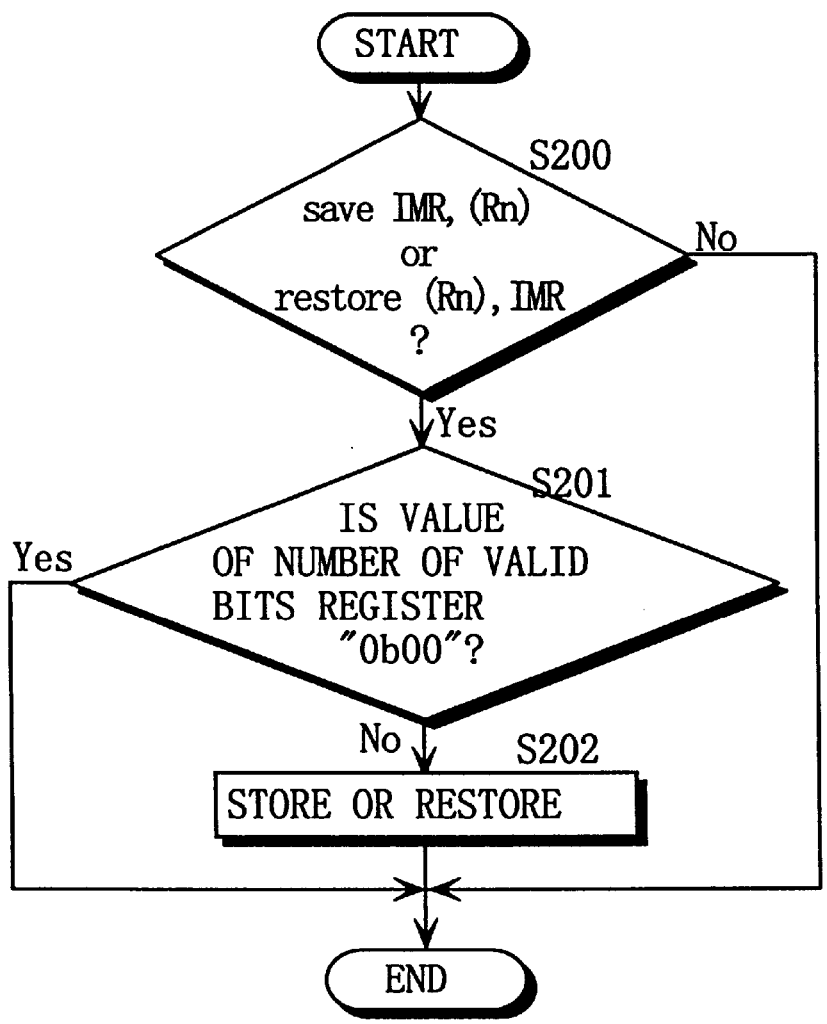
FIG. 38 is a flowchart showing the operation of the processor in case 1 and in case 2, which is to say the outline operation for saving and restoring the value of the constant register 320.

FIG. 38 is a flowchart showing an overview of the operation of the present processor for case 1 and case 2, which is to say the operation for saving and restoring the value of the constant register 320. When the present processor is to save or restore the value of the constant register 320 (step S200), the processor refers to the stored value of the number of valid bits register 321, and if this stored value is "0b00", which is to say there has been an indication that no valid constant is stored in the constant register 320 or was previously stored in the constant register 320 (step S201), the processor does not perform what would be a redundant saving or restoring operation (step S202).

A processor which realizes the second object of the present invention has been described above according to the second embodiment, although it should be obvious that this processor is not limited to the second embodiment. Examples of possible variations are given below.

(1) In the second embodiment, an instruction format with a fixed word length of 16 bits is used, along with 13-bit and 6-bit immediates. However, the present invention is not restricted to these bit lengths. In the same way, the general registers 310 and the constant register 320 were described as being 32-bit registers, although it should be obvious that the present invention is not restricted to these bit lengths.

(2) The processor was described as including only one constant register 320 in the second embodiment, although the processor of the present invention may be equipped with a plurality of constant registers 320.

(3) The processor was described with an example of save and restore operations during context switching in the second embodiment, although the processor of the present invention may perform transfer between the constant register and a storage device regardless of whether a context switching is being performed.

(4) The processor was described in the second embodiment as being equipped with a number of valid bits register 321 showing the number of valid bits in the constant stored in the constant register 320, although the same effect of the second embodiment may be achieved by another type of register so long as this other register stores an indication of the valid/invalid state of the constant register 320.

(5) The processor of the second embodiment was described with an "addi" instruction as an example of an instruction which uses an immediate, although the processor of the present invention may also execute other instructions that use immediates.

(6) The processor of the second embodiment was described as using the instructions "save IMR, (R15)" and "restore (R15), IMR" as the instructions for saving and restoring the value of the constant register 320, although other instruction formats may be used.

As one example, the saving and restoring of the constant register 320 may be defined by instructions which give the constant register 320 in a register list-type operand or by instructions that have the constant register 320 saved and restored whenever a register (Rn) in the general registers 310 which is always included in the context or a status register is saved and restored. As one example of the latter case, an instruction may have the implicitly indicated constant register 320 saved and restored whenever the register R15 or the status register is saved and restored.

For "save IMR, (Rn)" and "restore (Rn), IMR" instructions, there is the problem that the total code size will be increased due to the presence of these instructions even when the saving and restoring of the constant register 320 is invalid. However, if instructions which clearly indicate only the saving and restoring of the constant register 320 are made unnecessary as described above, there is the additional effect that the code size can be reduced.

Figure 39:
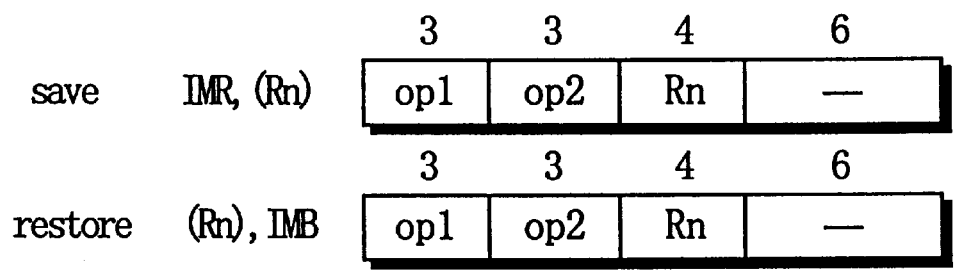
FIG. 39 shows the format of specialized instructions for saving and restoring only the value of the number of valid bits register 321.

(7) In the second embodiment, the value of the number of valid bits register 321 is implicitly saved and restored whenever there is a context switch as part of the status register, although the present invention is not restricted to this method. As shown in FIG. 39, specialized instructions which only save and restore the value of the number of valid bits register 321 may be defined. It should be noted here that in FIG. 39, the legend "IMB" shows the number of valid bits register 321, while the legend "Rn" shows the register in the general registers 310 which stores the address in the external memory 540 used for the save and restore operations.

(8) The processor of the second embodiment executes instructions such as the "sfst" and "addi" instructions where only one operation is given in each instruction, although it is equally possible for the processor to execute VLIW-type instructions where a plurality of operations are specified by a single instruction in the same way as in the first embodiment.

Figure 40:
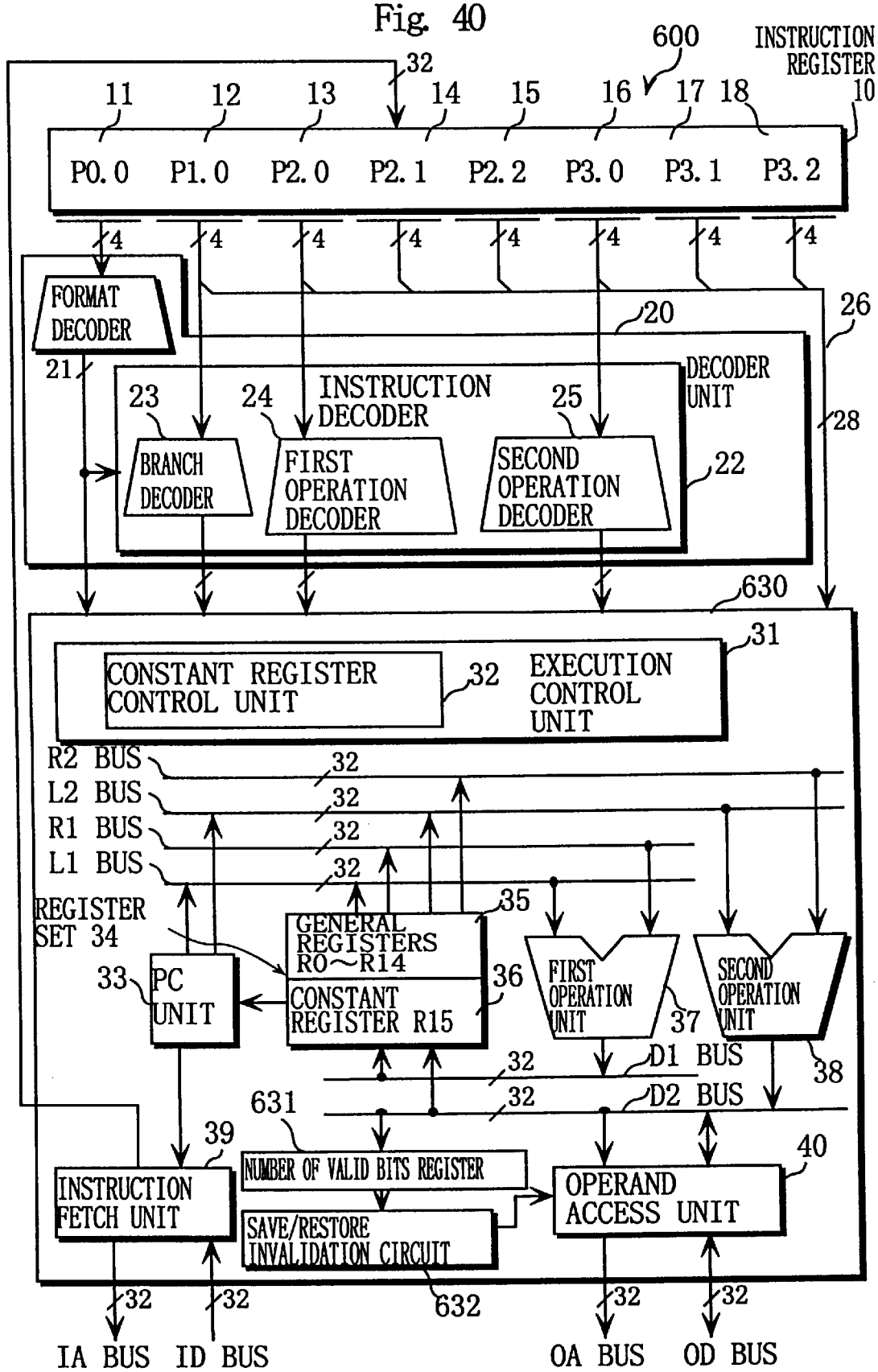
FIG. 40 is a function block diagram showing the VLIW processor 600 that equates to a VLIW processor of the first embodiment with the addition of the context switching function of the second embodiment.

FIG. 40 is a function block diagram showing the VLIW processor 600 which equates to a VLIW processor of the first embodiment with the addition of the context switching function of the second embodiment. The execution unit 630 of this processor 600 has a number of valid bits register 631 and a save/restore invalidation circuit 632 that have the same functions as their equivalents in the second embodiment.

Figure 41:
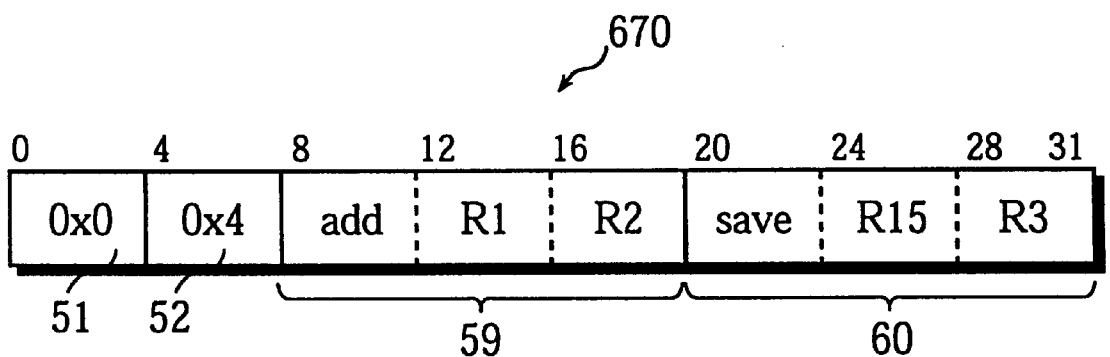
FIG. 41 shows an example VLIW 670 that is executed by the processor 600.

FIG. 41 shows an example VLIW 670 that is executed by the present processor 600. The second operation field 60 of this instruction 670 whose format code 51 is "0x0" includes a save operation that saves the content of the constant register R15 in a storage area in the external memory indicated by the general register R3. When this operation code is decoded by the second operation decoder 25, the content of the constant register 36 passes through the second operation unit 38 and is sent to the operand access unit 40. After this, the save/restore invalidation circuit 632 refers to the value of the number of valid bits register 631 at this point and, by following the flow shown in FIG. 38, permits or prohibits the saving of the content of the constant register 36 in the external memory by the operand access unit 40.

In this way, by adding the context switching function of the second embodiment to the constant reconstructing VLIW processor of the first embodiment, a processor that can avoid increases in code size due to the insertion of "nop" instructions and can avoid the saving and restoring of redundant contexts during task switching is realized. This is to say, a VLIW processor which can support reductions in code size and can execute high-speed task switching is achieved.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor for decoding and executing an instruction, the processor comprising:
   an instruction register for storing the instruction;
   decoding means for decoding the stored instruction;
   a constant register including a storage region for storing a constant;
   constant storing means which, when the decoding means has decoded that the instruction includes a constant that should be stored into the constant register, stores the constant included in the instruction into the constant register if no valid constant is stored in the constant register, and, if a valid constant that was included in another instruction is already stored in the constant register, stores the constant included in the instruction into the constant register so as to retain the valid constant; and
   execution means which, when the decoding means has decoded that the instruction specifies an operation which uses the constant register, reads an entire value stored in the constant register and executes the operation in the constant register.

2. The processor of claim 1,
   wherein the constant storing means stores the constant included in the instruction into the constant register after shifting the valid constant that was included in the other instruction and is already stored in the constant register, wherein the valid constant and the constant included in the instruction are linked in a digit direction in the constant register.

3. The processor of claim 2, wherein the constant storing means shifts the valid constant to a higher bit position in the constant register and stores the constant included in the instruction by inserting the constant at a lower bit position.

4. The processor of claim 3, further comprising extension means for performing extension processing to add at least one of a sign extension and a zero extension to the constant.

5. The processor of claim 4, wherein the extension means performs the extension processing on the constant included in the instruction before the constant is stored into the constant register.

6. The processor of claim 4, wherein the extension means performs the extension processing on a constant that has been read from the constant register.

7. The processor of claim 2, wherein the constant storing means shifts the valid constant to a lower bit position in the constant register and stores the constant included in the instruction by inserting the constant at a higher bit position.

8. The processor of claim 1, wherein the constant storing means does not shift the valid constant in the constant register and stores the constant included in the instruction into a position in the constant register adjacent to the valid constant, wherein the valid constant and the constant included in the instruction are linked in a digit direction in the constant register.

9. The processor of claim 8, wherein the constant storing means stores the constant included in the instruction by inserting the constant at a higher bit position than the valid constant in the constant register.

10. The processor of claim 8, wherein the constant storing means stores the constant included in the instruction by inserting the constant at a lower bit position than the valid constant in the constant register.

11. The processor of claim 1, wherein the constant storing means stores zero into the constant register immediately after the entire value stored in the constant register has been read by the execution means.

12. The processor of claim 1, wherein the execution means has a branch execution unit for executing a branch operation in accordance with the instruction, and wherein the constant storing means stores zero into the constant register when a branch operation has been executed by the branch execution unit.

13. The processor of claim 1, wherein the processor is connected to an external memory for storing an internal state of the processor, the processor further comprising:

saving means for saving, when the decoding means decodes that the instruction is a save instruction for saving a value in the constant register into the external memory, the value in the constant register into the external memory; and save prohibiting means for prohibiting the saving means from saving the value in the constant register when there is no valid constant in the constant register.

14. The processor of claim 13, further comprising:

restoring means for restoring, when the decoding means decodes that the instruction is a restore instruction for restoring a value into the constant register from the external memory, the value into the constant register; and restore prohibiting means for prohibiting the restoring means from restoring the value when the restore instruction corresponds to a save instruction where saving was prohibited by the save prohibiting means.

15. The processor of claim 14, further comprising:

validity information storage means for storing validity information showing whether a valid constant is stored in the constant register, the saving means including a validity information saving unit for having the validity information stored in the validity information storage means saved into the external memory, the save prohibiting means referring to the validity information to judge whether a valid constant is stored in the constant register, and prohibiting the saving means from saving the value of the constant register on judging that there is no valid constant in the constant register, the restoring means including a validity information restoring unit for having the validity information in the external memory restored into the validity information storage means, and the restore prohibiting means referring to the validity information in the external memory to judge whether the restore instruction corresponds to a save instruction where saving was prohibited by the save prohibiting means, and prohibiting the restoring means from restoring a value on judging that the restore instruction corresponds to a save instruction where saving was prohibited.

16. The processor of claim 15, wherein the validity information saving unit saves the validity information into the external memory when the decoding means has decoded that the instruction in the instruction register is a save instruction, the validity information restoring unit restoring the validity information from the external memory to the validity information storage means when the decoding means has decoded that the instruction in the instruction register is a restore instruction.

17. The processor of claim 16, wherein the validity information shows a valid number of digits in a constant stored in the constant register, the save prohibiting means prohibiting a saving when the valid number of digits in the validity information is zero, and the restore prohibiting means prohibiting a restoring when the valid number of digits in the validity information is zero.

18. A VLIW processor for decoding and executing a VLIW instruction, the VLIW instruction including a format field for storing a format code that specifies an instruction format and a plurality of operation field for specifying operations that are to be processed in parallel, the VLIW processor comprising:

a VLIW instruction register for storing the VLIW instruction;

decoding means for decoding the stored VLIW instruction, the decoding means including a format decoding unit for referring to the format code of the VLIW instruction and decoding that a constant is located in at least one operation field in the VLIW instruction;

a constant register including a storage region for storing a constant;

constant storing means which, when the decoding means has decoded that the VLIW instruction includes a constant that should be stored into the constant register, stores the constant located in the operation field into the constant register if no valid constant is stored in the constant register, and, if a valid constant that was included in another VLIW instruction and is already stored in the constant register, stores the constant located in the operation field into the constant register so as to retain the valid constant; and execution means which, when the decoding means has decoded that the VLIW instruction specifies an operation which uses the constant register, reads an entire value stored in the constant register and executes the operation.

19. The VLIW processor of claim 18, wherein the constant storing means stores the constant included in the operation field into the constant register after shifting the valid constant that was included in the other VLIW instruction and is already stored in the constant register.

20. The VLIW processor of claim 19, wherein the constant storing means stores the constant included in the operation field by inserting the constant at a higher bit position in the constant register than the valid constant.

21. The VLIW processor of claim 20, further comprising extension means for performing extension processing to add at least one of a sign extension and a zero extension to the constant.

22. The VLIW processor of claim 21, wherein the extension means performs the extension processing on the constant included in the operation field before the constant is stored into the constant register.

23. The VLIW processor of claim 21, wherein the extension means performs the extension processing on a constant that has been read from the constant register.

24. The VLIW processor of claim 19, wherein the constant storing means stores the constant by inserting the constant at a lower bit position in the constant register than the valid constant.

25. The VLIW processor of claim 18, wherein the constant storing means does not shift the valid constant in the constant register and stores the constant included in the operation field into a position in the constant register adjacent to the valid constant.

26. The VLIW processor of claim 25, wherein the constant storing means stores the constant included in the operation field by inserting the constant at a higher bit position in the constant register than the valid constant.

27. The VLIW processor of claim 25, wherein the constant storing means stores the constant by inserting the constant at a lower bit position in the constant register than the valid constant.

28. The VLIW processor of claim 18, wherein the constant storing means stores zero into the constant register immediately after the entire value stored in the constant register has been read by the execution means.

29. The VLIW processor of claim 18, wherein the execution means has a branch execution unit for executing a branch operation in accordance with the VLIW instruction, and wherein the constant storing means stores zero into the constant register when a branch operation has been executed by the branch execution unit.

30. The VLIW processor of claim 18, wherein the processor is connected to an external memory for storing an internal state of the processor, the processor further comprising:

savings means for saving, when the decoding means decodes that the VLIW instruction is a save VLIW instruction for saving a value in the constant register into the external memory, the value in the constant register into the external memory; and save prohibiting means for prohibiting the saving means from saving the value in the constant register when there is no valid constant in the constant register.

31. The VLIW processor of claim 30, further comprising:

restoring means for restoring, when the decoding means decodes that the VLIW instruction is a restore VLIW instruction for restoring a value into the constant register from the external memory, the value into the constant register; and restore prohibiting means for prohibiting the restoring means from restoring the value when the restore VLIW instruction corresponds to a save VLIW instruction where saving was prohibited by the save prohibiting means.

32. The VLIW processor of claim 31, further comprising validity information storage means for storing validity information showing whether a valid constant is stored in the constant register, the saving means including a validity information saving unit for having the validity information stored in the validity information storage means saved into the external memory, the save prohibiting means referring to the validity information to judge whether a valid constant is stored in the constant register, and prohibiting the saving means from saving the value of the constant register on judging that there is no valid constant in the constant register, the restoring means including a validity information restoring unit for having the validity information in the external memory restored into the validity information storage means, and the restore prohibiting means referring to the validity information in the external memory to judge whether the restore VLIW instruction corresponds to a save VLIW instruction where saving was prohibited by the save prohibiting means, and prohibiting the restoring means from restoring a value on judging that the restore VLIW instruction corresponds to a save VLIW instruction where saving was prohibited.

33. The VLIW processor of claim 32, wherein the validity information saving unit saves the validity information into the external memory when the decoding means has decoded that the VLIW instruction in the VLIW instruction register is a save VLIW instruction, the validity information restoring unit restoring the validity information from the external memory to the validity information storage means when the decoding means has decoded that the VLIW instruction in the VLIW instruction register is a restore VLIW instruction.

34. The VLIW processor of claim 33, wherein the validity information shows a valid number of digits in a constant stored in the constant register, the save prohibiting means prohibiting a saving when the valid number of digits in the validity information is zero, and the restore prohibiting means prohibiting a restoring when the valid number of digits in the validity information is zero.

35. A processor for decoding and executing an instruction, the processor comprising:

an instruction register for storing the instruction;

decoding means for decoding the stored instruction;

a constant register including a storage region for storing a constant whose size is equal to a size of the instruction;

constant storing means which, when the decoding means has decoded that the instruction includes a constant that should be stored into the constant register, stores the constant included in the instruction into the constant register if no valid constant is stored in the constant register, and, if a valid constant that was included in another instruction and is already stored in the constant register, stored the constant included in the instruction into the constant register so as to retain the valid constant; and execution means, which, when the decoding means has decoded that the instruction specifies an operation which uses the constant register, reads an entire value stored in the constant register and executes the operation in the constant register.

36. A VLIW processor for decoding and executing a VLIW instruction, the VLIW instruction including a format field for storing a format code that specifies an instruction format and a plurality of operation field for specifying operations that are to be processed in parallel, the VLIW processor comprising:

a VLIW instruction register for storing the VLIW instruction;

decoding means for decoding the stored VLIW instruction, the decoding means including a format decoding unit for referring to the format code of the VLIW instruction and decoding that a constant is located in at least one operation field in the VLIW instruction;

a constant register including a storage region for storing a constant whose size is equal to a size of the VLIW instruction;

constant storing means which, when the decoding means has decoded that the VLIW instruction includes a constant that should be stored into the constant register, stores the constant located in the operation field into the constant register if no valid constant is stored in the constant register, and, if a valid constant that was included in another VLIW instruction and is already stored in the constant register, stores the constant located in the operation field into the constant register so as to retain the valid constant; and execution means which, when the decoding means has decoded that the VLIW instruction specifies an operation which uses the constant register, reads an entire value stored in the constant register and executes the operation.

37. A processor for decoding and executing a plurality of instructions, at least two of the instructions respectively include a constant to be stored in a constant register, the processor comprising:

an instruction register for sequentially storing the instructions for execution by the processor;

a constant register for storing constants;

a decoding unit for decoding an instruction currently stored in the instruction register and determining when the instruction includes a constant to be stored in the constant register;

a constant register control unit for storing a constant included in the current instruction into the constant register based on the determination made by the decoder unit, wherein the constants included in the instructions accumulate in the constant register to form a combined constant as the instructions are sequentially executed by the processor; and an execution unit for reading the combined constant from the constant register when the decoding unit decodes an instruction which includes an operation that uses the combined constant.

38. A processor for decoding and executing a plurality of instructions, at least two of the instructions include constant value data which can collectively constitute a constant value, the processor comprising:

an instruction register for sequentially storing the instructions for execution by the processor;

a decoding unit for decoding an instruction currently stored in the instruction register and determining when the instruction includes a constant value data;

a constant register for storing a constant;

a constant register control unit for storing the constant value data included in the current instruction into the constant register based on the determination made by the decoder unit, wherein the constant data value included in the instructions accumulate in the constant register to form a constant value as the instructions are sequentially executed by the processor; and an execution unit for reading the constant value from the constant register when the decoding unit decodes an instruction which includes an operation that uses the stored constant value.

39. A method of providing a constant value that has been stored in a set of program instructions, comprising the steps of:

(a) receiving a first instruction having therewith a first predetermined partial segment of the constant value;

(b) decoding the first instruction to enable execution of the first instruction and segregation of the first partial segment of the constant value;

(c) storing the first partial segment of the constant value;

(d) executing the first instruction;

(e) receiving a second instruction having therewith a second predetermined partial segment of the constant value which is different from the first predetermined partial segment;

(f) decoding the second instruction to enable execution of the second instruction and segregation of the second partial segment of the constant value;

(g) storing the second partial segment of the constant value in a manner to operatively combine with the first partial segment;

(h) executing the second instruction; and (i) utilizing the constant value if the first and second partial segment reconstruct the full constant value, and if not, repeat the steps (e) through (i) for subsequent instructions having different partial segments of the constant value until the full constant value is reconstructed.

* * * * *